(12) United States Patent
Guerra Filho et al.

(10) Patent No.: US 11,532,137 B2
(45) Date of Patent: Dec. 20, 2022

(54) METHOD AND DEVICE FOR UTILIZING PHYSICAL OBJECTS AND PHYSICAL USAGE PATTERNS FOR PRESENTING VIRTUAL CONTENT

(71) Applicant: Apple Inc., Cupertino, CA (US)

(72) Inventors: Gutemberg B. Guerra Filho, El Dorado Hills, CA (US); Ian M. Richter, Los Angeles, CA (US); Raffi A. Bedikian, Mountain View, CA (US)

(73) Assignee: APPLE INC., Cupertino, CA (US)

( * ) Notice: Subject to any disclaimer, the term of this patent is extended or adjusted under 35 U.S.C. 154(b) by 97 days.

(21) Appl. No.: 17/231,917

(22) Filed: Apr. 15, 2021

(65) Prior Publication Data

US 2021/0233323 A1 Jul. 29, 2021

Related U.S. Application Data

(63) Continuation of application No. 16/859,850, filed on Apr. 27, 2020, now Pat. No. 11,010,982.

(60) Provisional application No. 62/866,126, filed on Jun. 25, 2019.

(51) Int. Cl.
*G06T 19/00* (2011.01)
*G06T 19/20* (2011.01)
*G06V 20/20* (2022.01)

(52) U.S. Cl.
CPC ........... *G06T 19/006* (2013.01); *G06T 19/20* (2013.01); *G06V 20/20* (2022.01)

(58) Field of Classification Search
None
See application file for complete search history.

(56) References Cited

U.S. PATENT DOCUMENTS

| | | | |
|---|---|---|---|
| 2010/0302247 A1 | 12/2010 | Perez et al. | |
| 2016/0162742 A1* | 6/2016 | Rogan | G06K 9/6218 382/103 |
| 2017/0039731 A1* | 2/2017 | Liu | G06V 20/64 |
| 2017/0314930 A1 | 11/2017 | Monterroza et al. | |

* cited by examiner

*Primary Examiner* — Martin Mushambo
(74) *Attorney, Agent, or Firm* — Fernando & Partners, LLP

(57) ABSTRACT

In some implementations, a method includes: determining first usage patterns associated with a physical object within the physical environment; obtaining a first objective for an objective-effectuator (OE) instantiated in a computer-generated reality (CGR) environment, wherein the first objective is associated with a representation of the physical object; obtaining a first directive for the OE that limits actions for performance by the OE to achieve the first objective to the first usage patterns associated with the physical object; generating first actions, for performance by the OE, in order to achieve the first objective as limited by the first directive, wherein the first set of actions corresponds to a first subset of usage patterns from the first set of usage patterns associated with the physical object; and presenting the OE performing the first actions on the representation of the physical object overlaid on the physical environment.

23 Claims, 32 Drawing Sheets

| Physical Object Char. Vector 410A | Object Label 412A | Estimated Weight 414A | Estimated Shape 416A | Estimated Dimensions 418A | Estimated Texture 420A | Other Estimated Features 422A |
|---|---|---|---|---|---|---|

| Physical Object Char. Vector 410B | Object Label 412B | Estimated Weight 414B | Estimated Shape 416B | Estimated Dimensions 418B | Estimated Texture 420B | Other Estimated Features 422B |
|---|---|---|---|---|---|---|

Figure 4A

| Target Char. Vector 450 | CGR Label 452 | Target Weight 454 | Target Shape 456 | Target Dimensions 458 | Target Texture 460 | Other Target Features 462 |
|---|---|---|---|---|---|---|

| 802A | Object Label 804A | Coords 806A | Usage Pattern 812A |
| | | | Usage Pattern 812B |
| | | | ⋮ |
| | | | Usage Pattern 812N |
| 802B | Object Label 804B | Coords 806B | Usage Pattern 814A |
| 802C | Object Label 804C | Coords 806C | Usage Pattern 816A |
| | | | Usage Pattern 816B |

Figure 8

METHOD AND DEVICE FOR UTILIZING PHYSICAL OBJECTS AND PHYSICAL USAGE PATTERNS FOR PRESENTING VIRTUAL CONTENT

CROSS-REFERENCE TO RELATED APPLICATIONS

This application claims the benefit of U.S. Provisional Patent App. No. 62/866,126, filed on Jun. 25, 2019 and U.S. patent application Ser. No. 16/859,850, filed on Apr. 27, 2020, which are incorporated by reference their entireties.

TECHNICAL FIELD

The present disclosure generally relates to virtual content (sometimes also herein referred to herein as "computer-generated reality (CGR) content"), and in particular, to systems, methods, and devices for utilizing physical objects and physical usage patterns for presenting virtual content.

BACKGROUND

Virtual reality (VR) and augmented reality (AR) are becoming more popular due to their remarkable ability to alter a user's perception of the world. For example, VR and AR are used for learning purposes, gaming purposes, content creation purposes, social media and interaction purposes, or the like. These technologies differ in the user's perception of his/her presence. VR transposes the user into a virtual space, so their VR perception is different from his/her real-world perception. In contrast, AR takes the user's real-world perception and adds something to it.

These technologies are becoming more commonplace due to, for example, miniaturization of hardware components, improvements to hardware performance, and improvements to software efficiency. As one example, a user may experience AR content superimposed on a live video feed of the user's environment on a handheld display (e.g., an AR-enabled mobile phone or tablet with video pass-through). As another example, a user may experience AR content by wearing a near-eye system or head-mounted enclosure that still allows the user to see his/her surroundings (e.g., glasses with optical see-through). As yet another example, a user may experience VR content by using a near-eye system that encloses the user's field-of-view and is tethered to a computer.

BRIEF DESCRIPTION OF THE DRAWINGS

So that the present disclosure can be understood by those of ordinary skill in the art, a more detailed description may be had by reference to aspects of some illustrative implementations, some of which are shown in the accompanying drawings.

FIG. 4A illustrates an example data structure for physical object characterization vectors in accordance with some implementations.

FIG. 4B illustrates an example data structure for a target characterization vector in accordance with some implementations.

FIG. 8 illustrates example data structure for a usage pattern bank in accordance with some implementations.

Figure 1:
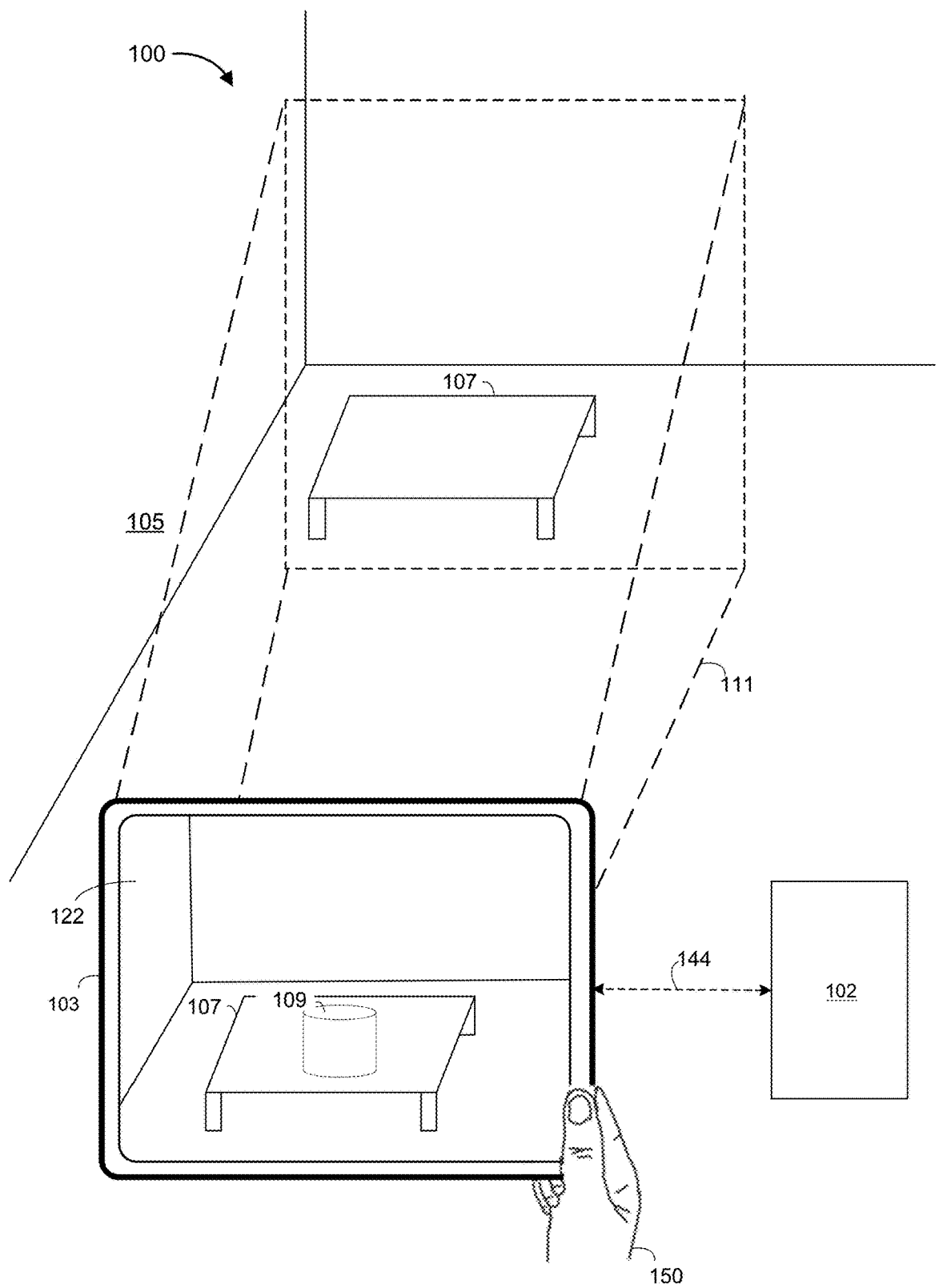
FIG. 1 is a block diagram of an example operating architecture in accordance with some implementations.

In accordance with common practice the various features illustrated in the drawings may not be drawn to scale. Accordingly, the dimensions of the various features may be arbitrarily expanded or reduced for clarity. In addition, some of the drawings may not depict all of the components of a given system, method or device. Finally, like reference numerals may be used to denote like features throughout the specification and figures.

SUMMARY

Various implementations disclosed herein include devices, systems, and methods for providing secondary semantic meaning to a physical object. According to some implementations, the method is performed at a device including one or more displays, non-transitory memory, and one or more processors coupled with the non-transitory memory. The method includes: identifying, within first image data that corresponds to a first pose of a physical environment, a target physical object associated with a set of physical features that satisfies a mapping criterion for a computer-generated reality (CGR) object; assigning a secondary semantic label to the target physical object, wherein the secondary semantic label links the target physical object to the CGR object; and generating a CGR overlay associated with the CGR object based on one or more characteristics of the target physical object.

Various implementations disclosed herein include devices, systems, and methods for generating emergency CGR content based on physical usage patterns. According to some implementations, the method is performed at a device including one or more displays, non-transitory memory, and one or more processors coupled with the non-transitory memory. The method includes: determining a first set of usage patterns associated with a first physical object that is identified within the physical environment; obtaining a first objective for an objective-effectuator (OE) instantiated in a CGR environment, wherein the first objective is associated with a first representation of the first physical object within the physical environment; obtaining a first directive for the OE that limits actions for performance by the OE to achieve the first objective to the first set of usage patterns associated with the first physical object; generating a first set of actions, for performance by the OE, in order to achieve the first objective as limited by the first directive, wherein the first set of actions corresponds to a first subset of usage patterns from the first set of usage patterns associated with the first physical object; and presenting, via the one or more displays, the CGR environment including the OE performing the first set of actions on the first representation of the first physical object overlaid on the physical environment.

In accordance with some implementations, a device includes one or more processors, a non-transitory memory, and one or more programs; the one or more programs are stored in the non-transitory memory and configured to be executed by the one or more processors and the one or more programs include instructions for performing or causing performance of any of the methods described herein. In accordance with some implementations, a non-transitory computer readable storage medium has stored therein instructions, which, when executed by one or more processors of a device, cause the device to perform or cause performance of any of the methods described herein. In accordance with some implementations, a device includes: one or more processors, a non-transitory memory, and means for performing or causing performance of any of the methods described herein.

DESCRIPTION

Numerous details are described in order to provide a thorough understanding of the example implementations shown in the drawings. However, the drawings merely show some example aspects of the present disclosure and are therefore not to be considered limiting. Those of ordinary skill in the art will appreciate that other effective aspects and/or variants do not include all of the specific details described herein. Moreover, well-known systems, methods, components, devices and circuits have not been described in exhaustive detail so as not to obscure more pertinent aspects of the example implementations described herein.

A physical environment refers to a physical world that people can sense and/or interact with without aid of electronic systems. Physical environments, such as a physical park, include physical articles, such as physical trees, physical buildings, and physical people. People can directly sense and/or interact with the physical environment, such as through sight, touch, hearing, taste, and smell.

In contrast, a computer-generated reality (CGR) environment refers to a wholly or partially simulated environment that people sense and/or interact with via an electronic system. In CGR, a subset of a person's physical motions, or representations thereof, are tracked, and, in response, one or more characteristics of one or more CGR objects simulated in the CGR environment are adjusted in a manner that comports with at least one law of physics. For example, a CGR system may detect a person's head turning and, in response, adjust graphical content and an acoustic field presented to the person in a manner similar to how such views and sounds would change in a physical environment. In some situations (e.g., for accessibility reasons), adjustments to characteristic(s) of CGR object(s) in a CGR environment may be made in response to representations of physical motions (e.g., vocal commands).

A person may sense and/or interact with a CGR object using any one of their senses, including sight, sound, touch, taste, and smell. For example, a person may sense and/or interact with audio objects that create 3D or spatial audio environment that provides the perception of point audio sources in 3D space. In another example, audio objects may enable audio transparency, which selectively incorporates ambient sounds from the physical environment with or without computer-generated audio. In some CGR environments, a person may sense and/or interact only with audio objects.

A virtual reality (VR) environment refers to a simulated environment that is designed to be based entirely on computer-generated sensory inputs for one or more senses. A VR environment comprises a plurality of virtual objects with which a person may sense and/or interact. For example, computer-generated imagery of trees, buildings, and avatars representing people are examples of virtual objects. A person may sense and/or interact with virtual objects in the VR environment through a simulation of the person's presence within the computer-generated environment, and/or through a simulation of a subset of the person's physical movements within the computer-generated environment.

In contrast to a VR environment, which is designed to be based entirely on computer-generated sensory inputs, a mixed reality (MR) environment refers to a simulated environment that is designed to incorporate sensory inputs from the physical environment, or a representation thereof, in addition to including computer-generated sensory inputs (e.g., virtual objects). On a virtuality continuum, a mixed reality environment is anywhere between, but not including, a wholly physical environment at one end and virtual reality environment at the other end.

In some MR environments, computer-generated sensory inputs may respond to changes in sensory inputs from the physical environment. Also, some electronic systems for presenting an MR environment may track location and/or orientation with respect to the physical environment to enable virtual objects to interact with real-world objects (that is, physical articles from the physical environment or representations thereof). For example, a system may account for movements so that a virtual tree appears stationery with respect to the physical ground.

An augmented reality (AR) environment refers to a simulated environment in which one or more virtual objects are superimposed over a physical environment, or a representation thereof. For example, an electronic system for presenting an AR environment may have a transparent or translucent display through which a person may directly view the physical environment. The system may be configured to present virtual objects on the transparent or translucent display, so that a person, using the system, perceives the virtual objects superimposed over the physical environment. Alternatively, a system may have an opaque display and one or more imaging sensors that capture images or video of the physical environment, which are representations of the physical environment. The system composites the images or video with virtual objects and presents the composition on the opaque display. A person, using the system, indirectly views the physical environment by way of the images or video of the physical environment, and perceives the virtual objects superimposed over the physical environment. As used herein, a video of the physical environment shown on an opaque display is called "pass-through video," meaning a system uses one or more image sensor(s)

to capture images of the physical environment and uses those images in presenting the AR environment on the opaque display. Further alternatively, a system may have a projection system that projects virtual objects into the physical environment, for example, as a hologram or on a physical surface, so that a person, using the system, perceives the virtual objects superimposed over the physical environment.

An augmented reality environment also refers to a simulated environment in which a representation of a physical environment is transformed by computer-generated sensory information. For example, in providing pass-through video, a system may transform one or more sensor images to impose a select perspective (e.g., viewpoint) different than the perspective captured by the imaging sensors. As another example, a representation of a physical environment may be transformed by graphically modifying (e.g., enlarging) portions thereof, such that the modified portion may be representative but not photorealistic versions of the originally captured images. As a further example, a representation of a physical environment may be transformed by graphically eliminating or obfuscating portions thereof.

An augmented virtuality (AV) environment refers to a simulated environment in which a virtual or computer-generated environment incorporates one or more sensory inputs from the physical environment. The sensory inputs may be representations of one or more characteristics of the physical environment. For example, an AV park may have virtual trees and virtual buildings, but people with faces photorealistically reproduced from images taken of physical people. As another example, a virtual object may adopt a shape or color of a physical article imaged by one or more imaging sensors. As a further example, a virtual object may adopt shadows consistent with the position of the sun in the physical environment.

There are many different types of electronic systems that enable a person to sense and/or interact with various CGR environments. Examples include near-eye systems, projection-based systems, heads-up displays (HUDs), vehicle windshields having integrated display capability, windows having integrated display capability, displays formed as lenses designed to be placed on a person's eyes (e.g., similar to contact lenses), headphones/earphones, speaker arrays, input systems (e.g., wearable or handheld controllers with or without haptic feedback), smartphones, tablets, and desktop/laptop computers. A near-eye system may have one or more speaker(s) and an integrated opaque display. Alternatively, a near-eye system may be configured to accept an external opaque display (e.g., a smartphone). The near-eye system may incorporate one or more imaging sensors to capture images or video of the physical environment, and/or one or more microphones to capture audio of the physical environment. Rather than an opaque display, a near-eye system may have a transparent or translucent display. The display may utilize digital light projection, micro-electromechanical systems (MEMS), digital micromirror devices (DMDs), organic light-emitting diodes (OLEDs), light-emitting diodes (LEDs), micro-light-emitting diodes (μLEDs), liquid crystal on silicon (LCoS), laser scanning light source, or any combination of these technologies. The medium may be an optical waveguide, a hologram medium, an optical combiner, an optical reflector, or any combination thereof. In one implementation, the transparent or translucent display may be configured to become opaque selectively. Projection-based systems may employ retinal projection technology that projects graphical images onto a person's retina. Projection systems also may be configured to project virtual objects into the physical environment, for example, as a hologram or on a physical surface.

FIG. 1 is a block diagram of an example operating architecture 100 in accordance with some implementations. While pertinent features are shown, those of ordinary skill in the art will appreciate from the present disclosure that various other features have not been illustrated for the sake of brevity and so as not to obscure more pertinent aspects of the example implementations disclosed herein. To that end, as a non-limiting example, the operating architecture 100 includes an optional controller 102 and an electronic device 103 (e.g., a tablet, mobile phone, laptop, wearable computing device, or the like).

In some implementations, the controller 102 is configured to manage and coordinate a CGR experience for a user 150 (sometimes also referred to herein as a "CGR environment") and zero or more other users. In some implementations, the controller 102 includes a suitable combination of software, firmware, and/or hardware. The controller 102 is described in greater detail below with respect to FIG. 14. In some implementations, the controller 102 is a computing device that is local or remote relative to the physical environment 105. For example, the controller 102 is a local server located within the physical environment 105. In another example, the controller 102 is a remote server located outside of the physical environment 105 (e.g., a cloud server, central server, etc.). In some implementations, the controller 102 is communicatively coupled with the electronic device 103 via one or more wired or wireless communication channels 144 (e.g., BLUETOOTH, IEEE 802.11x, IEEE 802.16x, IEEE 802.3x, etc.). In some implementations, the functions of the controller 102 are provided by the electronic device 103. As such, in some implementations, the components of the controller 102 are integrated into the electronic device 103.

In some implementations, the electronic device 103 is configured to present audio and/or video content to the user 150. In some implementations, the electronic device 103 is configured to present the CGR experience to the user 150. In some implementations, the electronic device 103 includes a suitable combination of software, firmware, and/or hardware. The electronic device 103 is described in greater detail below with respect to FIG. 15.

According to some implementations, the electronic device 103 presents a computer-generated reality (CGR) experience to the user 150 while the user 150 is physically present within a physical environment 105 that includes a table 107 within the field-of-view 111 of the electronic device 103. As such, in some implementations, the user 150 holds the electronic device 103 in his/her hand(s). In some implementations, while presenting the CGR experience, the electronic device 103 is configured to present CGR content (e.g., a CGR cylinder 109) and to enable video pass-through of the physical environment 105 (e.g., including the table 107) on a display 122. For example, the electronic device 103 corresponds to a mobile phone, tablet, laptop, wearable computing device, or the like.

In some implementations, the display 122 corresponds to an additive display that enables optical see-through of the physical environment 105 including the table 107. For example, the display 122 correspond to a transparent lens, and the electronic device 103 corresponds to a pair of glasses worn by the user 150. As such, in some implementations, the electronic device 103 presents a user interface by projecting the CGR content (e.g., the CGR cylinder 109) onto the additive display, which is, in turn, overlaid on the physical environment 105 from the perspective of the user 150. In some implementations, the electronic device 103 presents the user interface by displaying the CGR content (e.g., the CGR cylinder 109) on the additive display, which is, in turn, overlaid on the physical environment 105 from the perspective of the user 150.

In some implementations, the user 150 wears the electronic device 103 such as a near-eye system. As such, the electronic device 103 includes one or more displays provided to display the CGR content (e.g., a single display or one for each eye). For example, the electronic device 103 encloses the field-of-view of the user 150. In such implementations, the electronic device 103 presents the CGR environment by displaying data corresponding to the CGR environment via the one or more displays or by projecting data corresponding to the CGR environment onto the retinas of the user 150.

In some implementations, the electronic device 103 includes an integrated display (e.g., a built-in display) that displays the CGR environment. In some implementations, the electronic device 103 includes a head-mountable enclosure. In various implementations, the head-mountable enclosure includes an attachment region to which another device with a display can be attached. For example, in some implementations, the electronic device 103 can be attached to the head-mountable enclosure. In various implementations, the head-mountable enclosure is shaped to form a receptacle for receiving another device that includes a display (e.g., the electronic device 103). For example, in some implementations, the electronic device 103 slides/snaps into or otherwise attaches to the head-mountable enclosure. In some implementations, the display of the device attached to the head-mountable enclosure presents (e.g., displays) the CGR environment. In some implementations, the electronic device 103 is replaced with a CGR chamber, enclosure, or room configured to present CGR content in which the user 150 does not wear the electronic device 103.

In some implementations, the controller 102 and/or the electronic device 103 cause a CGR representation of the user 150 to move within the CGR environment based on movement information (e.g., body pose data, eye tracking data, hand tracking data, etc.) from the electronic device 103 and/or optional remote input devices within the physical environment 105. In some implementations, the optional remote input devices correspond to fixed or movable sensory equipment within the physical environment 105 (e.g., image sensors, depth sensors, infrared (IR) sensors, event cameras, microphones, etc.). In some implementations, each of the remote input devices is configured to collect/capture input data and provide the input data to the controller 102 and/or the electronic device 103 while the user 150 is physically within the physical environment 105. In some implementations, the remote input devices include microphones, and the input data includes audio data associated with the user 150 (e.g., speech samples). In some implementations, the remote input devices include image sensors (e.g., cameras), and the input data includes images of the user 150. In some implementations, the input data characterizes body poses of the user 150 at different times. In some implementations, the input data characterizes head poses of the user 150 at different times. In some implementations, the input data characterizes hand tracking information associated with the hands of the user 150 at different times. In some implementations, the input data characterizes the velocity and/or acceleration of body parts of the user 150 such as his/her hands. In some implementations, the input data indicates joint positions and/or joint orientations of the user 150. In some implementations, the remote input devices include feedback devices such as speakers, lights, or the like.

FIGS. 2A-2D illustrate an example CGR presentation scenario in accordance with some implementations. While pertinent features are shown, those of ordinary skill in the art will appreciate from the present disclosure that various other features have not been illustrated for the sake of brevity and so as not to obscure more pertinent aspects of the example implementations disclosed herein. According to some implementations, the operations and/or actions described below with reference to FIGS. 2A-2D are performed by a device such as the electronic device 103 in FIG. 1, the controller 102 in FIG. 1, or a suitable combination thereof.

Figure 2A:
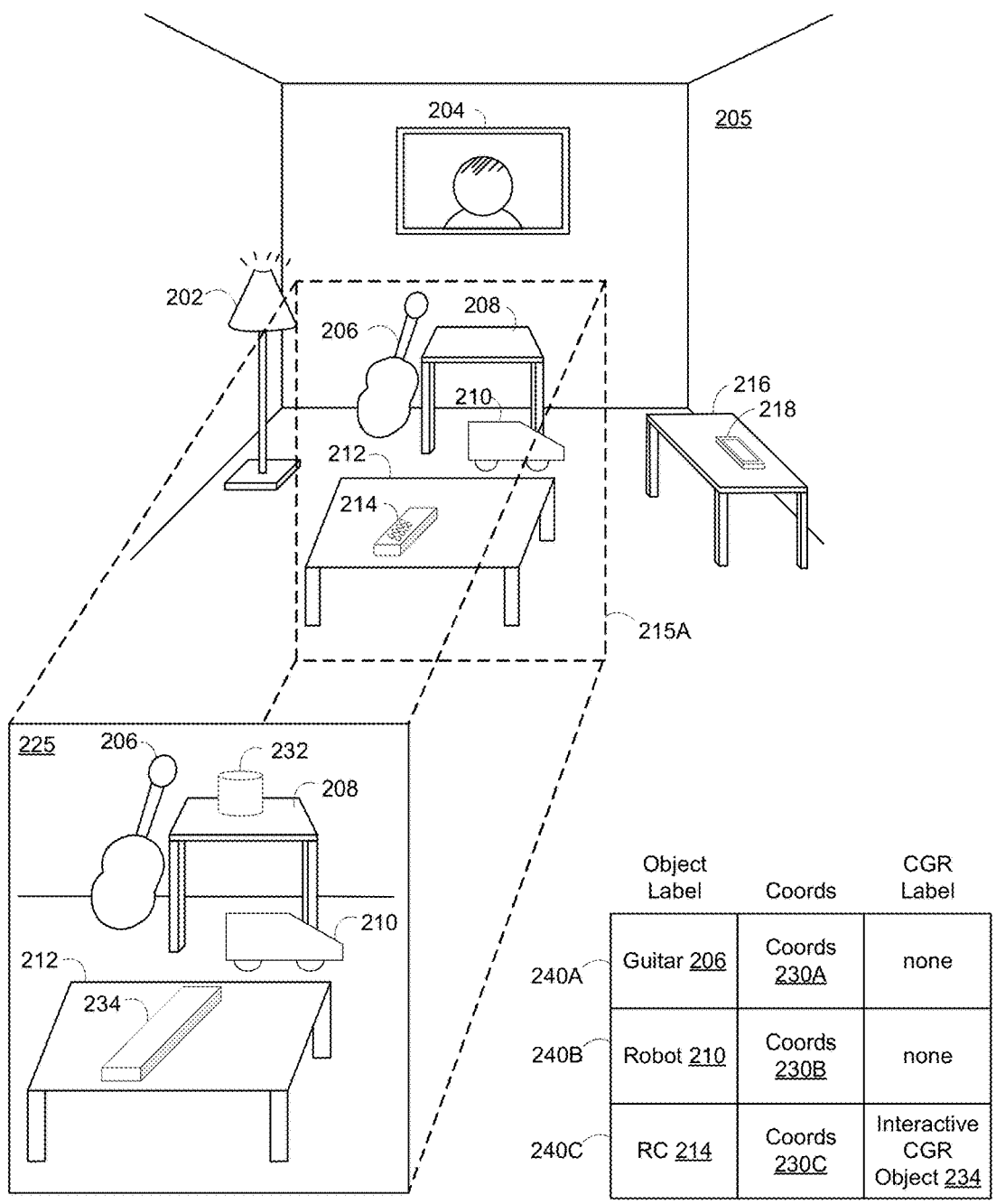
FIGS. 2A-2D illustrate an example CGR presentation scenario in accordance with some implementations.

In FIG. 2A, a physical environment 205 (e.g., a user's living room) includes a lamp 202, a television (TV) 204, a guitar 206, a buffet table 208, a robot 210, a coffee table 212, a remote control 214, a side table 216, and a mobile device 218 (e.g., a mobile phone or the like). As shown in FIG. 2A, the guitar 206, the buffet table 208, the robot 210, the coffee table 212, and the remote control 214 are within a field-of-view (FOV) 215A of the device (e.g., a first pose). In one example, the FOV 215A corresponds to a viewing area associated with an exterior-facing image sensor of the device that enables video pass-through of at least a portion of the physical environment 204. Continuing with this example, the device displays a CGR environment 225 (e.g., a user interface) that includes CGR objects 232 and 234 composited with or overlaid on video pass-through associated with the FOV 215A. For example, the CGR object 232 corresponds to a background CGR element for the CGR environment 225, and the CGR object 234 corresponds to an interactive CGR element within the CGR environment 225.

In another example, the FOV 215A corresponds to an optical viewing area associated with a transparent lens of the device that enables optical see-through of at least a portion of the physical environment 205. Continuing with this example, the device displays the CGR environment 225 by projecting or rendering the CGR objects 232 and 234 onto the transparent lens that enables optical see-through associated with the FOV 215A. As such, the user 10, for example, perceives the CGR objects 232 and 234 as being overlaid on the FOV 215A.

According to some implementations, the device performs object recognition or semantic segmentation on the physical environment 205 or a portion thereof (e.g., the FOV 215A). For example, with reference to FIG. 2A, the device identifies a candidate pool of physical objects including the guitar 206, the buffet table 208, the robot 210, the coffee table 212, and the remote control 214 the FOV 215A. In some implementations, the device filters the candidate pool to remove immovable, oversized, dangerous, blacklisted, and/or otherwise unsuitable physical objects. For example, with reference to FIG. 2A, the device removes the buffet table 208 and the coffee table 212 from the candidate pool due to their size.

In some implementations, the device populates a mapping table 250 by creating a row for each physical object in the filtered candidate pool. For example, with reference to FIG. 2A, the device creates a row 240A for the guitar 206, a row 240B for the robot 210, and a row 240C for the remote control 214. According to some implementations, the device determines coordinates for each physical object in the filtered candidate pool. For example, the coordinates correspond to absolute world coordinates such as GPS coordinates. In another example, the coordinates correspond to environment-specific coordinates relative to a coordinate system defined by the physical environment 205. For example, with reference to FIG. 2A, the device determines coordinates 230A for the guitar 206, coordinates 230B for the robot 210, and coordinates 230C for the remote control 214.

In some implementations, the device determines a set of physical features (sometimes also referred to as a physical object characterization vector) for each of the physical objects in the filtered candidate pool. This process is described in more detail below with reference to FIG. 3. Moreover, example physical object characterization vectors 410A and 420B are described in more detail below with reference to FIG. 4A.

According to some implementations, the device obtains a request to map an interactive CGR object to a physical object within a physical environment. As such, the device identifies a physical object that most closely matches the target features for the interactive CGR object (e.g., weight, length, volume, shape, texture, surface material, etc.). For example, if the interactive CGR object corresponds to a baseball bat, the device attempts to identify a physical object within the physical environment that most closely matches the baseball bat. In doing so, according to some implementations, the device identifies a physical object from the filtered candidate pool that satisfies a mapping criterion by comparing the physical object characterization vectors for the physical objects in the filtered candidate pool with a target characterization vector for the interactive CGR object.

For example, with reference to FIG. 2A, the device determines that the physical features of the remote control 214 most closely resemble or otherwise match target features of an interactive CGR object 234 (e.g., a baseball bat). As such, with continued reference to FIG. 2A, the device links the remote control 214 to the interactive CGR object 234 within the row 240C of the mapping table 250. In other words, the device assigns a secondary semantic label to the remote control 214 that links the remote control 214 to the interactive CGR object 234. The device does not link any CGR objects to the guitar 206 and the robot 210. However, one of ordinary skill in the will appreciate from the present disclosure that a first CGR object may be linked to a first physical object, a second CGR object may be linked to a second physical object, and so on.

With reference to FIG. 2A, the device displays the interactive CGR object 234 overlaid on the remote control 214 within the CGR environment 225 based on the coordinates 230C of the remote control 214. The device also displays the CGR object 232 on the buffet table 208 within the CGR environment 225. As such, for example, when induced to pick-up or otherwise interact with the interactive CGR object 234, the user will, in actuality, pick-up the remote control 214, which lends a perceived sense of weight, volume, texture, etc. to the interactive CGR object 234. Otherwise, the user may be induced to interact with a CGR object that is not associated/linked to a physical object and instead wave his/her hands through empty space.

Figure 2B:
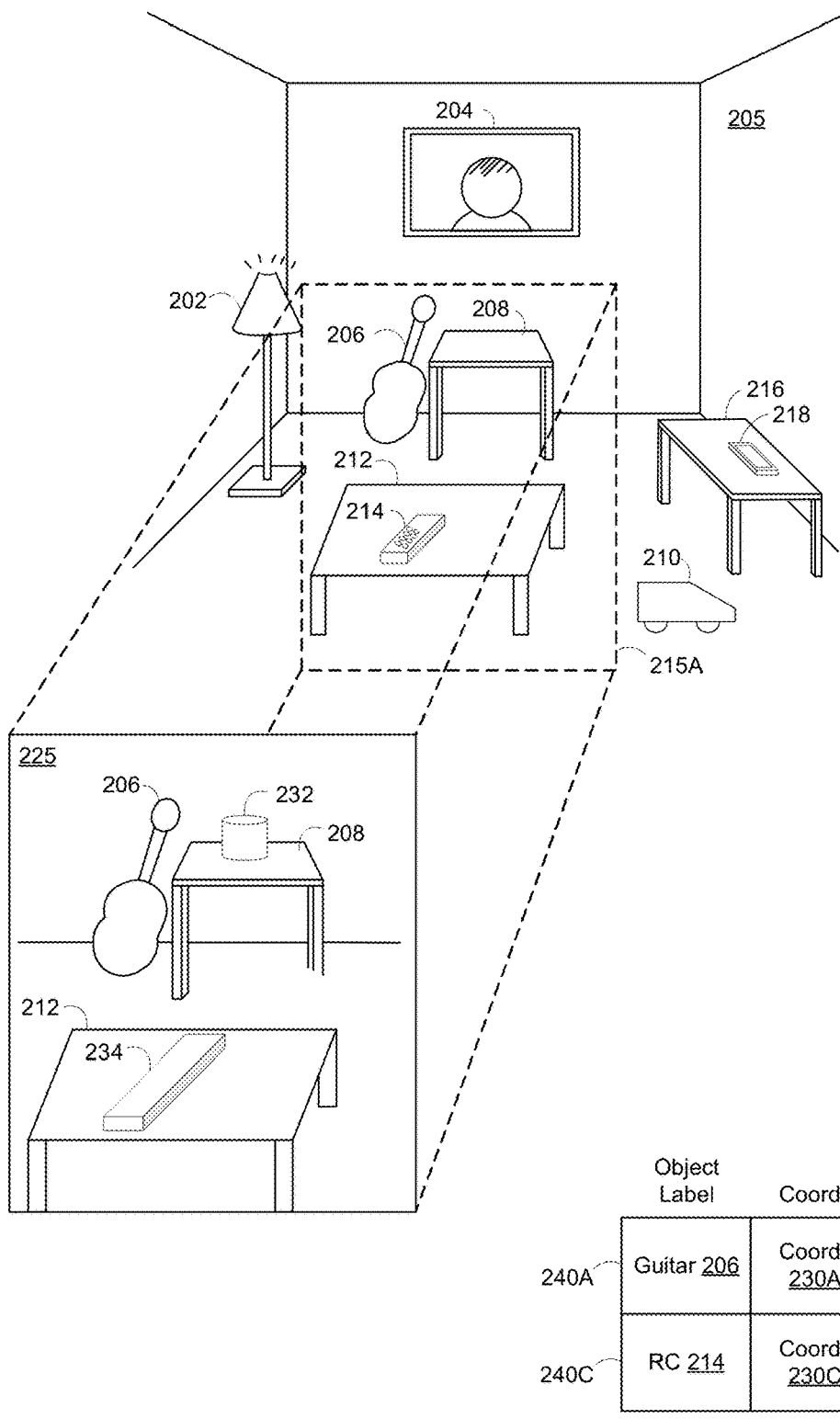

FIGS. 2A and 2B show a sequence in which the robot 210 moves outside of the FOV 215A of the device. As such, in FIG. 2B, the device removes the row 240B associated with the robot 210 from the mapping table 250 because the robot 210 is no longer recognized (visible) within the FOV 215A and was not previously linked to a CGR object.

Figure 2C:
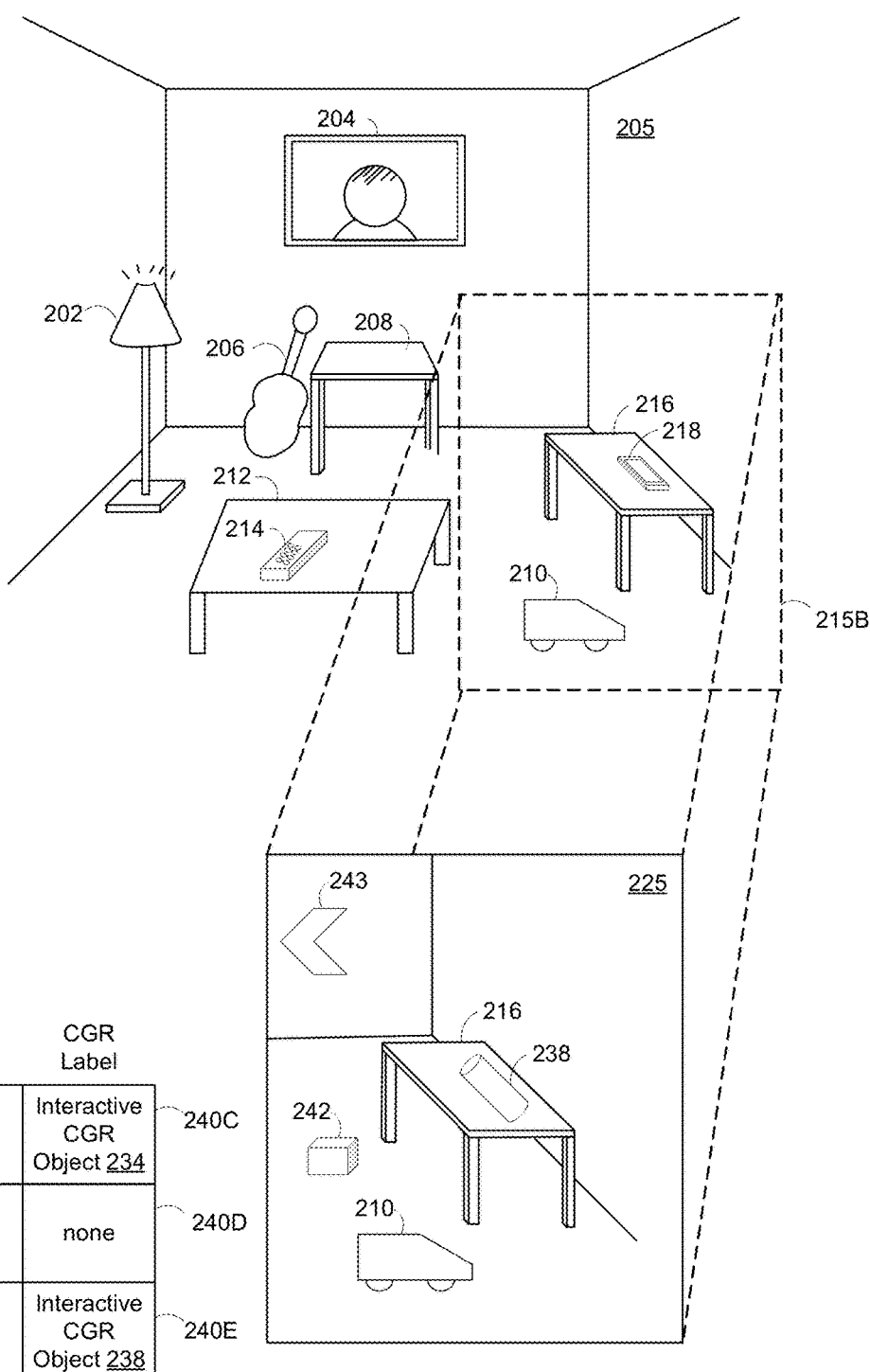

FIGS. 2B and 2C show a sequence in which the FOV of the device changes from the FOV 215A to the FOV 215B due to translational and/or rotational movement of the device. In FIG. 2C, the side table 216, the mobile device 218, and the robot 210 are within the FOV 215B of the device. The device identifies a candidate pool of physical objects including the side table 216, the mobile device 218, and the robot 210 within the FOV 215B of the device (e.g., a second pose). For example, the device removes the side table 216 from the candidate pool due to its size. For example, with continued reference to FIG. 2C, the device updates the mapping table 250 by creating a row 240D for the robot 210 and a row 240E for the mobile device 218. Continuing with this example, the device determines coordinates 230D for the robot 210 and coordinates 230E for the mobile device 218.

According to some implementations, the device maintains the row 240C within the mapping table 250 that includes the link between the remote control 214 and the interactive CGR object 234. As shown in FIG. 2C, the device displays a direction indicator 243 within the CGR environment 225 indicating the direction of the interactive CGR object 234. For example, with reference to FIG. 2C, the device determines that the physical features of the mobile device 218 most closely resemble or otherwise match target features of an interactive CGR object 238 (e.g., a rolling pin). In other words, the device assigns a secondary semantic label to the mobile device 218 that links the mobile device 218 to the interactive CGR object 238. As such, with continued reference to FIG. 2C, the device links the mobile device 218 to the interactive CGR object 238 within the row 240E of the mapping table 250. However, the device does not link any CGR objects to the robot 210.

With reference to FIG. 2C, the device displays the interactive CGR object 238 overlaid on the mobile device 218 within the CGR environment 224 based on the coordinates 230E of the mobile device 218. The device also displays the CGR object 242 within the CGR environment 225. As such, for example, when induced to pick-up or otherwise interact with the interactive CGR object 238, the user will, in actuality, pick-up the mobile device 218, which lends a perceived sense of weight, volume, texture, etc. to the interactive CGR object 238. For example, the CGR object 242 corresponds to a background CGR element for the CGR environment 225.

Figure 2D:
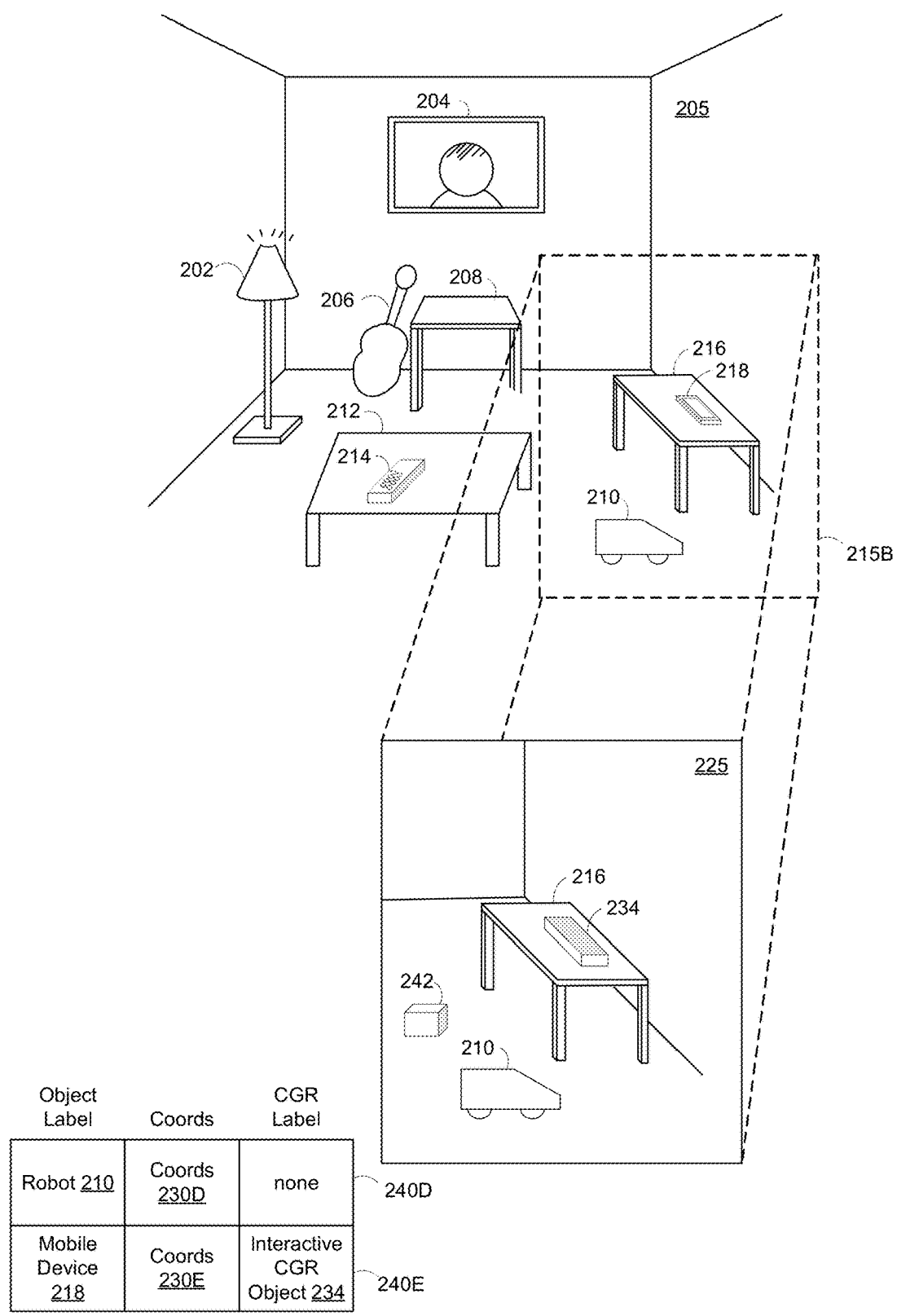

FIGS. 2B and 2D show an alternative sequence in which the FOV of the device changes from the FOV 215A to the FOV 215B due to translational and/or rotational movement of the device. FIG. 2D is similar to and adapted from FIG. 2C; as such, similar references numbers are used herein. However, FIG. 2D illustrates an alternative to FIG. 2C, and only the differences therebetween will be described below for the sake of brevity. According to some implementations, the device removes the row 240C associated with the remote control 214 from the mapping table 250 because the remote control 214 is no longer recognized (visible) within the FOV 215B. For example, with reference to FIG. 2D, the device determines that the physical features of the mobile device 218 most closely resemble or otherwise match target features of an interactive CGR object 234 (e.g., the baseball bat). In other words, the device assigns a secondary semantic label to the mobile device 218 that links the mobile device 218 to the interactive CGR object 234. As such, with continued reference to FIG. 2D, the device links the mobile device 218 to the interactive CGR object 234 within the row 240E of the mapping table 250. However, the device does not link any CGR objects to the robot 210.

With reference to FIG. 2D, the device displays the interactive CGR object 234 overlaid on the mobile device 218 within the CGR environment 225 based on the coordinates 230E of the mobile device 218. The device also displays the CGR object 242 within the CGR environment 225. As such, for example, when induced to pick-up or otherwise interact with the interactive CGR object 234, the user will, in actuality, pick-up the mobile device 218, which lends a perceived sense of weight, volume, texture, etc. to the interactive CGR object 234.

Figure 3:
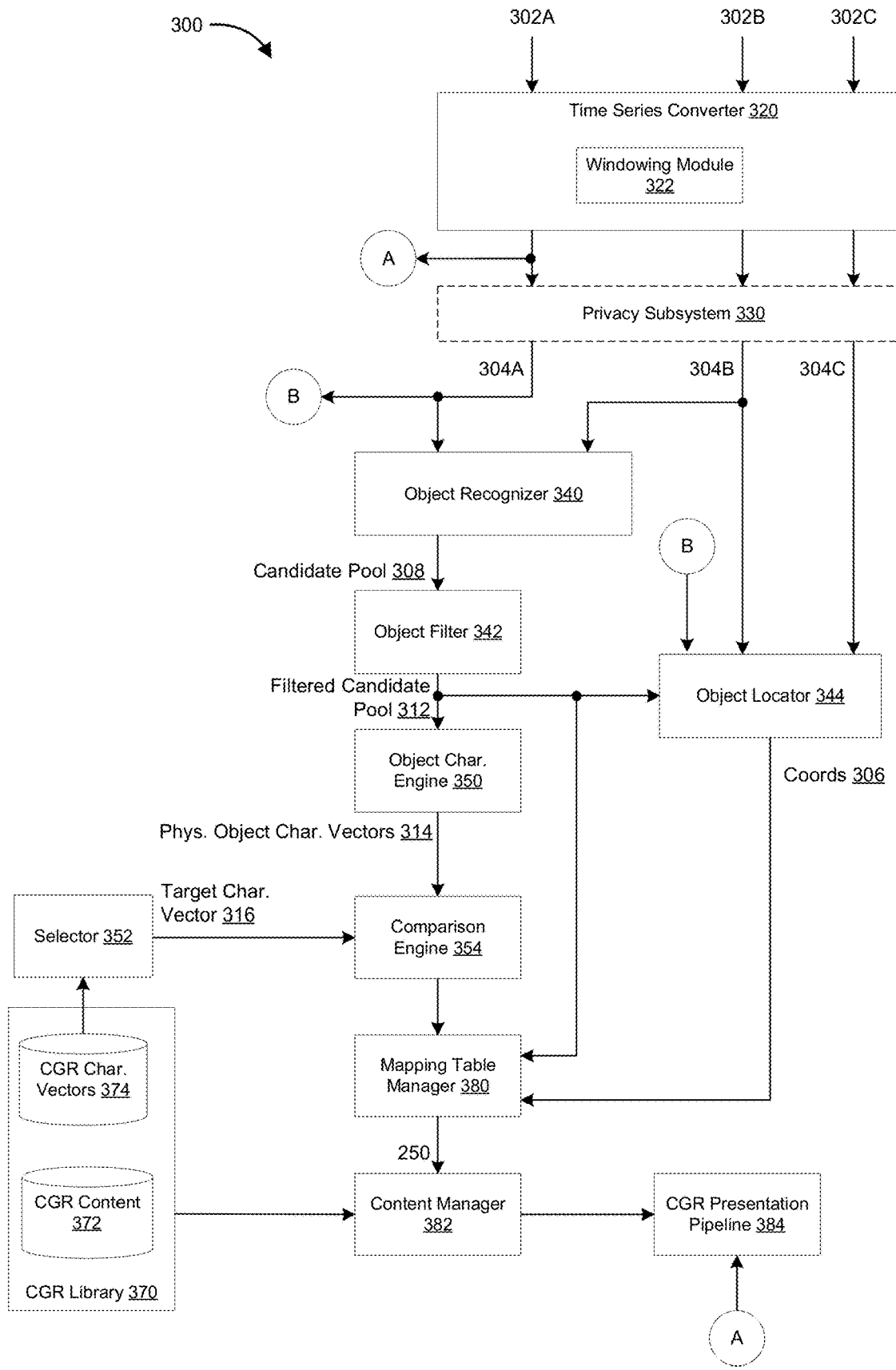
FIG. 3 illustrates an example data processing architecture in accordance with some implementations.

FIG. 3 illustrates an example data processing architecture 300 in accordance with some implementations. While pertinent features are shown, those of ordinary skill in the art will appreciate from the present disclosure that various other features have not been illustrated for the sake of brevity and so as not to obscure more pertinent aspects of the example implementations disclosed herein. In some implementations, the data processing architecture 300 (or at least a portion thereof) is included in the controller 102 shown in FIG. 1, the electronic device 103 shown in FIG. 1, or a suitable combination thereof.

As shown in FIG. 3, the data processing architecture 300 obtains input data (e.g., sensor data) associated with a plurality of modalities, including image data 302A, audio data 302B, and body pose data 302C. For example, the image data 302A corresponds to images of the physical environment 205 shown in FIGS. 2A-2D captured by one or more image sensors of the controller 102 shown in FIG. 1, the electronic device 103 shown in FIG. 1, and/or the optional remote input devices. For example, the audio data 302B corresponds to audio signals captured by one or more microphones of the controller 102 shown in FIG. 1, the electronic device 103 shown in FIG. 1, and/or the optional remote input devices. For example, the body pose data 302C corresponds to images or other sensor data captured by one or more image or other sensors of the controller 102 shown in FIG. 1, the electronic device 103 shown in FIG. 1, and/or the optional remote input devices.

According to some implementations, the image data 302A corresponds to an ongoing or continuous time series of images or values. In turn, the times series converter 320 is configured to generate one or more temporal frames of image data from a continuous stream of image data. Each temporal frame of image data includes a temporal portion of the image data 302A. In some implementations, the times series converter 320 includes a windowing module 322 that is configured to mark and separate one or more temporal frames or portions of the image data 302A for times $T_1, T_2, \ldots, T_N$. In some implementations, each temporal frame of the image data 302A is conditioned by a pre-filter or otherwise pre-processed (not shown).

According to some implementations, the audio data 302B corresponds to an ongoing or continuous time series of values. In turn, the times series converter 320 is configured to generate one or more temporal frames of audio data from a continuous stream of audio data. Each temporal frame of audio data includes a temporal portion of the audio data 302B. In some implementations, the times series converter 320 includes the windowing module 322 that is configured to mark and separate one or more temporal frames or portions of the audio data 302B for times $T_1, T_2, \ldots, T_N$.

In some implementations, each temporal frame of the audio data 302B is conditioned by a pre-filter (not shown). For example, in some implementations, pre-filtering includes band-pass filtering to isolate and/or emphasize the portion of the frequency spectrum typically associated with human speech. In some implementations, pre-filtering includes pre-emphasizing portions of one or more temporal frames of the audio data in order to adjust the spectral composition of the one or more temporal frames of the audio data 302B. Additionally and/or alternatively, in some implementations, the windowing module 322 is configured to retrieve the audio data 302B from a non-transitory memory. Additionally and/or alternatively, in some implementations, pre-filtering includes filtering the audio data 302B using a low-noise amplifier (LNA) in order to substantially set a noise floor for further processing. In some implementations, a pre-filtering LNA is arranged prior to the time series converter 320. Those of ordinary skill in the art will appreciate that numerous other pre-filtering techniques may be applied to the audio data, and those highlighted herein are merely examples of numerous pre-filtering options available.

According to some implementations, the body pose data 302C corresponds to an ongoing or continuous time series of images or values. In turn, the times series converter 320 is configured to generate one or more temporal frames of body pose data from a continuous stream of body pose data. Each temporal frame of body pose data includes a temporal portion of the body pose data 302C. In some implementations, the times series converter 320 includes the windowing module 322 that is configured to mark and separate one or more temporal frames or portions of the body pose data 302C for times $T_1, T_2, \ldots, T_N$. In some implementations, each temporal frame of the body pose data 302C is conditioned by a pre-filter or otherwise pre-processed (not shown).

In various implementations, the data processing architecture 300 includes a privacy subsystem 330 that includes one or more privacy filters associated with user information and/or identifying information (e.g., at least some portions of the image data 302A, the audio data 302B, and the body pose data 302C). In some implementations, the privacy subsystem 330 selectively prevents and/or limits the data processing architecture 300 or portions thereof from obtaining and/or transmitting the user information. To this end, the privacy subsystem 330 receives user preferences and/or selections from the user in response to prompting the user for the same. In some implementations, the privacy subsystem 330 prevents the data processing architecture 300 from obtaining and/or transmitting the user information unless and until the privacy subsystem 330 obtains informed consent from the user. In some implementations, the privacy subsystem 330 anonymizes (e.g., scrambles or obscures) certain types of user information. For example, the privacy subsystem 330 receives user inputs designating which types of user information the privacy subsystem 330 anonymizes. As another example, the privacy subsystem 330 anonymizes certain types of user information likely to include sensitive and/or identifying information, independent of user designation (e.g., automatically).

In some implementations, the object recognizer 340 is configured to recognize a candidate pool 308 of physical objects within the physical environment based on filtered image data 304A, filtered audio data 304B, and/or the like. According to some implementations, the object recognizer 340 performs semantic segmentation or another object recognition technique on the filtered image data 304A. According to some implementations, the object recognizer 340 recognizes one or more physical objects based on audio signatures identified within the filtered audio data 304B.

In some implementations, the object filter 342 filters the candidate pool 308 of physical objects to produce a filtered candidate pool 312 of physical objects. As such, the object filter 342 removes immovable, oversized, dangerous, blacklisted, and/or otherwise unsuitable physical objects from the candidate pool 308.

In some implementations, the object locator 344 is configured to determined coordinates 306 for each of the physical objects in the filtered candidate pool 312 based on the filtered image data 304A, the filtered audio data 304B, filtered body pose data 304C, and/or the like. For example, the coordinates 306 correspond to absolute world coordinates such as GPS coordinates. In another example, the coordinates 306 correspond to environment-specific coordinates relative to a coordinate system defined by the physical environment. In some implementations, the object locator 344 is also configured to track the physical objects as the device and/or the physical objects move in space.

In some implementations, an object characterization engine 350 is configured to generate a physical object characterization vector that characterizes a plurality of physical features for each of the physical objects in the filtered candidate pool 312 based on the filtered image data 304A, the filtered audio data 304B, the filtered body pose data 304C, and/or the like. In some implementations, the object characterization engine 350 generates a physical object characterization vector for a physical object within the physical environment based on known or crowd-sourced average values for one or more physical features therefor (e.g., a recognized remote control is associated with an average weight, shape, dimensions, etc.).

As shown in FIG. 4A, a physical object characterization vector 410A for a first physical object includes an object label 412A (e.g., mobile phone), an estimated weight 414A (e.g., 200 g), an estimated shape 416A (e.g., a rectangular prism), one or more estimated dimensions 418A (e.g., length=20 cm, width=8 cm, depth=1 cm), an estimated texture 420A (e.g., smooth), and one or more other estimated features 422A such as a surface material (e.g., glass) or the like. Also, as shown in FIG. 4A, a physical object characterization vector 410B for a second physical object includes an object label 412B (e.g., coffee mug), an estimated weight 414B (e.g., 175 g), an estimated shape 416B (e.g., a cylinder), one or more estimated dimensions 418B (e.g., height=20 cm, radius=5 cm), an estimated texture 420B (e.g., rough), and one or more other estimated features 422B such as a surface material (e.g., ceramic) or the like.

According to some implementations, the device determines at least some of the values or characteristics for the physical features within the physical object characterization vectors 410A and 410B based on known or crowd-sourced average values (e.g., a recognized remote control is associated with an average weight, shape, dimensions, surface material, etc.). For example, the device determines the estimated textures 420A and 420B based on the corresponding object labels (e.g., typical textures for the object type) and surface materials inferred from the image data 302A. One of ordinary skill in the art will appreciate that the physical object characterization vectors 410A and 410B are example data structures characterizing the physical features associated with physical objects that may be altered, modified, or changed in myriad ways in various other embodiments.

In some implementations, the selector 352 is configured to select a target characterization vector from the CGR characterization vectors library 374 for each of the CGR objects to be placed or mapped into the physical environment. For example, with reference to FIG. 2A, the selector 352 selects a target characterization vector 316 from the CGR characterization vectors library 374 for the interactive CGR object 234.

In some implementations, the CGR characterization vectors library 374 includes target characterization vectors for each of a plurality of CGR objects. For example, the target characterization vectors correspond to interactive CGR objects such as objects to be picked-up or otherwise used by a user. As shown in FIG. 4B, a target characterization vector 450 for a respective CGR object includes a CGR label 452 (e.g., baseball bat), a target weight 454 (e.g., 900 g), a target shape 456 (e.g., a cylinder), one or more target dimensions 458 (e.g., length=80 cm and radius=8 cm), a target texture 460 (e.g., smooth), and one or more other target features 462 (e.g., such as a surface material (e.g., wood or aluminum) or the like. One of ordinary skill in the art will appreciate that the target characterization vector 450 is an example data structures that may be altered, modified, or changed in myriad ways in various other embodiments.

In some implementations, the comparison engine 354 is configured to determine whether a physical object within the filtered candidate pool 312 satisfies a mapping criterion associated with a respective CGR object based on a comparison between the physical object characterization vectors 314 and the target characterization vector 316 associated with the respective CGR object. In other words, the comparison engine 354 identifies a physical object with physical features that most closely resembles or otherwise matches target features of the respective CGR object.

In some implementations, the mapping table manager 380 is configured to link a physical object that satisfies the mapping criterion to the respective CGR object within a mapping table 250 (e.g., the mapping table 250 shown in FIGS. 2A-2D). For example, with reference to FIG. 2A, the device links the remote control 214 to the interactive CGR object 234 within the row 240C of the mapping table 250 because the remote control 214 satisfies the mapping criterion associated with the interactive CGR object 234.

In some implementations, the CGR content manager 382 is configured to present the CGR environment via the CGR presentation pipeline 384 based on CGR content 372 from the CGR content library 370 and the mapping table 250. For example, with reference to FIG. 2A, the device displays the interactive CGR object 234 overlaid on the remote control 214 based on the coordinates 230C of the remote control 214. As such, for example, when induced to pick-up or otherwise interact with the interactive CGR object 234, the user will, in actuality, pick-up the remote control 214, which lends a perceived sense of weight, volume, texture, etc. to the interactive CGR object 234. Otherwise, the user may be induced to interact with a CGR object that is not associated/linked to a physical object and instead wave his/her hands through empty space.

Figure 5:
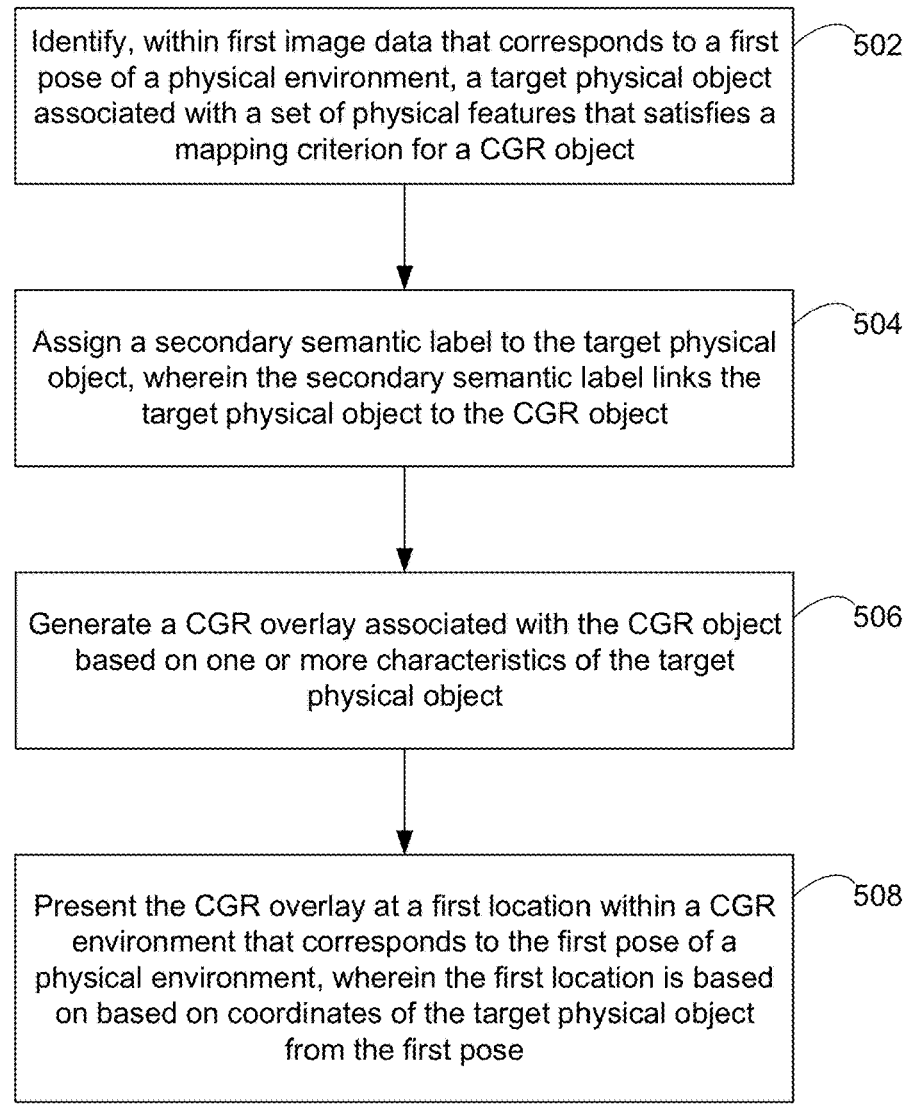
FIG. 5 is a flowchart representation of a method of providing secondary semantic meaning to a physical object in accordance with some implementations.

FIG. 5 is a flowchart representation of a method 500 of providing secondary semantic meaning to a physical object in accordance with some implementations. In various implementations, the method 500 is performed by a device with one or more processors and non-transitory memory (e.g., the controller 102 in FIG. 1, the electronic device 103 in FIG. 1, or a suitable combination thereof) or a component thereof. In some implementations, the method 500 is performed by processing logic, including hardware, firmware, software, or a combination thereof. In some implementations, the method 500 is performed by a processor executing code stored in anon-transitory computer-readable medium (e.g., a memory). In some implementations, the device corresponds to one of a near-eye system, a mobile phone, or a tablet. Some operations in method 500 are, optionally, combined and/or the order of some operations is, optionally, changed.

As described below, the method 500 provides secondary semantic meaning to a physical object. The method provides a more realistic user experience and reduces the cognitive burden on a user when interacting with CGR objects, thereby creating a more efficient human-machine interface.

As represented by block 502, the method 500 includes identifying, within first image data that corresponds to a first pose of a physical environment, a target physical object associated with a set of physical features that satisfies a mapping criterion for a CGR object. In some implementations, the set of physical features for the target physical object includes at least one of a weight, a volume, a set of dimensions (e.g., length, width, depth), a shape, a surface material, a texture, and/or the like associated with the target physical object. In some implementations, the target physical object corresponds to a real-world object in the user's physical environment such as a television (TV) remote, a mobile device, a pencil or pen, a cup, box of tissues, or the like. In some implementations, the target physical object is associated with an object identifier such as a semantic label. In some implementations, the mapping criterion corresponds to at least one of a weight range, a volume range, one or more dimensional ranges, a shape criterion, a texture criterion, a surface material criterion, or the like. In some implementations, the mapping criterion corresponds to one or more target physical attributes characterizing the CGR object such as perceived weight, volume, length, width, shape, and/or the like.

As one example, with reference to FIG. 2A, the device determines that the physical features of the remote control 214 most closely resemble or otherwise match target features of an interactive CGR object 234 (e.g., a baseball bat). As such, with continued reference to FIG. 2A, the device links the remote control 214 to the interactive CGR object 234 within the row 240C of the mapping table 250. In other words, the device assigns a secondary semantic label to the remote control 214 that links the remote control 214 to the interactive CGR object 234.

In some implementations, the method 500 includes identifying a plurality of candidate objects within the first image data, wherein each of the plurality of candidate objects is associated with a set of physical features. In some implementations, the method 500 includes filtering the plurality of candidate objects based on filter criteria. In some implementations, the filter criteria include an inferred weight criterion. In some implementations, the filter criteria include a volume or dimensional criterion. In some implementations, the filter criteria include a blacklist of objects. For example, this is to prevents some real-world physical objects, such as knives, hot pans, firearms, filled drinking ware, or other dangerous objects, from being mapped to CGR objects.

In some implementations, the method 500 includes determining the coordinates of the target physical object within the physical environment. (e.g., using SLAM, VIO, or other computer vision techniques) In some implementations, the coordinates include rotational and translational coordinates of the target physical object. In some implementations, the device also tracks the physical objects as the device moves and/or physical objects move within the physical environment based on object tracking, feature tracking, other computer vision techniques, and/or the like.

For example, with reference to FIG. 2A, the device performs object recognition or semantic segmentation on the physical environment 205 or a portion thereof (e.g., the FOV 215A). For example, with reference to FIG. 2A, the device identifies a candidate pool of physical objects including the guitar 206, the buffet table 208, the robot 210, the coffee table 212, and the remote control 214 the FOV 215A. In some implementations, the device filters the candidate pool to remove immovable, oversized, dangerous, blacklisted, and/or otherwise unsuitable physical objects. For example, with reference to FIG. 2A, the device removes the buffet table 208 and the coffee table 212 from the candidate pool due to their size.

With continued reference to FIG. 2A, the device populates a mapping table 250 by creating a row for each physical object in the filtered candidate pool. For example, with reference to FIG. 2A, the device creates a row 240A for the guitar 206, a row 240B for the robot 210, and a row 240C for the remote control 214. According to some implementations, the device determines coordinates for each physical object in the filtered candidate pool. For example, the coordinates correspond to absolute world coordinates such as GPS coordinates. In another example, the coordinates correspond to environment-specific coordinates relative to a coordinate system defined by the physical environment 205. In this example, with reference to FIG. 2A, the device determines coordinates 230A for the guitar 206, coordinates 230B for the robot 210, and coordinates 230C for the remote control 214.

In some implementations, the method 500 includes obtaining the first image data from one or more exterior-facing image sensors of the device. For example, with reference to FIG. 2A, the guitar 206, the buffet table 208, the robot 210, the coffee table 212, and the remote control 214 are within the FOV 215A of the device (e.g., a first pose associated with the first image data). In one example, the FOV 215A corresponds to a viewing area associated with an exterior-facing image sensor of the device that enables video pass-through of at least a portion of the physical environment 204. Continuing with this example, the device displays a CGR environment 225 (e.g., a user interface) that includes CGR objects 232 and 234 composited with or overlaid on video pass-through associated with the FOV 215A.

In another example, the FOV 215A in FIG. 2A corresponds to an optical viewing area associated with a transparent lens of the device that enables optical see-through of at least a portion of the physical environment 205. Continuing with this example, the device displays the CGR environment 225 by projecting or rendering the CGR objects 232 and 234 onto the transparent lens that enables optical see-through associated with the FOV 215A. As such, the user 10, for example, perceives the CGR objects 232 and 234 as being overlaid on the FOV 215A.

As represented by block 504, the method 500 includes assigning a secondary semantic label to the target physical object, wherein the secondary semantic label links the target physical object to the CGR object. For example, a semantic or object identifier for the target physical object is linked to a CGR identifier for the CGR object within a mapping table. In other words, as one example, the device links a non-analogous real-world broom handle to a CGR sword hilt. As such, in this example, when induced to pick-up or otherwise interact with the CGR sword hilt, the user will, in actuality, pick-up the non-analogous real-world broom handle, which lends a perceived sense of weight, volume, texture, etc. to the CGR sword hilt. Otherwise, the user may be induced to interact with the CGR sword hilt that is not associated/linked to a physical object and instead wave his/her hands through empty space.

As one example, with reference to FIG. 2A, the device obtains a request to map an interactive CGR object to a physical object within a physical environment. As such, the device identifies a physical object that most closely matches the target features for the interactive CGR object (e.g., weight, length, volume, shape, texture, surface material, etc.). For example, if the interactive CGR object corresponds to a baseball bat, the device attempts to identify a physical object within the physical environment that most closely matches the baseball bat. In doing so, according to some implementations, the device identifies a physical object from the filtered candidate pool that satisfies a mapping criterion by comparing the physical object characterization vectors for the physical objects in the filtered candidate pool with a target characterization vector for the interactive CGR object.

Continuing with this example, with reference to FIG. 2A, the device determines that the physical features of the remote control 214 most closely resemble or otherwise match target features of an interactive CGR object 234 (e.g., a baseball bat). As such, with continued reference to FIG. 2A, the device links the remote control 214 to the interactive CGR object 234 within the row 240C of the mapping table 250. In other words, the device assigns a secondary semantic label to the remote control 214 that links the remote control 214 to the interactive CGR object 234. The device does not link any CGR objects to the guitar 206 and the robot 210. However, one of ordinary skill in the will appreciate from the present disclosure that a first CGR object may be linked to a first physical object, a second CGR object may be linked to a second physical object, and so on, As represented by block 506, the method 500 includes generating a CGR overlay associated with the CGR object based on one or more characteristics of the target physical object. For example, with reference to FIG. 2A, the device generates a CGR overlay based on the physical features of the remote control 214 such that the interactive CGR object 234 is overlaid on the remote control 214 within the CGR environment 225 based on the coordinates 230C of the remote control 214.

In some implementations, generating the CGR overlay associated with the CGR object includes modifying the CGR object based on the set of physical features associated with the target physical object, wherein the set of physical features corresponds to the characteristics of the target physical object. For example, the device modifies a reference model for the CGR object based on the size, shape, volume, etc. of the target physical object.

In some implementations, generating the CGR overlay associated with the CGR object includes modifying the CGR object based on rotational and translational coordinates of the target physical object within the physical environment, wherein the rotational and translational coordinates of the target physical object correspond to the characteristics of the target physical object. For example, the device modifies a reference model based on the translational and rotational coordinates of the target physical object. In other words, the device aligns the CGR overlay with the orientation of the target physical object such that when the user perceives picking up the CGR object, he/she is actually picking-up the target physical object.

As represented by block 508, the method 500 includes presenting the CGR overlay at a first location within a CGR environment that corresponds to the first pose of a physical environment, wherein the first location is based on coordinates of the target physical object from the first pose. For example, with reference to FIG. 2A, the device displays the interactive CGR object 234 overlaid on the remote control 214 within the CGR environment 225 based on the coordinates 230C of the remote control 214.

In some implementations, the CGR environment corresponds to a composite of the CGR overlay and pass-through image data associated with the first pose of a physical environment. For example, the CGR object is overlaid on or composited with the target physical object that is within the FOV of the device. In another example, the CGR overlay is projected onto the user's retina.

In some implementations, the method 500 includes: detecting a user interaction associated with the CGR overlay; and modifying the CGR overlay based the user interaction. For example, the device detects a user interaction with the CGR object that corresponds to picking-up the CGR object. Continuing with this example, in response to detecting the user interaction, the device modifies the CGR overlay so that the CGR overlay is displayed within the user's hands or a representation thereof. As such, in one example, the device composites the CGR overlay with the user's hands so that the user perceives the CGR object within his/her hands.

In some implementations, the method 500 includes: detecting a change from the first pose of the physical environment to a second pose of the physical environment, wherein second image data associated with the second pose of the physical environment does not include the target physical object.

In some implementations, the method 500 includes, after detecting the change from the first pose to the second pose: maintaining the secondary semantic label between the target physical object and the CGR object; and displaying a user interface element indicating a location of the CGR object relative to the second pose of the physical environment. As one example, FIGS. 2B and 2C show a sequence in which the FOV of the device changes from the FOV 215A (e.g., the first pose) to the FOV 215B (e.g., the second pose) due to translational and/or rotational movement of the device. Continuing with this example, the device maintains the row 240C within the mapping table 250 that includes the link between the remote control 214 and the interactive CGR object 234. As shown in FIG. 2C, the device displays a direction indicator 243 within the CGR environment 225 indicating the direction of the interactive CGR object 234. According to some implementations, once a secondary semantic label for the CGR object has been assigned to a target physical object, the linkage is sticky across space and time. In other words, the linkage remains even if the target physical object is no longer in the FOV of the device.

In some implementations, the method 500 includes, after detecting the change from the change from the first pose to the second pose: identifying, within the second image data that corresponds to the second pose of a physical environment, a second target physical object associated with a set of physical features that satisfies the mapping criterion for the CGR object within the CGR environment; determining coordinates of the second target physical object within the second pose of the physical environment; removing the secondary semantic label link between the target physical object and the CGR object; generating a second secondary semantic label between the second target physical object and the CGR object; and generating a second CGR overlay associated with the CGR object at a second location based on the coordinates of the second target physical object from the second pose. As one example, FIGS. 2B and 2D show a sequence in which the FOV of the device changes from the FOV 215A (e.g., the first pose) to the FOV 215B (e.g., the second pose) due to translational and/or rotational movement of the device. Continuing with this example, the device removes the row 240C associated with the remote control 214 from the mapping table 250 because the remote control 214 is no longer recognized (visible) within the FOV 215B. For example, with reference to FIG. 2D, the device determines that the physical features of the mobile device 218 most closely resemble or otherwise match target features of an interactive CGR object 234 (e.g., the baseball bat). In other words, the device assigns a secondary semantic label to the mobile device 218 that links the mobile device 218 to the interactive CGR object 234. As such, with continued reference to FIG. 2D, the device links the mobile device 218 to the interactive CGR object 234 within the row 240E of the mapping table 250. According to some implementations, linkages between CGR objects and physical objects are not sticky across space and time. In other words, the linkage is removed once the target physical object is no longer in the FOV of the device.

It should be understood that the particular order in which the operations in FIG. 5 have been described is merely example and is not intended to indicate that the described order is the only order in which the operations could be performed. One of ordinary skill in the art would recognize various ways to reorder the operations described herein. Additionally, it should be noted that details of other processes described herein with respect to other methods described herein (e.g., the method 1300) are also applicable in an analogous manner to method 500 described above with respect to FIG. 5. For example, the physical objects, physical environment, CGR objects, and CGR environment described above with reference to method 500 optionally have one or more of the characteristics of the physical objects, physical environment, CGR objects, and CGR environment described herein with reference to other methods described herein (e.g., the method 1300). For brevity, these details are not repeated here.

FIGS. 6A-6H illustrate an example usage scenario in accordance with some implementations. While pertinent features are shown, those of ordinary skill in the art will appreciate from the present disclosure that various other features have not been illustrated for the sake of brevity and so as not to obscure more pertinent aspects of the example implementations disclosed herein. According to some implementations, the operations and/or actions described below with reference to 6A-6H are performed by a device such as the electronic device 103 in FIGS. 1 and 9; the controller 102 in FIGS. 1 and 9; optional remote input devices 170A and 170B within the physical environment 600; or a suitable combination thereof. According to some implementations, the usage scenario described in FIGS. 6A-6H proceeds after receiving fully informed consent from the user 10.

As shown in FIGS. 6A-6H, the usage scenario shows a user 10 interacting with physical objects in a physical environment 600 (e.g., a kitchen). As such, the device (and/or one or more optional remote input devices 170A and 170B within the physical environment 600) monitors the usage of various physical objects within the physical environment 600 by at least the optional remote input devices. According to some implementations, the device determines one or more usage patterns with each of the physical objects within the physical environment 600 based on actions of the user 10 thereupon and also based on the locations/coordinates of the physical objects during the actions. As shown in FIGS. 6A-6H, the physical environment 600 includes a set of cabinets 612, a countertop 614, a refrigerator 616, an island 618 with a sink, a coffee maker 622, and a stack of plates 624 on the island 618.

Figure 6A:
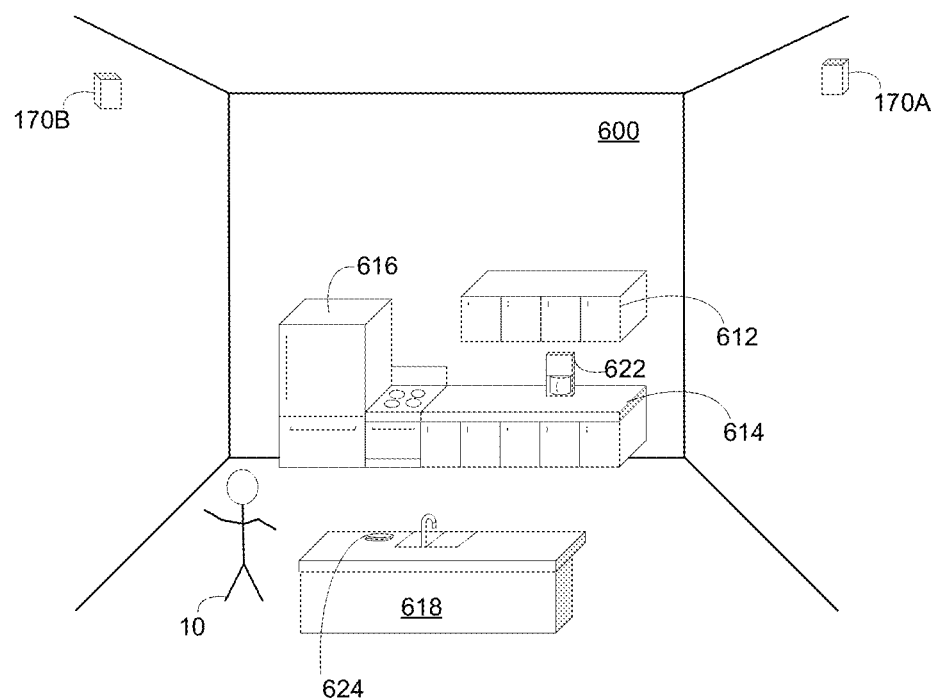
FIGS. 6A-6H illustrate an example usage scenario in accordance with some implementations.
Figure 6B:
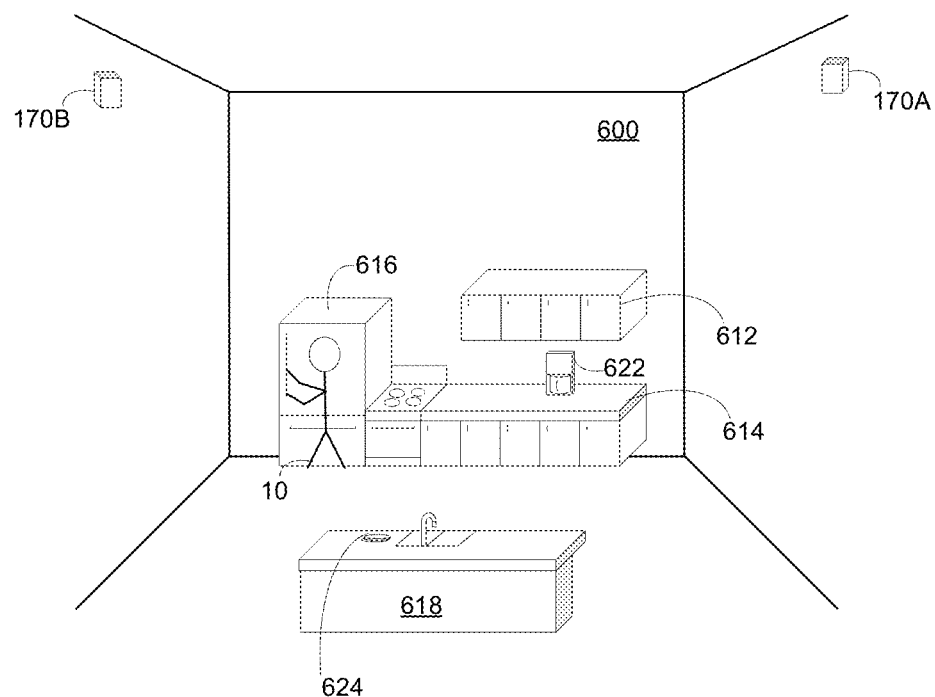
Figure 6C:
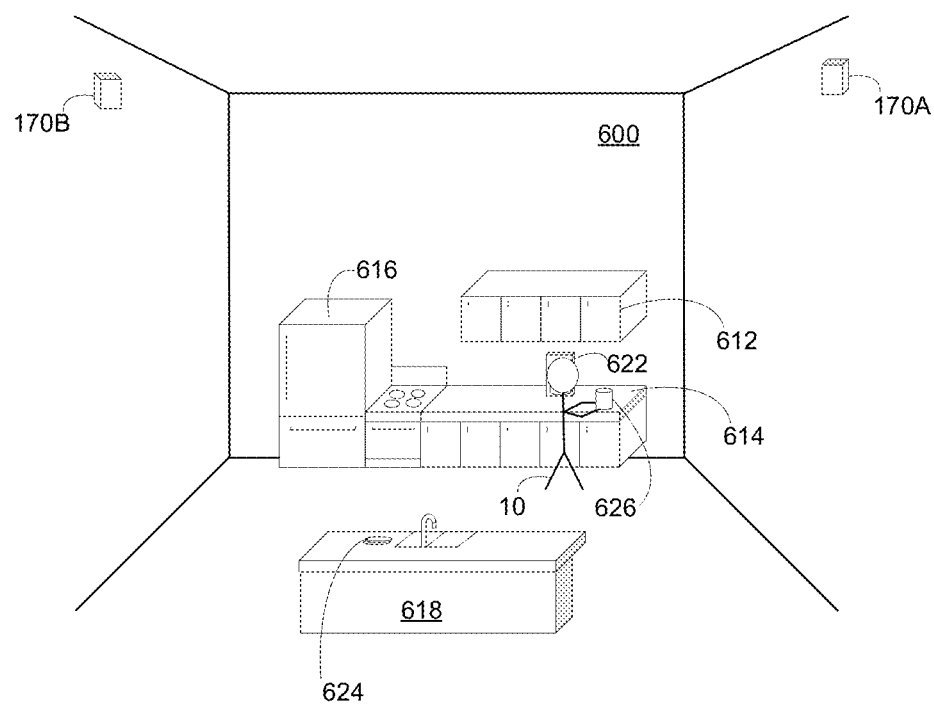
Figure 6D:
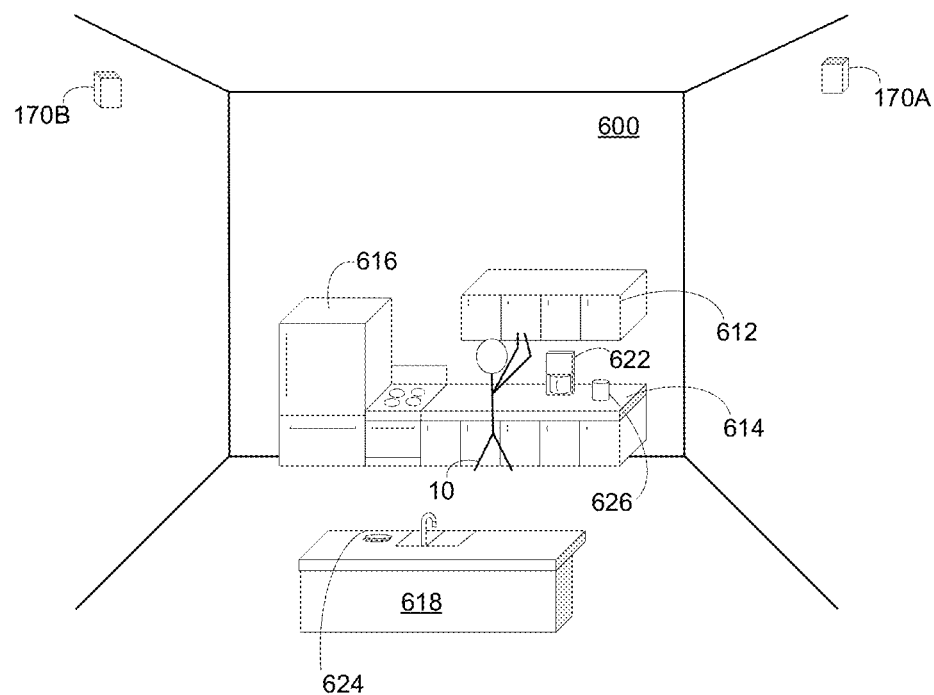
Figure 6E:
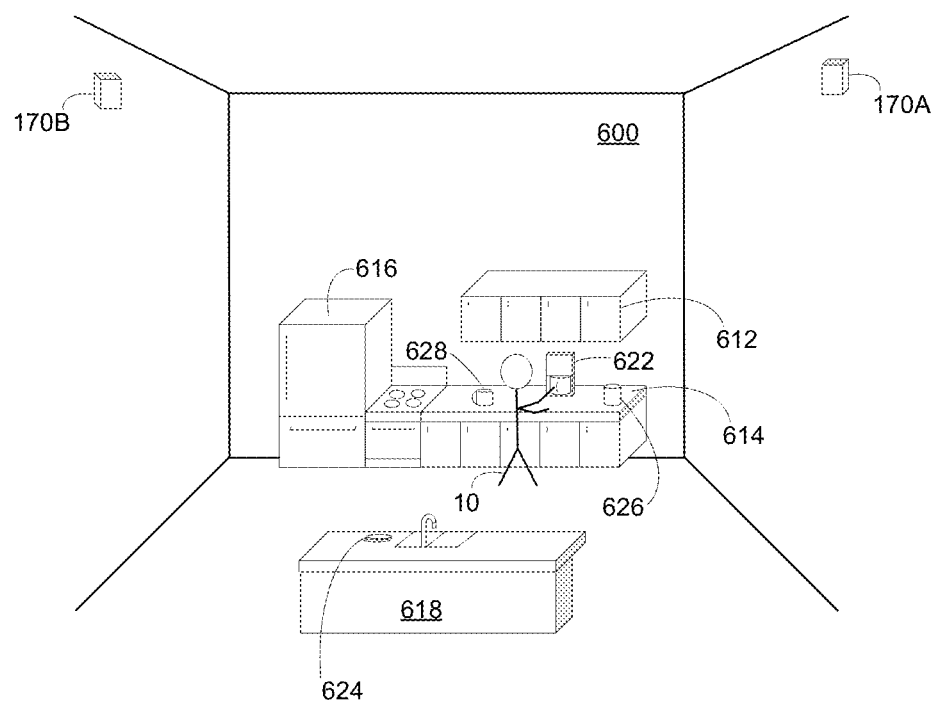
Figure 6F:
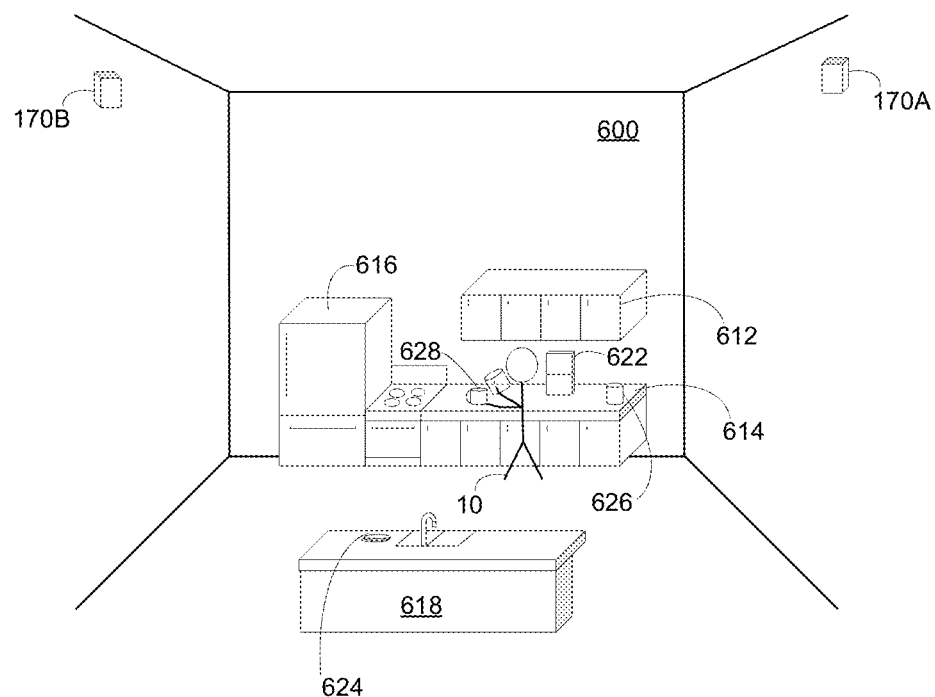
Figure 6G:
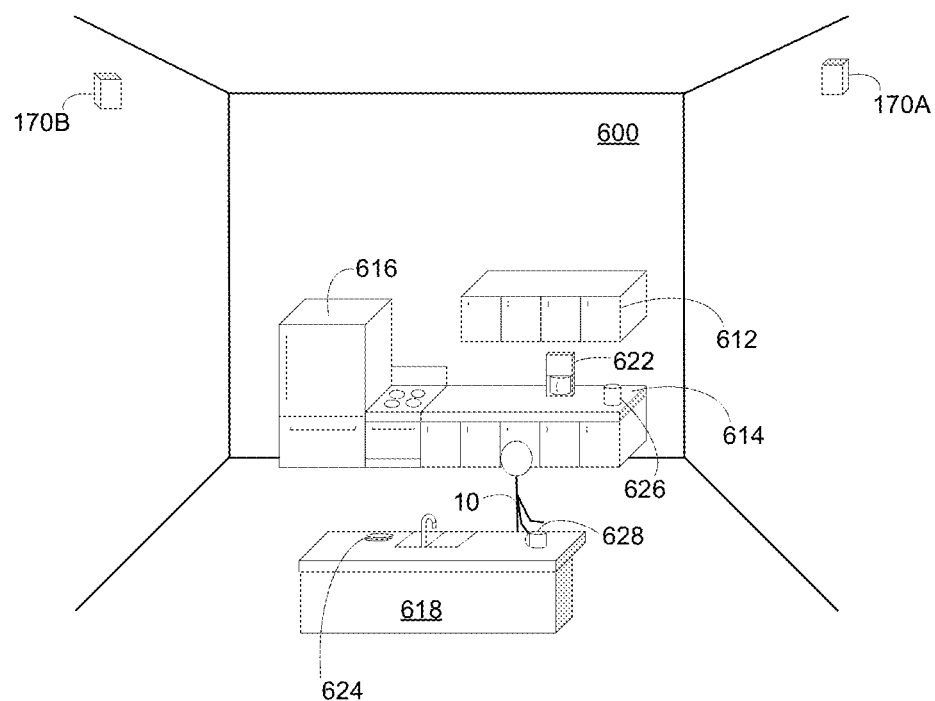
Figure 6H:
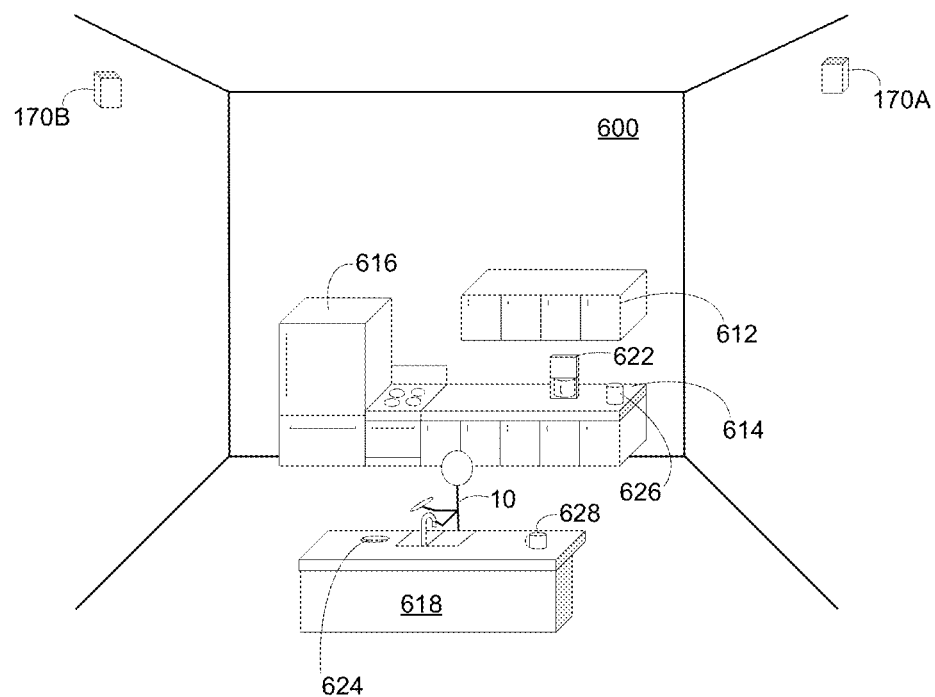

FIGS. 6A and 6B show a sequence in which the user 10 walks to the refrigerator 616. FIGS. 6B-6D show a sequence in which the user 10 opens the refrigerator 616 and places an item 626 retrieved from the refrigerator 616 on the countertop 614. FIGS. 6D and 6E show a sequence in which the user 10 removes a coffee mug 628 from the set of cabinets 612 and places the coffee mug 628 on the countertop 614. FIGS. 6E and 6F show a sequence in which the user 10 pours coffee from the coffee maker 622 (or a carafe therefrom) into the coffee mug 628. FIGS. 6F and 6G show a sequence in which the user 10 places the coffee mug 628 on the island 618. FIGS. 6G and 6H show a sequence in which the user 10 picks up a plate from the stack of plates 624 and begins to wash the plate.

As such, as one example, the device determines one or more usage patterns associated with the refrigerator 616 such as opening a door thereof and removing an item 626. As another example, the device also determines a plurality of usage patterns associated with the coffee mug 628 including removing the coffee mug 628 from the set of cabinets 612, pouring coffee from the coffee maker 622 into the coffee mug 628, drinking from the coffee mug 628, and placing the coffee mug 628 on the island 618. As yet another example, the device also determines a usage pattern associated with the stack of plates 624 including picking up and washing a plate from the stack of plates 624 in the sink within the island 618.

Figure 7A:
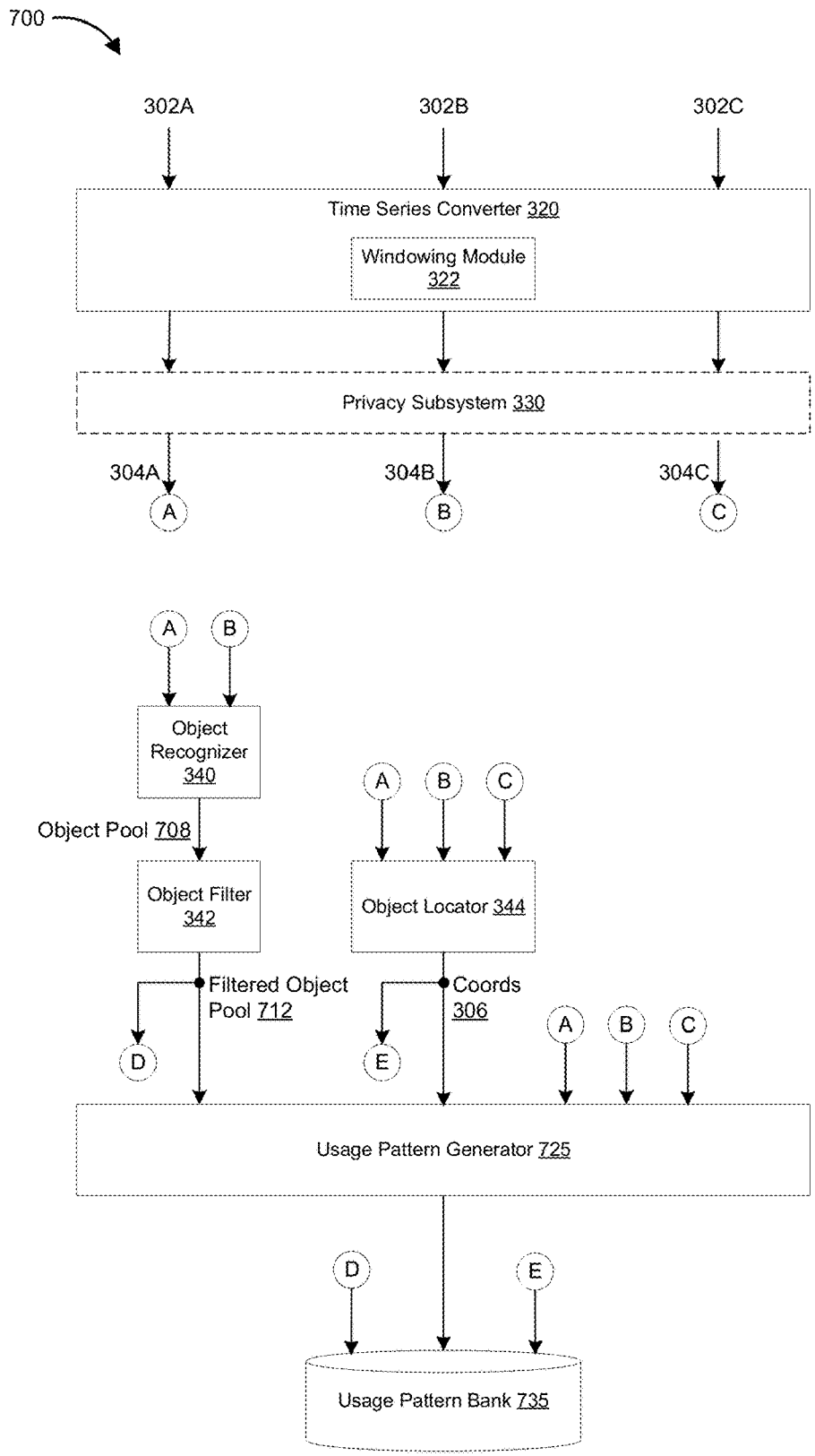
FIG. 7A illustrates an example data processing architecture in accordance with some implementations.

FIG. 7A illustrates an example data processing architecture 700 in accordance with some implementations. While pertinent features are shown, those of ordinary skill in the art will appreciate from the present disclosure that various other features have not been illustrated for the sake of brevity and so as not to obscure more pertinent aspects of the example implementations disclosed herein. In some implementations, the data processing architecture 700 (or at least a portion thereof) is included in the electronic device 103 in FIGS. 1 and 9; the controller 102 in FIGS. 1 and 9; or a suitable combination thereof.

FIG. 7A is similar to and adapted from FIG. 3; as such, similar references numbers are used herein. Therefore, only the differences between FIGS. 3 and 7 will be described below for the sake of brevity. As shown in FIG. 7A, the data processing architecture 700 obtains input data associated with a plurality of modalities, including image data 302A, audio data 302B, and body pose data 302C. In various implementations, the data processing architecture 700 includes the privacy subsystem 330 that includes one or more privacy filters associated with user information and/or identifying information (e.g., at least some portions of the image data 302A, the audio data 302B, and the body pose data 302C).

In some implementations, the object recognizer 340 is configured to recognize and identify an object pool 708 of physical objects within the physical environment based on filtered image data 304A, filtered audio data 304B, and/or the like. According to some implementations, the object recognizer 340 performs semantic segmentation or another object recognition technique on the filtered image data 304A. According to some implementations, the object recognizer 340 recognizes one or more physical objects based on audio signatures identified within the filtered audio data 304B.

In some implementations, the object filter 342 filters the object pool 708 of physical objects to produce a filtered object pool 712 of physical objects. As such, the object filter 342 removes dangerous, blacklisted, and/or otherwise unsuitable physical objects from the object pool 708.

In some implementations, the object locator 344 is configured to determine coordinates 306 for each of the physical objects in the filtered object pool 712 based on the filtered image data 304A, the filtered audio data 304B, filtered body pose data 304C, and/or the like. For example, the coordinates 306 correspond to absolute world coordinates such as GPS coordinates. In another example, the coordinates 306 correspond to environment-specific coordinates relative to a coordinate system defined by the physical environment. In some implementations, the object locator 344 is also configured to track the physical objects as the device and/or the physical objects move in space.

In some implementations, a usage pattern generator 725 is configured to generate one or more usage patterns for at least one physical object in the filtered object pool 712 based on the coordinates 306 of the physical objects in the filtered object pool 712, the filtered image data 304A, the filtered audio data 304B, the filtered body pose data 304C, and/or the like. In some implementations, the usage pattern generator 725 is also configured to store the one or more usage patterns for at least the one physical object in the filtered object pool 712 in association with the respective coordinates 306 therefor in a usage pattern bank 735.

As shown in FIG. 8, the usage pattern bank 735 includes a first entry 802A for a first physical object that includes a first object label 804A (e.g., coffee mug), a set of coordinates 806A associated with the first physical object (e.g., a current location), and a plurality of usage patterns 812A, 812B, . . . , 812N therefor (sometimes referred to collectively herein as the plurality of usage pattern 812). According to some implementations, each of the plurality of usage pattern 812 is associated with a frequency value and a set of coordinates during. As such, for example, a usage pattern associated with drinking from a coffee mug may be associated with a high frequency value and also include common coordinates at which the action occurs (e.g., standing behind a countertop, sitting at a table, etc.).

With reference to FIGS. 6A-6H, for example, the device identifies a plurality of usage patterns with respect to the coffee mug 628 including removing the coffee mug 628 from the set of cabinets 612, pouring coffee from the coffee maker 622 into the coffee mug 628, drinking from the coffee mug 628, and placing the coffee mug 628 on the island 618. The usage pattern bank 735 also includes a second entry 802B for a second physical object including a second object label 804B (e.g., refrigerator), a set of coordinates 806A associated with the second physical object, and a usage pattern 814A therefor. With reference to FIGS. 6A-6H, for example, the device identifies a single usage pattern with respect to the refrigerator 616 such as opening a door thereof and removing an item 626. The usage pattern bank 735 also includes a third entry 802C for a third physical object including a third object label 804C (e.g., a set of plates), a set of coordinates 806C associated with the third physical object, and usage patterns 816A and 816B therefor. With reference to FIGS. 6A-6H, for example, the device identifies two usage patterns with respect to the stack of plates 624 including picking up and washing a plate from the stack of plates 624 in the sink within the island 618.

Figure 7B:
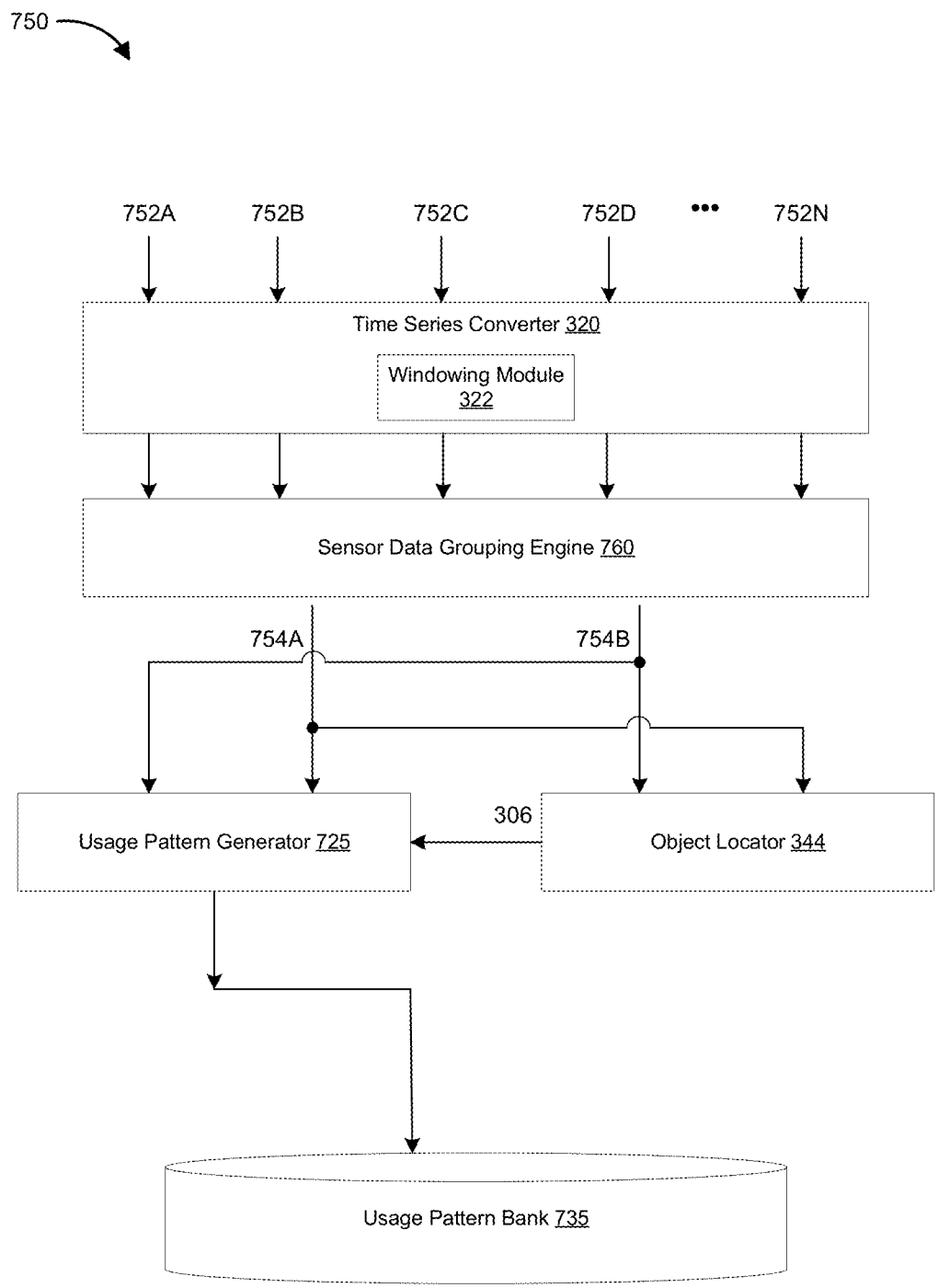
FIG. 7B illustrates another example data processing architecture in accordance with some implementations.

FIG. 7B illustrates an example data processing architecture 750 in accordance with some implementations. While pertinent features are shown, those of ordinary skill in the art will appreciate from the present disclosure that various other features have not been illustrated for the sake of brevity and so as not to obscure more pertinent aspects of the example implementations disclosed herein. In some implementations, the data processing architecture 750 (or at least a portion thereof) is included in the electronic device 103 in FIGS. 1 and 9; the controller 102 in FIGS. 1 and 9; or a suitable combination thereof.

As shown in FIG. 7B, the data processing architecture 750 obtains sensor data 752A, 752B, 752C, 752D, . . . , 752N (sometimes collectively referred to herein as "the sensor data 752") from a plurality of sensors associated with physical objects within a physical environment. According to some implementations, sensor data 752 corresponds to data from at least one of an accelerometer, an IMU, an infrared sensor, an ambient light sensor, a motion sensor, a gyroscope, a microphone, an image sensor, a thermometer, a barometer, and/or the alike. In some implementations, a physical object may have a plurality of sensors located thereon or integrated therein. In some implementations, a physical object may have a single sensor located thereon or integrated therein. In some implementations, the controller 102 shown in FIG. 1, the electronic device 103 shown in FIG. 1, or a suitable combination thereof obtains and processes the sensor data 752.

According to some implementations, the sensor data 752 corresponds to an ongoing or continuous time series of values. In turn, the times series converter 320 is configured to generate one or more temporal frames of sensor data from a continuous stream of sensor data. Each temporal frame of sensor data includes a temporal portion of the sensor data 752. In some implementations, the times series converter 320 includes the windowing module 322 that is configured to mark and separate one or more temporal frames or portions of the sensor data 752 for times $T_1, T_2, \ldots, T_N$. In some implementations, each temporal frame of the sensor data 752 is conditioned by a pre-filter or otherwise pre-processed (not shown).

In some implementations, the sensor data grouping engine 760 groups sensor data 752 on a per-physical object basis. Thus, the sensor data grouping engine 760 discriminates the sensor data 752 based on its origin. In some implementations, each packet or portion of sensor data 752 includes identification information tying the packet or portion to a particular physical object. For example, with reference to FIGS. 6A-6H, one or more sensors are located on or integrated with the coffee mug 628, and the sensor data grouping engine 760 groups the sensor data 752 therefrom into a sensor data grouping 754A. As another example, with continued reference to FIGS. 6A-6H, one or more sensors are located on or integrated with the coffee maker 622 (and the components thereof including a carafe and filter basket), and the sensor data grouping engine 760 groups the sensor data 752 therefrom into a sensor data grouping 754B. One of ordinary skill in the art will appreciate that an arbitrary number of sensor data groupings may be generated by the sensor data grouping engine 760.

In some implementations, the object locator 344 is configured to determine coordinates 306 for a first physical object based on the sensor data grouping 754A and a second physical object based on the sensor data grouping 754B. For example, the coordinates 306 correspond to absolute world coordinates such as GPS coordinates. In another example, the coordinates 306 correspond to environment-specific coordinates relative to a coordinate system defined by the physical environment. In some implementations, the object locator 344 is also configured to track the physical objects as the device and/or the physical objects move in space.

In some implementations, the usage pattern generator 725 is configured to generate one or more usage patterns for a first physical object associated with the sensor data grouping 754A and one or more usage patterns for a second physical object associated with the sensor data grouping 754B. As one example, with reference to FIGS. 6A-6H, the usage pattern generator 725 make be able to infer a usage pattern associated with drinking from the coffee mug 628 when the sensor data grouping 754A indicates a sequence of movements, orientations, and/or the like that corresponds to a drinking motion. In some implementations, the usage pattern generator 725 is also configured to store the one or more usage patterns for the physical objects in association with the respective coordinates 306 therefor in a usage pattern bank 735. One of ordinary skill in the art will appreciate how some portions of the data processing architectures 700 and 750 may be combined to generate one or more usage patterns based on the image data 302A, the audio data 302B, the body pose data 302C, the sensor data 752, and/or the like in various other implementations.

Figure 9:
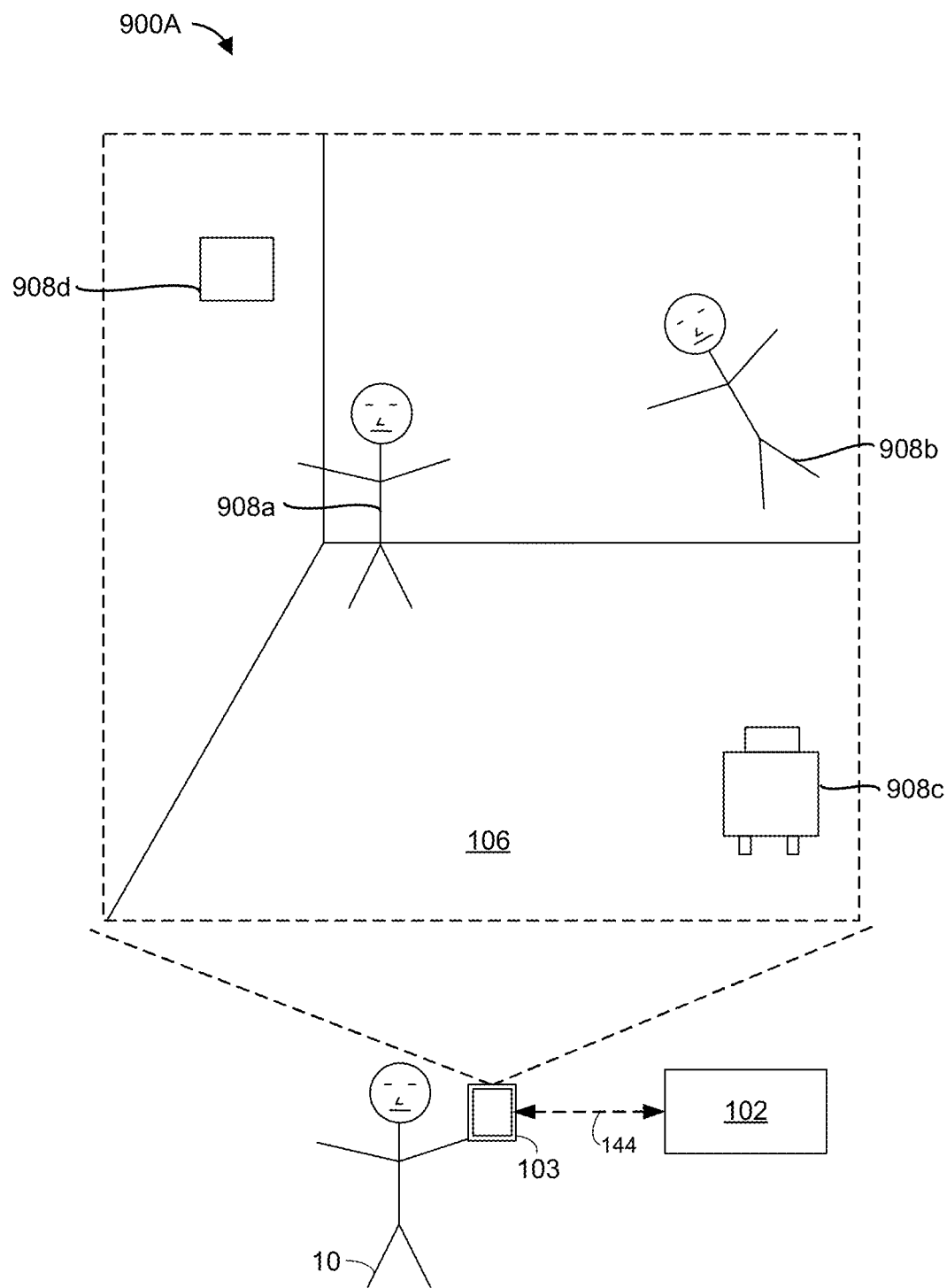
FIG. 9 is a block diagrams of an example operating environment in accordance with some implementations.

FIG. 9 is a block diagram of an example operating environment 900A in accordance with some implementations. While pertinent features are shown, those of ordinary skill in the art will appreciate from the present disclosure that various other features have not been illustrated for the sake of brevity and so as not to obscure more pertinent aspects of the example implementations disclosed herein. To that end, as a non-limiting example, the operating environment 900A includes a controller 102 and an electronic device 103. In the example of FIG. 9, the electronic device 103 is being held by a user 10. In some implementations, the electronic device 103 includes a smartphone, a tablet, a laptop, or the like.

As illustrated in FIG. 9, the electronic device 103 presents a CGR environment 106. In some implementations, the CGR environment 106 is generated by the controller 102 and/or the electronic device 103. In some implementations, the CGR environment 106 includes a virtual environment that is a simulated replacement of a physical environment. In other words, in some implementations, the CGR environment 106 is synthesized by the controller 102 and/or the electronic device 103. In such implementations, the CGR environment 106 is different from the physical environment where the electronic device 103 is located. In some implementations, the CGR environment 106 includes an augmented environment that is a modified version of a physical environment. For example, in some implementations, the controller 102 and/or the electronic device 103 modify (e.g., augment) the physical environment where the electronic device 103 is located in order to generate the CGR environment 106. In some implementations, the controller 102 and/or the electronic device 103 generate the CGR environment 106 by simulating a replica of the physical environment where the electronic device 103 is located. In some implementations, the controller 102 and/or the electronic device 103 generate the CGR environment 106 by removing and/or adding items from the simulated replica of the physical environment where the electronic device 103 is located.

In some implementations, the CGR environment 106 includes various CGR representations of objective-effectuators, such as a boy action figure representation 908a, a girl action figure representation 908b, a robot representation 908c, and a drone representation 908d. In some implementations, the objective-effectuators represent characters from fictional materials, such as movies, video games, comics, and novels. For example, the boy action figure representation 908a represents a "boy action figure" character from a fictional comic, and the girl action figure representation 908b represents a "girl action figure" character from a fictional video game. In some implementations, the CGR environment 106 includes CGR representations of objective-effectuators that represent characters from different fictional materials (e.g., from different movies/games/comics/novels). In various implementations, the objective-effectuators represent things (e.g., tangible objects). For example, in some implementations, the objective-effectuators represent equipment (e.g., machinery such as planes, tanks, robots, cars, etc.). In the example of FIG. 9, the robot representation 908c represents a robot and the drone representation 908d represents a drone. In some implementations, the objective-effectuators represent things (e.g., equipment) from fictional materials. In some implementations, the objective-effectuators represent things from a physical environment, including things located inside and/or outside of the CGR environment 106.

In various implementations, the objective-effectuators perform one or more actions in order to effectuate (e.g., complete/satisfy/achieve) one or more objectives. In some implementations, the objective-effectuators perform a sequence of actions. In some implementations, the controller 102 and/or the electronic device 103 determine the actions that the objective-effectuators perform. In some implementations, the actions of the objective-effectuators are within a degree of similarity to actions that the corresponding characters/things perform in the fictional material. In the example of FIG. 9, the girl action figure representation 908b is performing the action of flying (e.g., because the corresponding "girl action figure" character is capable of flying, and/or the "girl action figure" character frequently flies in the fictional materials). In the example of FIG. 9, the drone representation 908d is performing the action of hovering (e.g., because drones in physical environments are capable of hovering). In some implementations, the controller 102 and/or the electronic device 103 obtain the actions for the objective-effectuators. For example, in some implementations, the controller 102 and/or the electronic device 103 receive the actions for the objective-effectuators from a remote server that determines (e.g., selects) the actions.

In various implementations, a CGR representation of an objective-effectuator performs an action in order to satisfy (e.g., complete or achieve) an objective of the objective-effectuator. In some implementations, an objective-effectuator is associated with a particular objective, and the CGR representation of the objective-effectuator performs actions that improve the likelihood of satisfying that particular objective. In some implementations, CGR representations of the objective-effectuators are referred to as CGR objects. In some implementations, an objective-effectuator representing a character is referred to as a character objective-effectuator. In some implementations, a character objective-effectuator performs actions to effectuate a character objective. In some implementations, an objective-effectuator representing an equipment is referred to as an equipment objective-effectuator. In some implementations, an equipment objective-effectuator performs actions to effectuate an equipment objective. In some implementations, an objective-effectuator representing an environment is referred to as an environmental objective-effectuator. In some implementations, an environmental objective-effectuator performs environmental actions to effectuate an environmental objective.

In some implementations, the CGR environment 106 is generated based on a user input from the user 10. For example, in some implementations, the electronic device 103 receives a user input indicating a terrain for the CGR environment 106. In such implementations, the controller 102 and/or the electronic device 103 configure the CGR environment 106 such that the CGR environment 106 includes the terrain indicated via the user input. In some implementations, the user input indicates environmental conditions for the CGR environment 106. In such implementations, the controller 102 and/or the electronic device 103 configure the CGR environment 106 to have the environmental conditions indicated by the user input. In some implementations, the environmental conditions include one or more of temperature, humidity, pressure, visibility, ambient light level, ambient sound level, time of day (e.g., morning, afternoon, evening, or night), and precipitation (e.g., overcast, rain, or snow). In some implementations, the user input specifies a time period for the CGR environment 106. In such implementations, the controller 102 and/or the electronic device 103 maintain and present the CGR environment 106 during the specified time period.

In some implementations, the controller 102 and/or the electronic device 103 generate corresponding objectives for the objective-effectuators. For example, the controller 102 and/or the electronic device 103 generate a first objective for the boy action figure representation 908*a*, a second objective for the girl action figure representation 908*b*, a third objective for the robot representation 908*a*, and a fourth objective for the drone representation 908*d*. In some implementations, each objective is associated with a set of one or more time frames that defines a duration (e.g., a lifespan) of the objective. In some implementations, a time frame refers to a unit of time (e.g., a millisecond, a second, a minute, an hour, a day, a week, a month, or a year). In some implementations, different objectives have different lifespans. As an example, the controller 102 and/or the electronic device 103 assign the first objective for the boy action figure representation 908*a* a lifespan of 8 minutes, and the controller 102 and/or the electronic device 103 assign the second objective for the girl action figure representation 908*b* a lifespan of 2 hours.

In various implementations, the objectives for the objective-effectuators are associated with a mutual plan. In some implementations, the mutual plan characterizes a type of content that is generated in the CGR environment 106. For example, in some implementations, the mutual plan is to generate content that satisfies a comedy threshold, a suspense threshold, a rescue threshold, a tragedy threshold, etc. In some implementations, the mutual plan includes a content template (e.g., a plot template) for generating a corresponding content type. For example, the mutual plan includes a comedy template for generating comedic content, a suspense template for generating suspenseful content, a tragedy template for generating tragic content, etc.

In various implementations, the controller 102 and/or the electronic device 103 generate directives for the objective-effectuators in order to advance the objective-effectuators towards the objectives of the objective-effectuators. For example, the controller 102 and/or the electronic device 103 generate a first directive for the body action figure representation 908*a* in order to advance the boy action figure representation 908*a* towards the first objective. In some implementations, a directive guides the objective-effectuator towards the objective by providing guidance to the objective-effectuator. For example, in some implementations, a directive guides an objective-effectuator by limiting actions that the objective-effectuator generates. In some implementations, a directive includes specific guidance on satisfying a corresponding objective. For example, in some implementations, a directive includes a location/time for satisfying the objective. In some implementations, a directive includes a behavioral attribute value that indicates a target behavior for a CGR representation of an objective-effectuator while advancing towards the objective.

In various implementations, the CGR representation of the objective-effectuators performs actions in accordance with the directives generated by the controller 102 and/or the electronic device 103. For example, the boy action figure representation 908*a* performs actions in accordance with the first directive that the controller 102 and/or the electronic device 103 generated for the boy action figure representation 908*a*. In some implementations, the controller 102 and/or the electronic device 103 manipulate the CGR representations of the objective-effectuators to display performance of actions in accordance with the directives. In some implementations, the electronic device 103 may be replaced with a near-eye system.

Figure 10A:
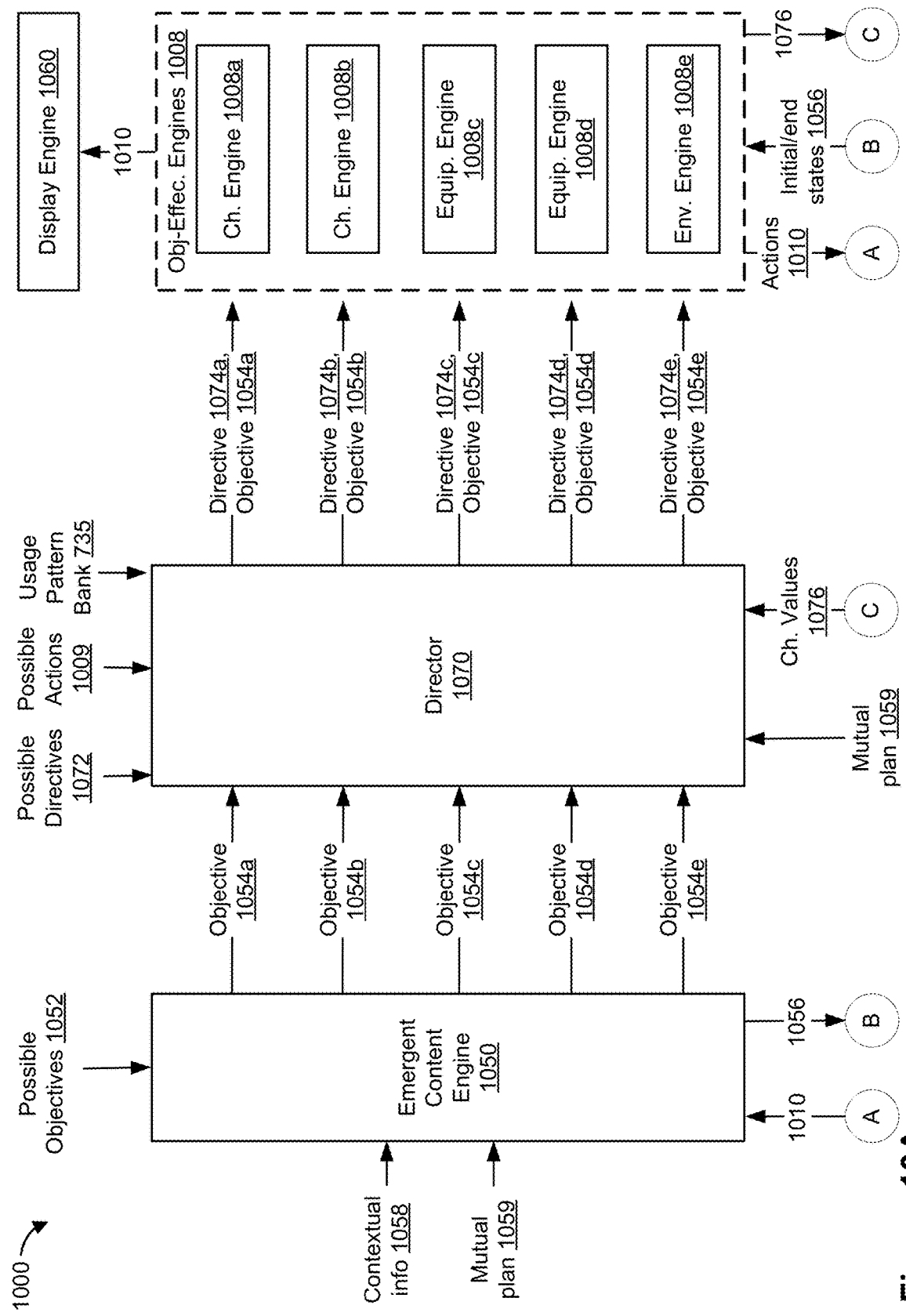
FIG. 10A is a block diagram of an example emergent content system in accordance with some implementations.

FIG. 10A is a block diagram of an example emergent content system 1000 that generates directives for various objective-effectuators in a CGR environment in accordance with some implementations. In some implementations, the emergent content system 1000 (or at least a portion thereof) is included in the electronic device 103 in FIGS. 1 and 9; the controller 102 in FIGS. 1 and 9; or a suitable combination thereof. To that end, the emergent content system 1000 includes objective-effectuator engines 1008, an emergent content engine 1050, and a director 1070. In various implementations, the emergent content engine 1050 generates objectives 1054*a*, . . . , 1054*e* for various objective-effectuators. The director 1070 generates directives 1074*a*, . . . , 1074*e* for the corresponding objectives 1054*a*, . . . , 1054*e*. The objective-effectuator engines 1008 generate actions 1010 in accordance with the directives 1074*a*, . . . , 1074*e* in order to advance the objectives 1054*a*, . . . , 1054*e*. CGR representations of the objective-effectuators perform the actions 1010.

The present disclosure provides methods, systems, and/or devices for generating directives for objective-effectuators instantiated in a CGR environment. A director generates the directives for the objective-effectuators in order to advance the objective-effectuators towards corresponding objectives. The directives provide guidance to objective-effectuators in order to advance the objective-effectuators towards the corresponding objectives. The directives limit actions that the objective-effectuators generate in order to satisfy the corresponding objectives. CGR representations of the objective-effectuators generate and perform actions in accordance with the directives in order to advance the corresponding objectives.

In various implementations, the emergent content engine 1050 generates the objectives 1054*a*, . . . , 1054*e* for the objective-effectuator engines 1008. In some implementations, the emergent content engine 1050 generates a first objective 1054*a* for a boy objective-effectuator represented by the boy action figure representation 908*a* in FIG. 9. The emergent content engine 1050 generates a second objective 1054*b* for a girl objective-effectuator represented by the girl action figure representation 908*b* shown in FIG. 9. The emergent content engine 1050 generates a third objective 1054*c* for a robot objective-effectuator represented by the robot representation 908*c* shown in FIG. 9. The emergent content engine 1050 generates a fourth objective 1054*d* for a drone objective-effectuator represented by the drone representation 908*d* shown in FIG. 9. The emergent content engine 1050 generates a fifth objective 1054*e* for an environmental objective-effectuator.

In various implementations, the emergent content engine 1050 generates the objectives 1054*a*, . . . , 1054*e* based on contextual information 1058. In some implementations, the contextual information 1058 includes information regarding a CGR environment (e.g., the CGR environment 106 shown in FIG. 9). For example, in some implementations, the contextual information 1058 indicates the objective-effectuators that are instantiated in the CGR environment 106.

In some implementations, the emergent content engine 1050 generates the objectives 1054*a*, . . . , 1054*e* based on a mutual plan 1059. In some implementations, the objectives 1054*a*, . . . , 1054*e* are associated with the mutual plan 1059. For example, the objectives 1054*a*, . . . , 1054*e* form different pieces of the mutual plan 1059. In some implementations, the mutual plan 1059 includes a content type, and the objectives 1054a, ..., 1054e collectively trigger content generation that is of the content type. For example, if the mutual plan 1059 is to generate comedic content, then the objectives 1054a, ..., 1054e collectively trigger generation of actions 1010 that are comedic. In some implementations, the mutual plan 1059 includes a plot template, and the objectives 1054a, ..., 1054e trigger content generation that satisfies the plot template. Example plot templates include a comedy template, a rescue template, a disaster template, a tragedy template, and a suspense template.

In some implementations, the emergent content engine 1050 provides initial/end states 1056 to the objective-effectuator engines 1008. In some implementations, the initial/end states 1056 indicate placements (e.g., locations) of various character/equipment representations within a CGR environment. In some implementations, a CGR environment is associated with a time duration (e.g., a few seconds, minutes, hours, or days). For example, the CGR environment is scheduled to last for the time duration. In such implementations, the initial/end states 1056 indicate placements of various character/equipment representations at/towards the beginning and/or at/towards the end of the time duration. In some implementations, the initial/end states 1056 indicate environmental conditions for the CGR environment at/towards the beginning/end of the time duration associated with the CGR environment.

In some implementations, the emergent content engine 1050 generates the objectives 1054a, ..., 1054e based on a set of possible objectives 1052 that are stored in a datastore. In some implementations, the set of possible objectives 1052 is obtained from corresponding fictional source material. For example, in some implementations, the set of possible objectives 1052 for the girl action figure representation 908b includes saving lives, rescuing pets, and/or fighting crime.

In various implementations, the director 1070 generates directives 1074a, ..., 1074e for the corresponding objectives 1054a, ..., 1054e. In some implementations, the director 1070 generates a first directive 1074a for the boy objective-effectuator represented by the boy action figure representation 908a in FIG. 9. The director 1070 generates a second directive 1074b for the girl objective-effectuator represented by the girl action figure representation 908b shown in FIG. 9. The director 1070 generates a third directive 1074c for the robot objective-effectuator represented by the robot representation 908c shown in FIG. 9. The director 1070 generates a fourth directive 1074d for the drone objective-effectuator represented by the drone representation 908d shown in FIG. 9. The director 1070 generates a fifth directive 1074e for the environmental objective-effectuator.

In some implementations, the directives 1074a, ..., 1074e provide guidance on how to satisfy the corresponding objectives 1054a, ..., 1054e. In some implementations, the directives 1074a, ..., 1074e provide guidance by limiting the actions 1010 that the objective-effectuator engines 1008 can generate in order to satisfy the objectives 1054a, ..., 1054e. In some implementations, the directives 1074a, ..., 1074e indicate when to perform the actions 1010 to satisfy the objectives 1054a, ..., 1054e. For example, the first directive 1074a provides a time for satisfying the first objective 1054a. In some implementations, the directives 1074a, ..., 1074e indicate where to perform the actions 1010 to satisfy the objectives 1054a, ..., 1054e. For example, the second directive 1074b specifies a location within the CGR environment 106 to perform actions that satisfy the second objective 1054b. In some implementations, the directives 1074a, ..., 1074e provide behavioral attribute values for the CGR representations of the objective-effectuators while advancing towards the objectives 1054a, ..., 1054e. For example, the second directive 1074b instructs the girl action figure representation 908b to display a specified degree of anger while advancing towards the second objective 1054b.

In some implementations, the director 1070 generates the directives 1074a, ..., 1074e based on characteristic values 1076 associated with the objective-effectuators. In some implementations, the characteristic values 1076 indicate structural qualities of the CGR representations of the objective-effectuators. In such implementations, the director 1070 selects directives which trigger actions that the CGR representations are capable of performing based on their structural qualities, and the director 1070 forgoes directives which trigger actions that are not possible due to the structural qualities. In some implementations, the characteristic values 1076 indicate functionality of the CGR representations of the objective-effectuators (e.g., whether a CGR representation of an objective-effectuator can fly). In some implementations, the characteristic values 1076 indicate behavioral attributes of the objective-effectuators (e.g., a degree of aggressiveness of an objective-effectuator). In some implementations, the characteristic values 1076 indicate a mood of a CGR representation of an objective-effectuator (e.g., whether the boy action figure representation 908a is in a happy mood or a sad mood). In some implementations, the director 1070 obtains the characteristic values 1076 from the objective-effectuator engines 1008.

In some implementations, the director 1070 generates the directives 1074a, ..., 1074e based on a set of possible directives 1072 that are stored in a datastore. In some implementations, the director 1070 obtains the set of possible directives 1072 from corresponding fictional source material. For example, in some implementations, the director 1070 performs semantic analysis on fictional source material to determine that the set of possible directives 1072 for the girl action figure representation 908b includes flying to get to places and wearing a black mask while fighting crime.

In some implementations, the director 1070 generates the directives 1074a, ..., 1074e based on a set of possible actions 1009 stored in a datastore. In some implementations, the set of possible actions 1009 represent actions that the CGR representations of objective-effectuators are capable of performing in a CGR environment. For example, the set of possible actions 1009 represent actions that the boy action figure representation 908a, the girl action figure representation 908b, the robot representation 908c and/or the drone representation 908d are capable of performing. In some implementations, the director 1070 generates the directives 1074a, ..., 1074e such that the directives 1074a, ..., 1074e can be satisfied (e.g., carried out) with the set of possible actions 1009.

In some implementations, the director 1070 generates the directives 1074a, ..., 1074e based on the usage pattern bank 735. In some implementations, the usage pattern bank 735 represent actions that the CGR representations of objective-effectuators are capable of performing in a CGR environment. For example, the usage pattern bank 735 represent actions that the boy action figure representation 908a, the girl action figure representation 908b, the robot representation 908c and/or the drone representation 908d are capable of performing. In some implementations, the director 1070 generates the directives 1074a, . . . , 1074e such that the directives 1074a, . . . , 1074e can be satisfied (e.g., carried out) with the usage pattern bank 735.

In some implementations, the director 1070 generates the directives 1074a, . . . , 1074e based on the mutual plan 1059. In some implementations, the directives 1074a, . . . , 1074e trigger actions that satisfy the mutual plan 1059. For example, if the mutual plan 1059 is to generate comedic content, then the directives 1074a, . . . , 1074e trigger actions that are comedic. In some implementations, the directives 1074a, . . . , 1074e individually form different pieces of the mutual plan 1059. For example, if the mutual plan 1059 is to create suspense, then the first directive 1074a may trigger actions that create the suspense, and the second directive 1074b may trigger actions that maintain the suspense. In some implementations, the mutual plan 1059 includes a content template (e.g., a plot template, for example, a comedy template, a rescue template, a disaster template, a tragedy template and a suspense template). In such implementations, the directives 1074a, . . . , 1074e satisfy the content template.

In the example of FIG. 10A, the objective-effectuator engines 1008 include a boy character engine 1008a, a girl character engine 1008b, a robot equipment engine 1008c, a drone equipment engine 1008d, and an environmental objective-effectuator engine 1008e. The boy character engine 1008a generates actions for the boy action figure representation 908a shown in FIG. 9. The girl character engine 1008b generates actions for the girl action figure representation 908b. The robot equipment engine 1008c generates actions for the robot representation 908c. The drone equipment engine 1008d generates actions for the drone representation 908d. The environmental objective-effectuator engine 1008e generates actions or environmental responses for the environment of the CGR environment 106.

In various implementations, the director 1070 provides the objectives 1054a, . . . , 1054e and the directives 1074a, . . . , 1074e to the objective-effectuator engines 1008. For example, the director 1070 provides the first objective 1054a and the first directive 1074a to the boy character engine 1008a. The objective-effectuator engines 1008 utilize the directives 1074a, . . . , 1074e to generate actions that advance the objectives 1054a, . . . , 1054e. For example, the girl character engine 1008b utilizes the second directive 1074b to generate actions for the girl action figure representation 908b in order to satisfy the second objective 1054b. In some implementations, the objective-effectuator engines 1008 provide the actions 1010 to the emergent content engine 1050, and the emergent content engine 1050 generates future objectives and/or modifies current objectives based on the actions 1010. In some implementations, the objective-effectuator engines 1008 provide the actions 1010 to the director 1070, and the director 1070 generates future directives and/or modified current directives based on the actions 1010. In some implementations, the objective-effectuator engines 1008 utilize the initial/end states 1056 to generate the actions 1010.

In some implementations, the objective-effectuator engines 1008 set the characteristic values 1076 for the objective-effectuators and provide the characteristic values 1076 to the director 1070. In some implementations, the objective-effectuator engines 1008 adjust the characteristic values 1076 based on the actions 1010. For example, the objective-effectuator engines 1008 modify the characteristic values 1076 in order to provide the CGR representations of the objective-effectuators with capabilities that allow performance of the actions 1010.

In various implementations, the objective-effectuator engines 1008 provide the actions 1010 to a display engine 1060 (e.g., a rendering and display pipeline). In some implementations, the display engine 1060 modifies the CGR representations of the objective-effectuators and/or the environment of the CGR environment 106 based on the actions 1010. In various implementations, the display engine 1060 modifies the CGR representations of the objective-effectuators such that the CGR representations of the objective-effectuator can be seen as performing the actions 1010. For example, if an action for the girl action figure representation 908b is to fly, the display engine 1060 moves the girl action figure representation 908b within the CGR environment 106 in order to give the appearance that the girl action figure representation 908b is flying within the CGR environment 106.

Figure 10B:
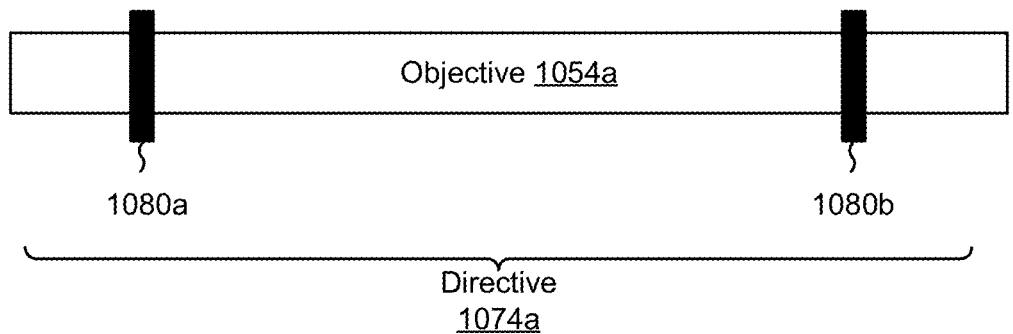
FIG. 10B is a diagram of an example director in accordance with some implementations.

FIG. 10B is an example diagram of the first directive 1074a in accordance with some implementations. In the example of FIG. 10B, the first directive 1074a defines boundary conditions 1080a and 1080b for the first objective 1054a. In some implementations, the boundary conditions 1080a and 1080b represent limits on the first objective 1054a. In some implementations, the boundary conditions 1080a and 1080b represent temporal limits on the first objective 1054a. For example, the boundary condition 1080a represents a first time at which the first objective 1054a is activated and the boundary condition 1080b represents a second time at which the first objective 1054a is deactivated. In some implementations, the boundary conditions 1080a and 1080b represent limits on actions that the boy action figure representation 908a can perform to advance towards the first objective 1054a. For example, the boundary condition 1080a represents a lower force threshold that the boy action figure representation 908a can apply when throwing a punch and the boundary condition 1080b represents an upper force threshold that the boy action figure representation 908b can apply when throwing a punch.

Figure 10C:
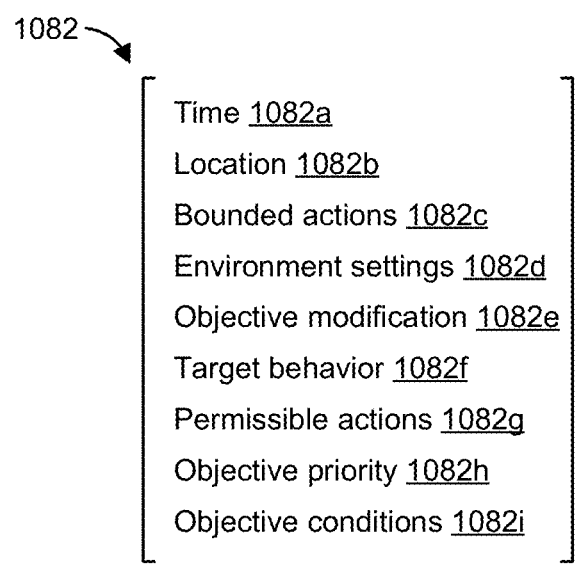
FIG. 10C is a diagram of an example objective characterization vector in accordance with some implementations.

FIG. 10C is a diagram of an example objective characterization vector 1082 in accordance with some implementations. In some implementations, the objective characterization vector 1082 characterizes an objective (e.g., one of the objectives 1054a, . . . , 1054e shown in FIG. 10A). In some implementations, a directive (e.g., one of the directives 1074a, . . . , 1074e shown in FIG. 10A) includes the objective characterization vector 1082. In some implementations, the objective characterization vector 1082 further characterizes an objective. In some implementations, the objective characterization vector 1082 includes guidance (e.g., specific guidance or vague guidance) on advancing towards the objective.

In the example of FIG. 10C, the objective characterization vector 1082 includes a time 1082a for satisfying the objective. In some implementations, the time 1082a includes a time period for satisfying the objective. In some implementations, the time 1082a includes a start time at which the objective is activated and a stop time at which the objective is deactivated.

In some implementations, the objective characterization vector 1082 includes a location 1082b for satisfying the objective. In some implementations, the location 1082b defines a geographical area within the CGR environment for performing actions that advance the objective.

In some implementations, the objective characterization vector 1082 includes bounded actions 1082c. In some implementations, the bounded actions 1082c limit actions that the CGR representation of the objective-effectuator performs in order to advance towards the objective. In some implementations, the bounded actions 1082c indicate a set of permissible actions for the CGR representation of the objective-effectuator. In such implementations, the objective-effectuator engine generates actions by selecting the actions from the set of permissible actions. In some implementations, the bounded actions 1082c indicate a set of impermissible actions for the CGR representation of the objective-effectuator. In such implementations, the objective-effectuator engine forgoes actions that are included in the set of impermissible actions.

In some implementations, the objective characterization vector 1082 includes environmental settings 1082d for the CGR environment 106. In some implementations, the environmental settings 1082d trigger actions that advance an objective-effectuator towards the objective. More generally, in various implementations, a directive includes passive guidance that triggers an objective-effectuator to generate actions from a subset of possible actions by eliminating the remainder of the possible actions (e.g., by setting environmental settings 1082d that make the remainder of the possible actions impossible or infeasible).

In some implementations, the objective characterization vector 1082 includes an objective modification 1082e. In some implementations, the objective breaches the mutual plan 1059, and the objective modification 1082e modifies the objective in order to satisfy the mutual plan 1059. In some implementations, the objective modification 1082e blocks the objective (e.g., deactivates the objective, puts the objective on hold, or deletes the objective). In some implementations, the objective modification 1082e demotes the objectives (e.g., by reducing a priority of the objective). In some implementations, the objective modification 1082e dampens the objective (e.g., relaxes the objective, for example, by designating the objective as optional). In some implementations, the objective modification 1082e modifies the objective in order to intertwine the objective with other objectives (e.g., in order to create conflicts between the objective-effectuators).

In some implementations, the objective characterization vector 1082 indicates a target behavior 1082f (e.g., a behavioral attribute value) for the CGR representation of the objective-effectuator. In some implementations, the CGR representation of the objective-effectuator adopts the target behavior 1082f while advancing towards the objective. Examples of the target behavior 1082f include a degree of aggressiveness, a level of happiness, anger, sadness, frustration, calmness, etc.

In some implementations, the objective characterization vector 1082 indicates a set of permissible actions 1082g for advancing the objective. In some implementations, the set of permissible actions 1082g limits a set of possible actions that the objective-effectuator engine accesses to generate the actions for the CGR representation of the objective-effectuator. In some implementations, the objective characterization vector 1082 indicates a set of impermissible actions that the CGR representation of the objective-effectuator is prevented from performing. In some implementations, the set of permissible actions 1082g is generated based at least in part on actions the usage pattern bank 735.

In some implementations, the objective characterization vector 1082 indicates an objective priority 1082h. In some implementations, the objective priority 1082h refers to a priority/preference for the objective. For example, the objective priority 1082h indicates whether the objective has a high priority, a medium priority, or a low priority. In some implementations, the objective includes a set of micro-objectives, and the objective priority 1082h indicates a priority for each of the set of micro-objectives. In some implementations, the objective priority 1082h ranks the objective relative to other objectives.

In some implementations, the objective characterization vector 1082 includes conditions 1082i for the objective. In some implementations, the conditions 1082i indicate environmental conditions for the CGR environment 106. In some implementations, the conditions 1082i trigger activation and/or deactivation of the objective. For example, in some implementations, the conditions 1082i make the objective conditional upon the completion of another objective. In some implementations, the conditions 1082i make the objective conditional upon the failure of another objective.

Figure 11A:
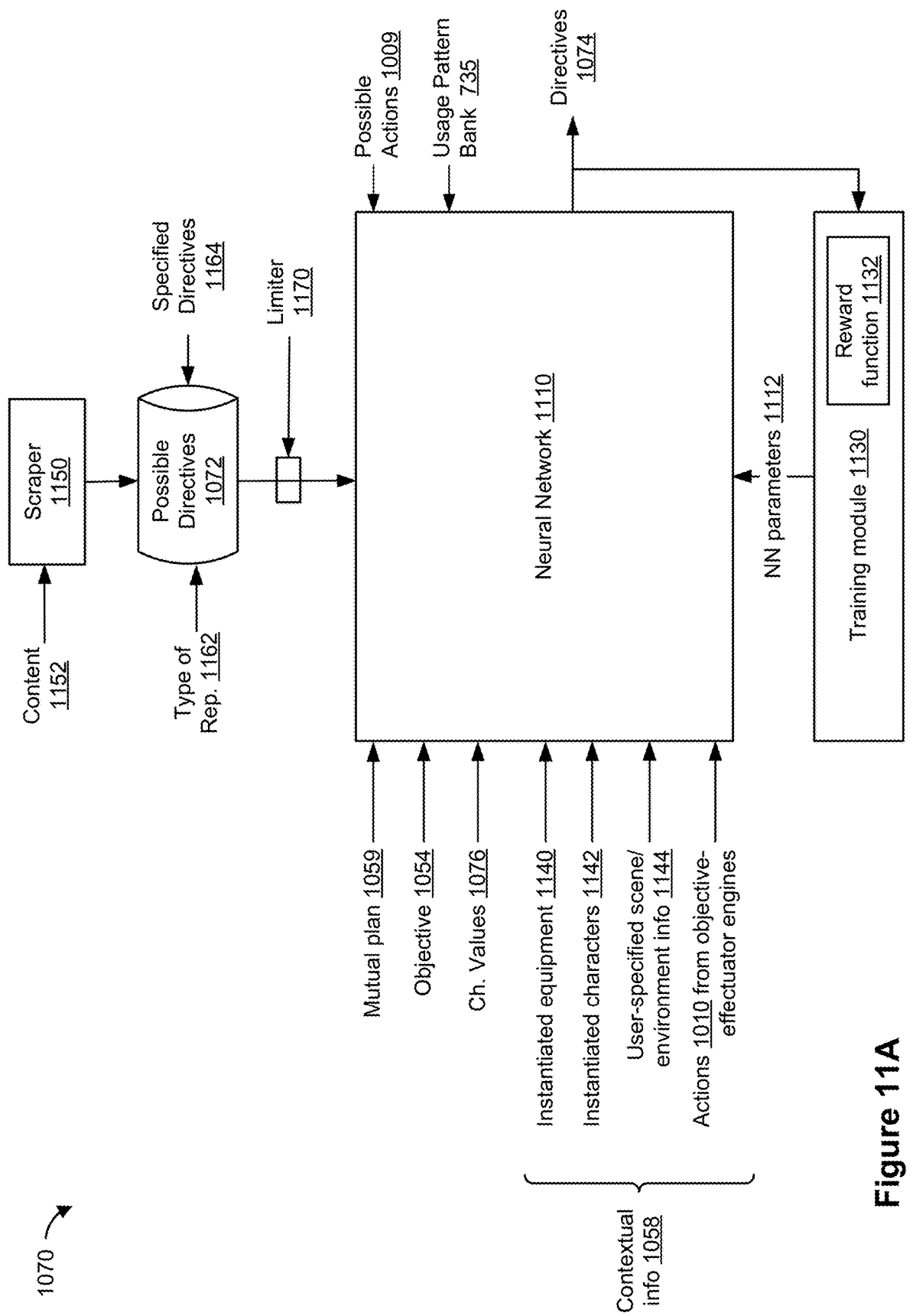
FIG. 11A is a block diagram of an example director in accordance with some implementations.

FIG. 11A is a block diagram of an example director 1070 in accordance with some implementations. In some implementations, the director 1070 (or at least a portion thereof) is included in the electronic device 103 in FIGS. 1 and 9; the controller 102 in FIGS. 1 and 9; or a suitable combination thereof. In some implementations, the director 1070 implements the director 1070 shown in FIG. 10A. In some implementations, the director 1070 generates directives 1074 for various objective-effectuators. In some implementations, the directives 1074 trigger the objective-effectuator engines (e.g., the boy character engine 1008a, the girl character engine 1008b, the robot equipment engine 1008c, the drone equipment engine 1008d, and the environmental objective-effectuator engine 1008e) to generate actions in accordance with the directives 1074.

In various implementations, the director 1070 includes a neural network system 1110 ("neural network 1110", hereinafter for the sake of brevity), a neural network training system 330 ("training module 1130", hereinafter for the sake of brevity) that trains (e.g., configures) the neural network 1110, and a scraper 1150 that provides possible directives 1072 to the neural network 1110. In various implementations, the neural network 1110 generates the directives 1074 for objective-effectuator engines based on various inputs including the set of possible actions 1009, the usage pattern bank 735, the objectives 1054, the contextual information 1058, the mutual plan 1059, and/or the characteristic values 1076.

In some implementations, the neural network 1110 includes a long short-term memory (LSTM) recurrent neural network (RNN), a deep neural network (DNN), convolutional neural network (CNN), or the like. In various implementations, the neural network 1110 generates the directives 1074 based on a function of the possible directives 1072. For example, in some implementations, the neural network 1110 generates the directives 1074 by selecting a subset of the possible directives 1072. In some implementations, the neural network 1110 generates the directives 1074 such that the directives 1074 are within a degree of similarity of at least some of the possible directives 1072.

In some implementations, the neural network 1110 generates the directives 1074 based on instantiated equipment representations 1140. In some implementations, the instantiated equipment representations 1140 refers to equipment objective-effectuators that are instantiated in the CGR environment. For example, referring to FIG. 9, the instantiated equipment representations 1140 include the robot representation 908c and the drone representation 908d in the CGR environment 106.

In some implementations, the neural network 1110 generates the directives 1074 based on instantiated character representations 1142. In some implementations, the instantiated character representations 1142 refers to character objective-effectuators that are instantiated in the CGR environment. For example, referring to FIG. 9, the instantiated character representations 1142 include the boy action figure representation 908*a* and the girl action figure representation 908*b* in the CGR environment 106.

In some implementations, the neural network 1110 generates the directives 1074 based on user-specified scene/environment information 1144. In some implementations, the user-specified scene/environment information 1144 includes the initial/end states 1056 shown in FIG. 10A. In some implementations, the directives 1074 are a function of the initial/end states 1056. In some implementations, the neural network 1110 adjusts the directives 1074 so that the directives 1074 are better suited for the user-specified scene/environment information 1144.

In some implementations, the neural network 1110 generates the directives 1074 based on actions 1010 (e.g., previous actions) generated by the objective-effectuator engines. In some implementations, the neural network 1110 modifies the directive for a particular objective-effectuator based on previous actions performed by CGR representations of other objective-effectuators.

In various implementations, the neural network 1110 generates the directives 1074 based on objectives 1054 from the emergent content engine 1050. In some implementations, the neural network 1110 generates the directives 1074 in order to satisfy the objectives 1054 from the emergent content engine 1050. In some implementations, the neural network 1110 evaluates the possible directives 1072 with respect to the objectives 1054. In such implementations, the neural network 1110 generates the directives 1074 by selecting a subset of the possible directives 1072 that satisfy the objectives 1054 and forgoing selection of the possible directives 1072 that do not satisfy the objectives 1054.

As described herein, in various implementations, the directives 1074 provide guidance on how to satisfy the objectives 1054. In some implementations, the directives 1074 provide guidance on how to satisfy the objectives 1054 by specifying a time and/or a location for performing actions that satisfy the objectives 1054. In some implementations, the directives 1074 narrow a scope of the objectives 1054 by providing boundary conditions for the objectives 1054. For example, in some implementations, the directives 1074 provide guidance by limiting a set of actions that CGR representations can perform in order to satisfy the objectives 1054.

In various implementations, the neural network 1110 generates the directives 1074 based on one or more characteristic values 1076 associated with the objective-effectuators. In some implementations, the one or more characteristic values 1076 indicate one or more physical characteristics (e.g., structural characteristics) of the CGR representations of the objective-effectuators. For example, the one or more characteristic values 1076 indicate a body material of a CGR representation of an objective-effectuator. In such implementations, the directives 1074 utilizes the physical characteristics that the CGR representation possesses and does not utilize the physical characteristics that the CGR representation does not possess. For example, if the CGR representation is made from wax, then the directives 1074 specify avoiding hot areas where there is a risk of melting.

In some implementations, the one or more characteristic values 1076 indicate accessories that the CGR representations of the objective-effectuators have (e.g., a jet pack for flying). In such implementations, the directives 1074 utilize the accessories that the CGR representations have and avoid accessories that the CGR representations do not have. For example, if a CGR representation has the jet pack accessory, then the directive 1074 for that CGR representation may include flying. However, if the CGR representation does not have the jet pack accessory, then the directive 1074 for that CGR representation may not include flying or the directive 1074 may include taking a CGR airplane to fly.

In some implementations, the one or more characteristic values 1076 indicate one or more behavioral characteristics of the CGR representations of the objective-effectuators. In some implementations, the behavioral characteristics include long-term personality traits such as a level of aggressiveness, a level of patience, a level of politeness, etc. In some implementations, the behavioral characteristics include short-term behavioral attributes such as a mood of the CGR representation of the objective-effectuator. In some implementations, the directives 1074 include actions which rely on behavioral traits that the CGR representation possesses. For example, if the CGR representation has a relatively high level of aggressiveness, then the directive 1074 for that CGR representation may include initiating a fight.

In some implementations, the neural network 1110 generates the directives 1074 based on the mutual plan 1059. In some implementations, the directives 1074 trigger actions which satisfy the mutual plan 1059. For example, if the mutual plan 1059 is to generate comedic content, then the directives 1074 trigger comedic actions.

In some implementations, the neural network 1110 generates the directives 1074 based on the set of possible actions 1009. In some implementations, the neural network 1110 generates the directives 1074 such that the directives 1074 can be satisfied (e.g., carried out) with the set of possible actions 1009.

In some implementations, the neural network 1110 generates the directives 1074 based on the usage pattern bank 735. In some implementations, the neural network 1110 generates the directives 1074 such that the directives 1074 can be satisfied (e.g., carried out) by performing actions from the usage pattern bank 735.

In various implementations, the training module 1130 trains the neural network 1110. In some implementations, the training module 1130 provides neural network (NN) parameters 1112 to the neural network 1110. In some implementations, the neural network 1110 includes a model of neurons, and the neural network parameters 1112 represent weights for the neurons. In some implementations, the training module 1130 generates (e.g., initializes/initiates) the neural network parameters 1112, and refines the neural network parameters 1112 based on the directives 1074 generated by the neural network 1110.

In some implementations, the training module 1130 includes a reward function 1132 that utilizes reinforcement learning to train the neural network 1110. In some implementations, the reward function 1132 assigns a positive reward to directives that are desirable, and a negative reward to directives that are undesirable. In some implementations, during a training phase, the training module 1130 compares the directives with verification data that includes verified directives. In such implementations, if a particular directive is within a degree of similarity to the verified directives, then the training module 1130 stops training the neural network 1110. However, if the directive is not within the degree of similarity to the verified directive, then the training module 1130 continues to train the neural network 1110. In various implementations, the training module 1130 updates the neural network parameters 1112 during/after the training.

In various implementations, the scraper 1150 scrapes content 1152 to identify the possible directives 1072. In some implementations, the content 1152 includes movies, video games, comics, novels, and fan-created content such as blogs and commentary. In some implementations, the scraper 1150 utilizes various methods, systems, and devices associated with content scraping to scrape the content 1152. For example, in some implementations, the scraper 1150 utilizes one or more of text pattern matching, HTML (Hyper Text Markup Language) parsing, DOM (Document Object Model) parsing, image processing, and audio analysis in order to scrape the content 1152 and identify the possible directives 1072. In some implementations, the scraper 1150 extracts actions from the content 1152 and performs semantic analysis on the extracted actions to generate the possible directives 1072.

In some implementations, an objective-effectuator is associated with a type of representation 1162, and the neural network 1110 generates the directives 1074 based on the type of representation 1162 associated with the objective-effectuator. In some implementations, the type of representation 1162 indicates the characteristic values 1076 of the objective-effectuator (e.g., structural characteristics, functional characteristics and/or behavioral characteristics). In some implementations, the type of representation 1162 is determined based on a user input. In some implementations, the type of representation 1162 is determined based on a combination of rules.

In some implementations, the neural network 1110 generates the directives 1074 based on specified directives 1164. In some implementations, the specified directives 1164 are provided by an entity that controls the fictional materials from where the character/equipment originated. For example, in some implementations, the specified directives 1164 are provided (e.g., conceived of) by a movie producer, a video game creator, a novelist, etc. In some implementations, the possible directives 1072 include the specified directives 1164. As such, in some implementations, the neural network 1110 generates the directives 1074 by selecting a portion of the specified directives 1164.

In some implementations, the possible directives 1072 for an objective-effectuator are limited by a limiter 1170. In some implementations, the limiter 1170 restricts the neural network 1110 from selecting a portion of the possible directives 1072. In some implementations, the limiter 1170 is controlled by the entity that controls (e.g., owns) the fictional materials from where the character/equipment originated. For example, in some implementations, the limiter 1170 is controlled (e.g., operated and/or managed) by a movie producer, a video game creator, a novelist, etc. In some implementations, the limiter 1170 and the neural network 1110 are controlled/operated by different entities. In some implementations, the limiter 1170 restricts the neural network 1110 from generating directives that breach a criterion defined by the entity that controls the fictional materials.

Figure 11B:
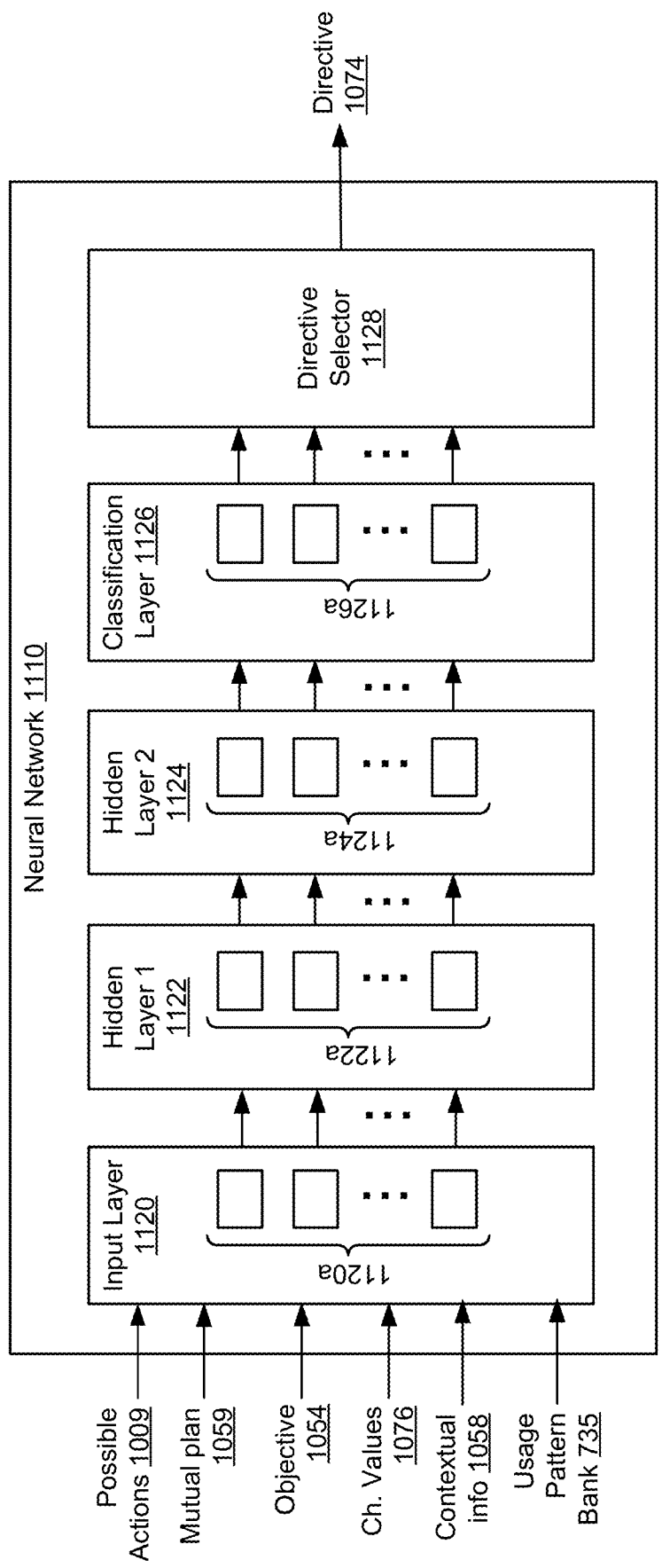
FIG. 11B is a block diagram of an example neural network in accordance with some implementations.

FIG. 11B is a block diagram of the neural network 1110 in accordance with some implementations. In some implementations, the neural network 1110 (or at least a portion thereof) is included in the electronic device 103 in FIGS. 1 and 9; the controller 102 in FIGS. 1 and 9; or a suitable combination thereof. In the example of FIG. 11B, the neural network 1110 includes an input layer 1120, a first hidden layer 1122, a second hidden layer 1124, a classification layer 1126, and a directive selector 1128. While the neural network 1110 includes two hidden layers as an example, those of ordinary skill in the art will appreciate from the present disclosure that one or more additional hidden layers are also present in various implementations. Adding additional hidden layers adds to the computational complexity and memory demands but may improve performance for some applications.

In various implementations, the input layer 1120 is coupled (e.g., configured) to receive various inputs. In the example of FIG. 11B, the input layer 1120 receives as inputs the set of possible actions 1009, the objectives 1054, the contextual information 1058, the mutual plan 1059, and the characteristic values 1076. In some implementations, the neural network 1110 includes a feature extraction module (not shown) that generates a feature stream (e.g., a feature vector) based on the set of possible actions 1009, the objectives 1054, the contextual information 1058, the mutual plan 1059 and the characteristic values 1076. In such implementations, the feature extraction module provides the feature stream to the input layer 1120. As such, in some implementations, the input layer 1120 receives a feature stream that is a function of the objectives 1054, the contextual information 1058, the mutual plan 1059, and the characteristic values 1076. In various implementations, as a non-limiting example, the input layer 1120 includes a number of LSTM logic units 1120*a*, which are also referred to as model(s) of neurons by those of ordinary skill in the art. In some such implementations, an input matrix from the features to the LSTM logic units 1120*a* include rectangular matrices. The size of this matrix is a function of the number of features included in the feature stream.

In some implementations, as a non-limiting example, the first hidden layer 1122 includes a number of LSTM logic units 1122*a*. As illustrated in the example of FIG. 11B, the first hidden layer 1122 receives its inputs from the input layer 1120. In some implementations, the second hidden layer 1124 includes a number of LSTM logic units 1124*a*. In some implementations, the number of LSTM logic units 1124*a* is the same as or similar to the number of LSTM logic units 1120*a* in the input layer 1120 or the number of LSTM logic units 1122*a* in the first hidden layer 1122. As illustrated in the example of FIG. 11B, the second hidden layer 1124 receives its inputs from the first hidden layer 1122. Additionally or alternatively, in some implementations, the second hidden layer 1124 receives its inputs from the input layer 1120.

In some implementations, as a non-limiting example, the classification layer 1126 includes a number of LSTM logic units 1126*a*. In some implementations, the number of LSTM logic units 1126*a* is the same as or similar to the number of LSTM logic units 1120*a* in the input layer 1120, the number of LSTM logic units 1122*a* in the first hidden layer 1122, or the number of LSTM logic units 1124*a* in the second hidden layer 1124. In some implementations, the classification layer 1126 includes an implementation of a multinomial logistic function (e.g., a soft-max function) that produces a number of candidate directives. In some implementations, the number of candidate directives is approximately equal to the number of possible directives 1072. In some implementations, the candidate directives are associated with corresponding confidence scores which include a probability or a confidence measure that the corresponding directive satisfies the corresponding objective 1054. In some implementations, the outputs do not include directives that have been excluded by operation of the limiter 1170.

In some implementations, the directive selector 1128 generates the directives 1074 by selecting the top N candidate directives provided by the classification layer 1126. For example, in some implementations, the directive selector 1128 selects the candidate directives with the highest confidence score. In some implementations, the top N candidate directives are most likely to satisfy the objectives 1054. In some implementations, the directive selector 1128 provides the directives 1074 to a rendering and display pipeline (e.g., the display engine 1060 shown in FIG. 10A).

FIGS. 12A-12I illustrate an example CGR presentation scenario in accordance with some implementations. While pertinent features are shown, those of ordinary skill in the art will appreciate from the present disclosure that various other features have not been illustrated for the sake of brevity and so as not to obscure more pertinent aspects of the example implementations disclosed herein. According to some implementations, the operations and/or actions described below with reference to FIGS. 12A-12F are performed by a device such as the electronic device 103 in FIGS. 1 and 9; the controller 102 in FIGS. 1 and 9; or a suitable combination thereof.

Figure 12A:
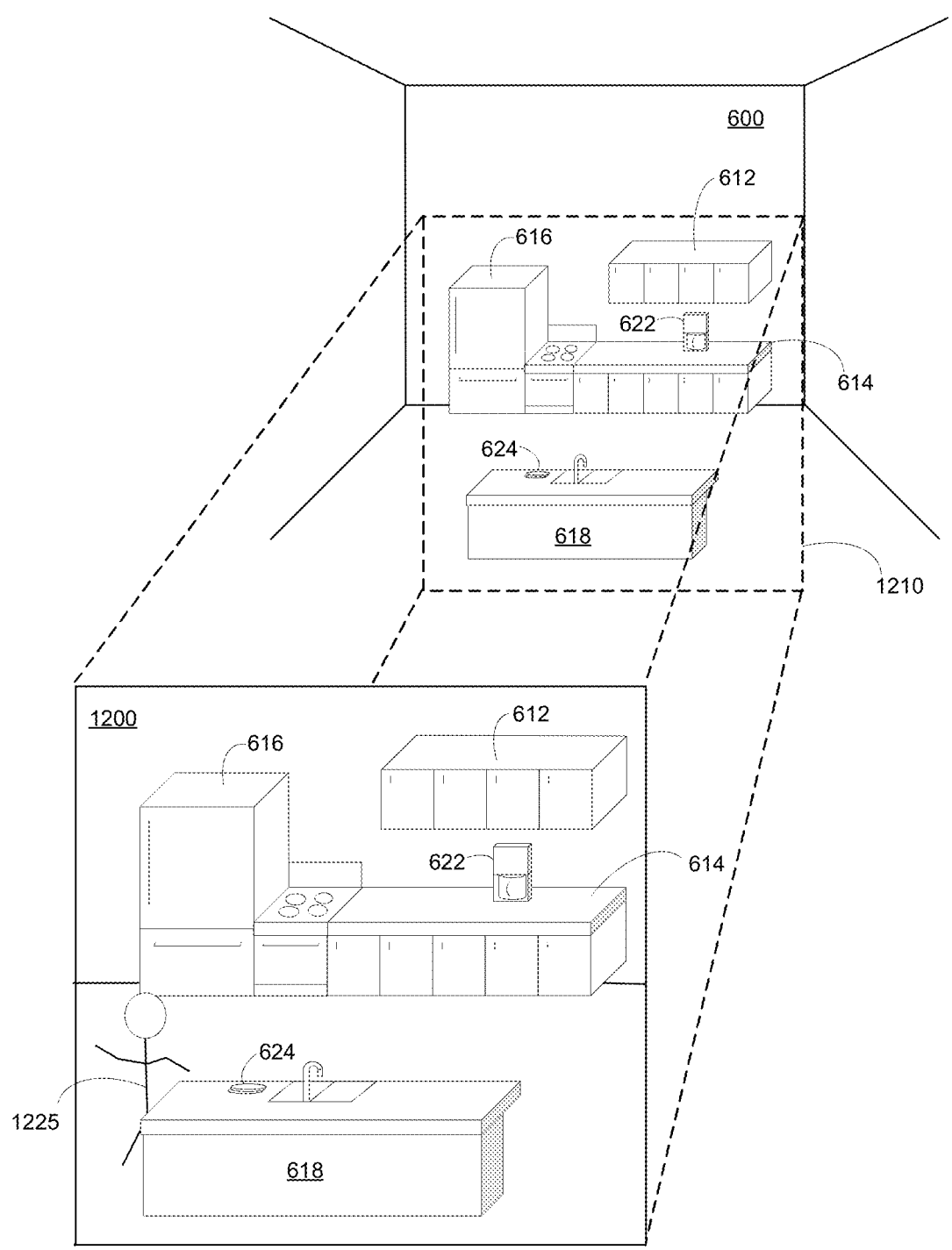
FIGS. 12A-12I illustrate an example CGR presentation scenario in accordance with some implementations.

As shown in FIGS. 12A-12I, the physical environment 600 includes a set of cabinets 612, a countertop 614, a refrigerator 616, an island 618 with a sink, a coffee maker 622, and a stack of plates 624 on the island 618. As shown in FIG. 12A, the set of cabinets 612, the countertop 614, the refrigerator 616, the island 618 with a sink, the coffee maker 622, and the stack of plates 624 on the island 618 are within a field-of-view (FOV) 1210 of the device. In one example, the FOV 1210 corresponds to a viewing area associated with an exterior-facing image sensor of the device that enables video pass-through of at least a portion of the physical environment 600. Continuing with this example, the device displays a CGR environment 1200 (e.g., a user interface) that includes the objective-effectuator 1225 composited with or overlaid on video pass-through associated with the FOV 1210.

In another example, the FOV 1210 corresponds to an optical viewing area associated with a transparent lens of the device that enables optical see-through of at least a portion of the physical environment 600. Continuing with this example, the device displays the CGR environment 1200 by projecting or rendering the objective-effectuator 1225 onto the transparent lens that enables optical see-through associated with the FOV 1210. As such, the user 10, for example, perceives the objective-effectuator 1225 as being overlaid on the FOV 1210.

Figure 12B:
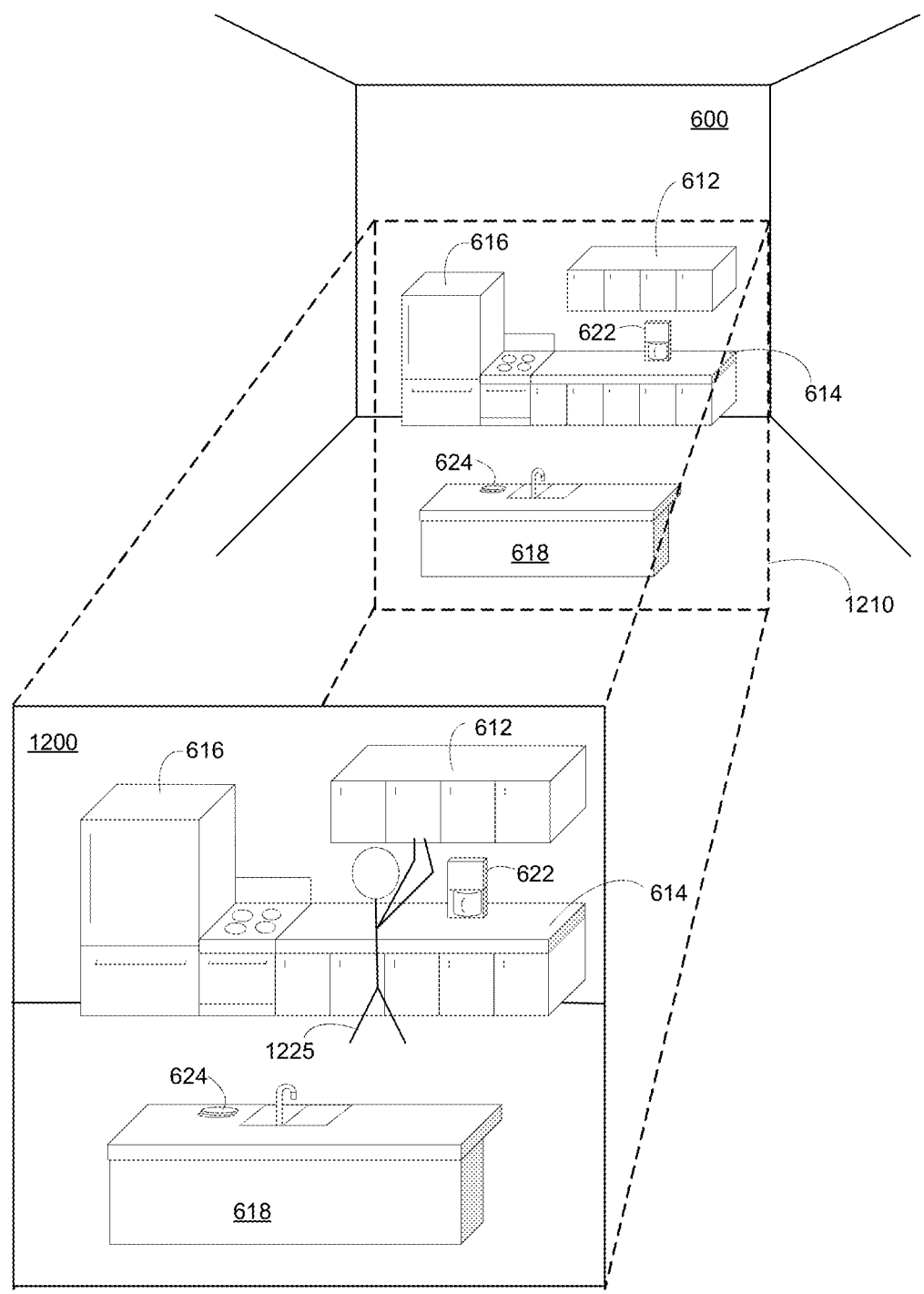
Figure 12C:
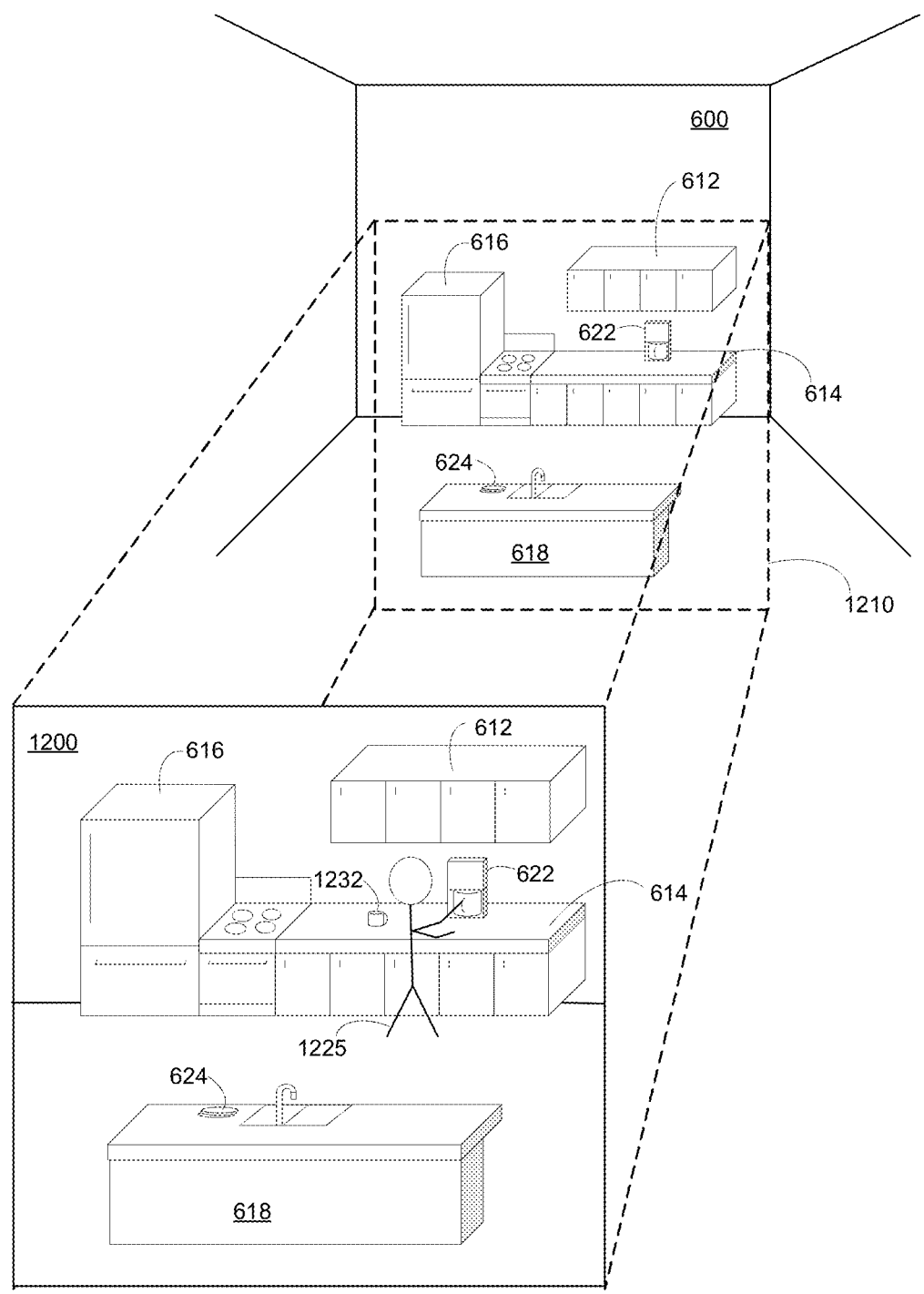
Figure 12D:
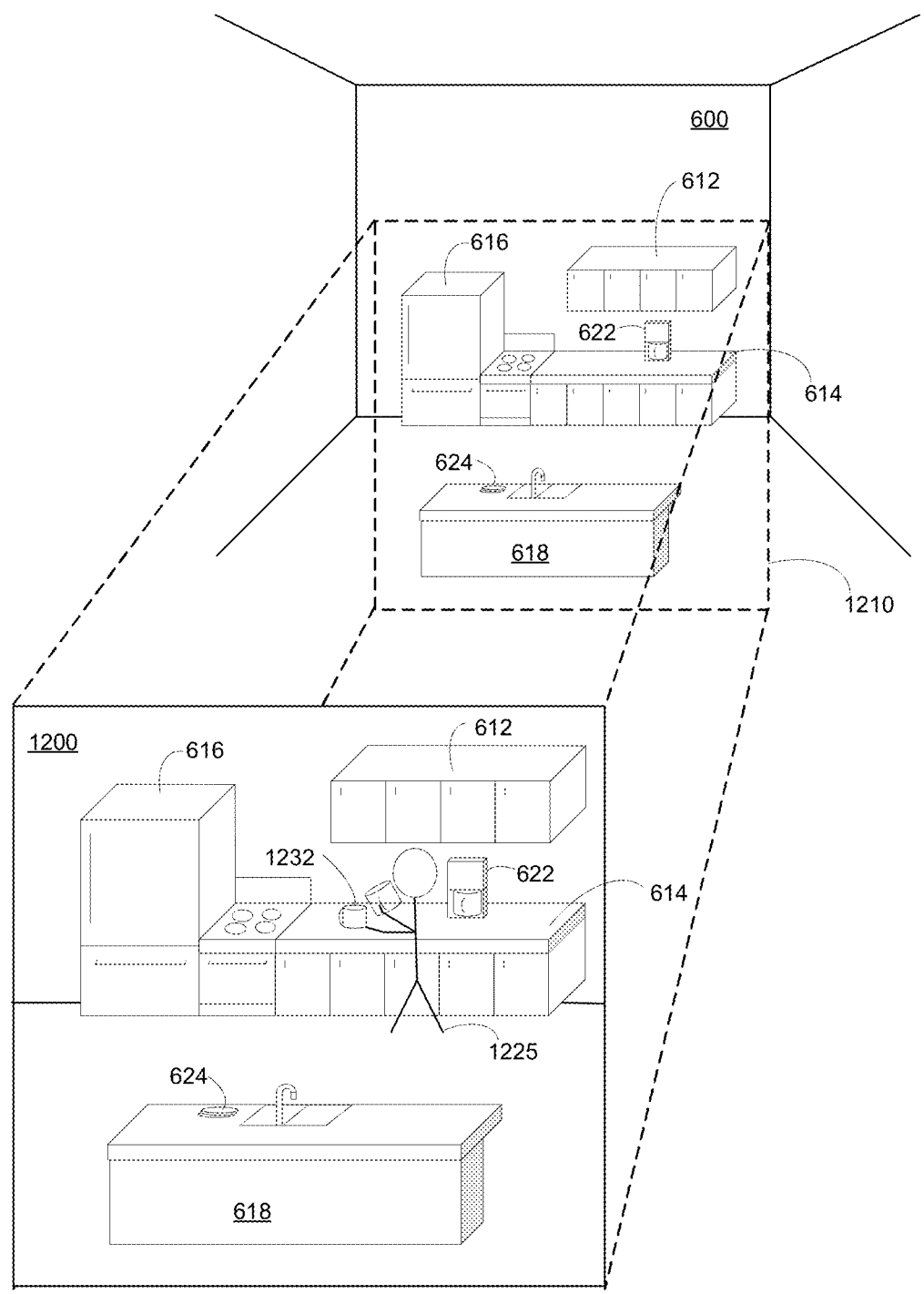
Figure 12E:
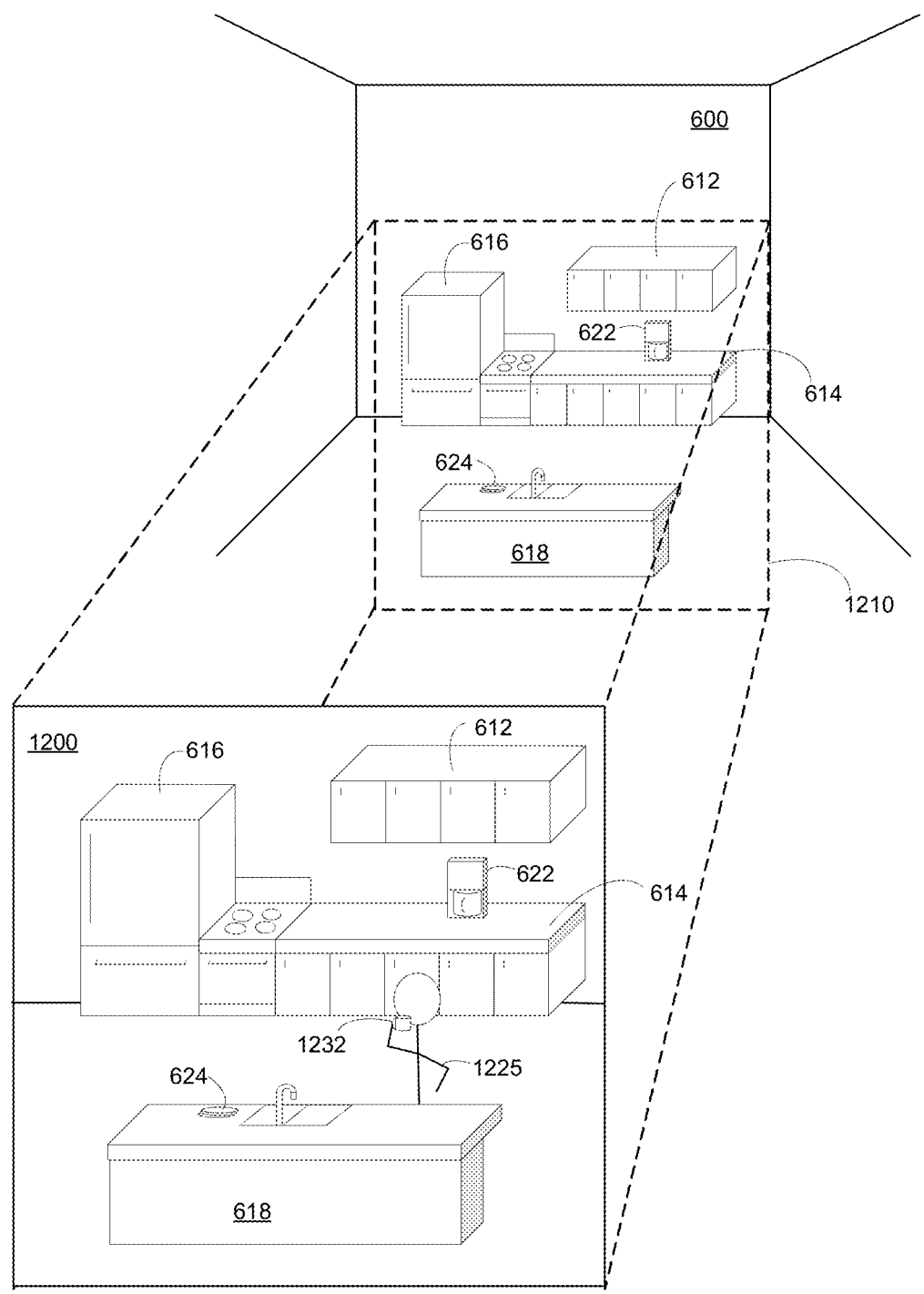

As shown in FIGS. 12A-12E, the objective-effectuator 1225 performs one or more actions within the CGR environment 1200 in order to achieve a first objective (e.g., drink coffee from a coffee mug) where the one or more actions are limited by the usage pattern bank 735 in accordance with a directive. FIGS. 12A-12C shows a sequence in which the objective-effectuator 1225 retrieves a representation 1232 of the coffee mug 628 from the set of cabinets 612 and places the representation 1232 of the coffee mug 628 on the countertop 614 within the CGR environment 1200. FIGS. 12C-12F show a sequence in which the objective-effectuator 1225 pours coffee from the coffee maker 622 (e.g., using a representation of the associated carafe) into the representation 1232 of the coffee mug 628, drinks from the representation 1232 of the coffee mug 628, and places the representation 1232 of the coffee mug 628 on the island 618 within the CGR environment 1200.

Figure 12F:
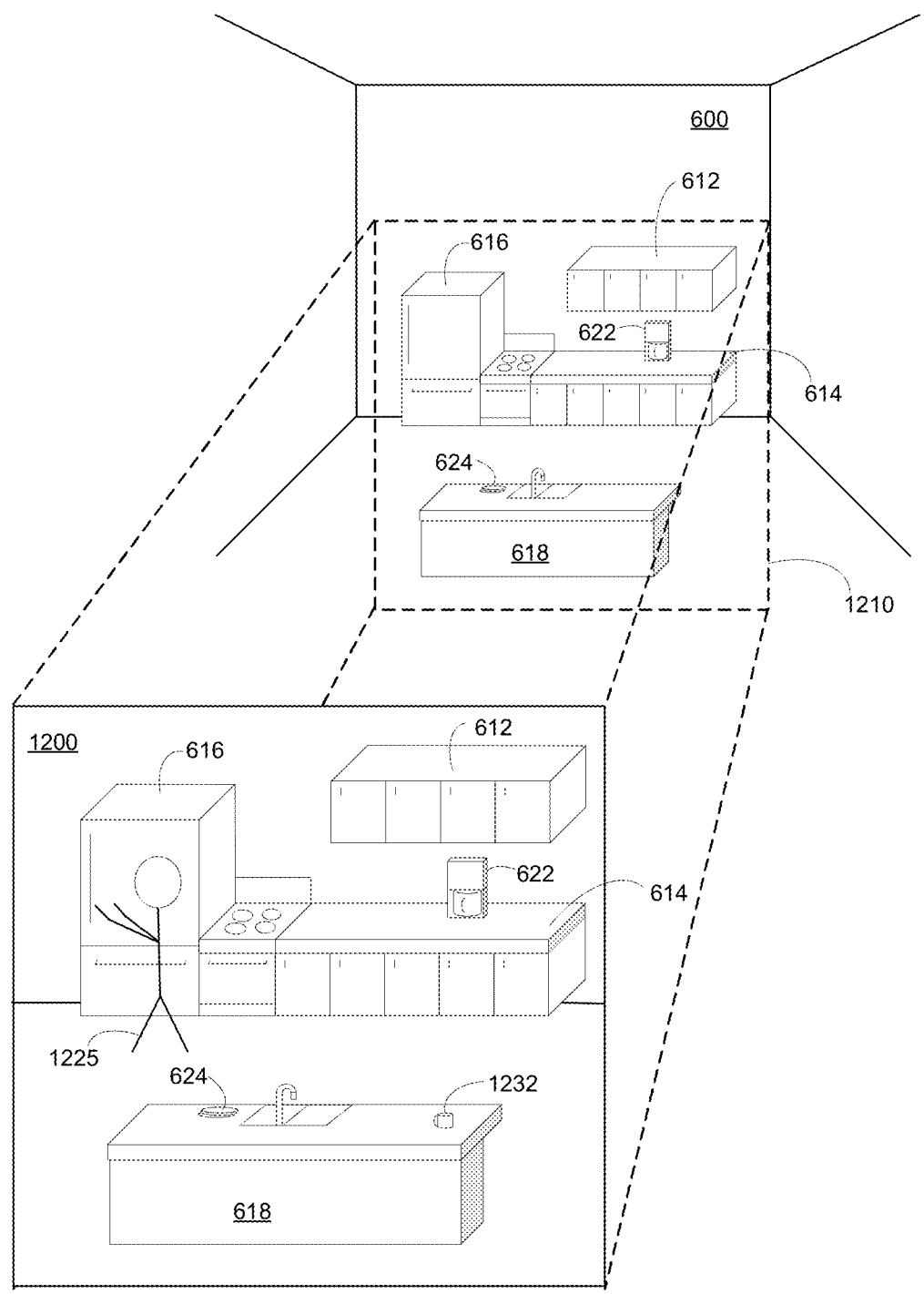
Figure 12G:
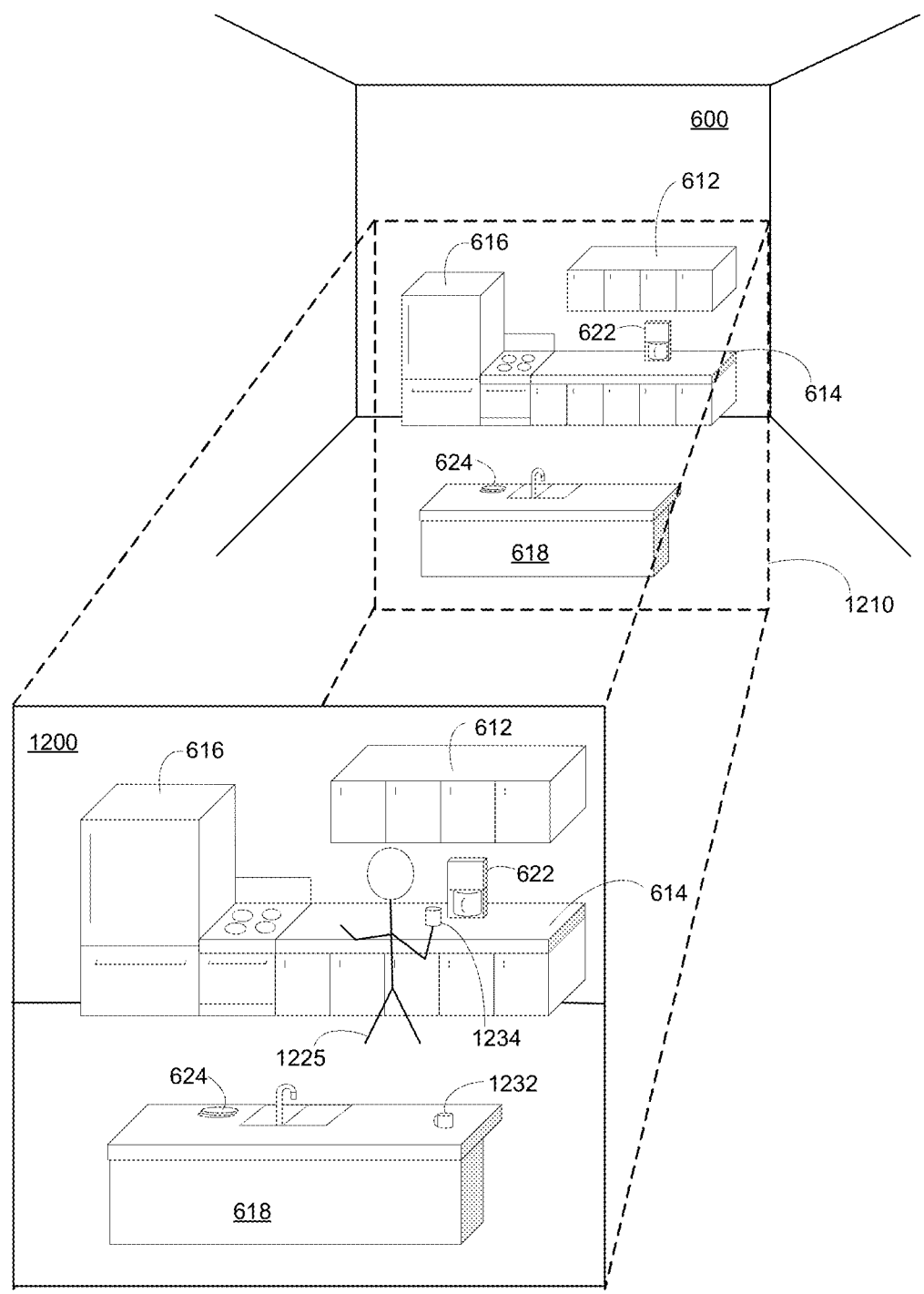

As shown in FIGS. 12F and 12G, the objective-effectuator 1225 performs one or more actions in order to achieve a second objective (e.g., retrieve an item from the refrigerator) within the CGR environment 1200 where the one or more actions are limited by the usage pattern bank 735 in accordance with a directive. FIGS. 12F and 12G show a sequence in which the objective-effectuator 1225 retrieves a representation 1234 of the item 626 from the refrigerator 616 (e.g., by opening a representation of the door of the refrigerator 616) and places the representation 1234 of the item 626 the countertop 614 within the CGR environment 1200.

Figure 12H:
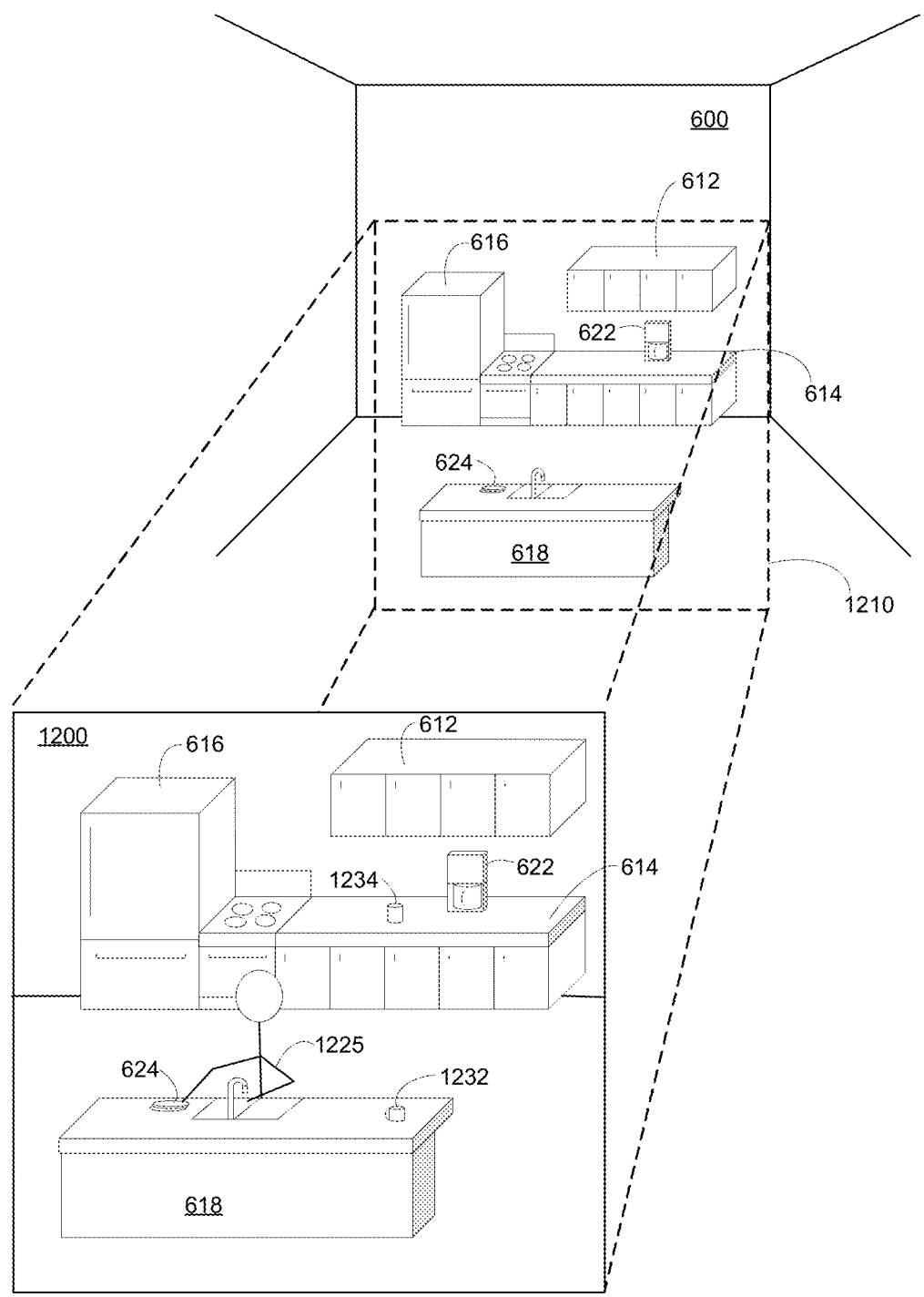
Figure 12I:
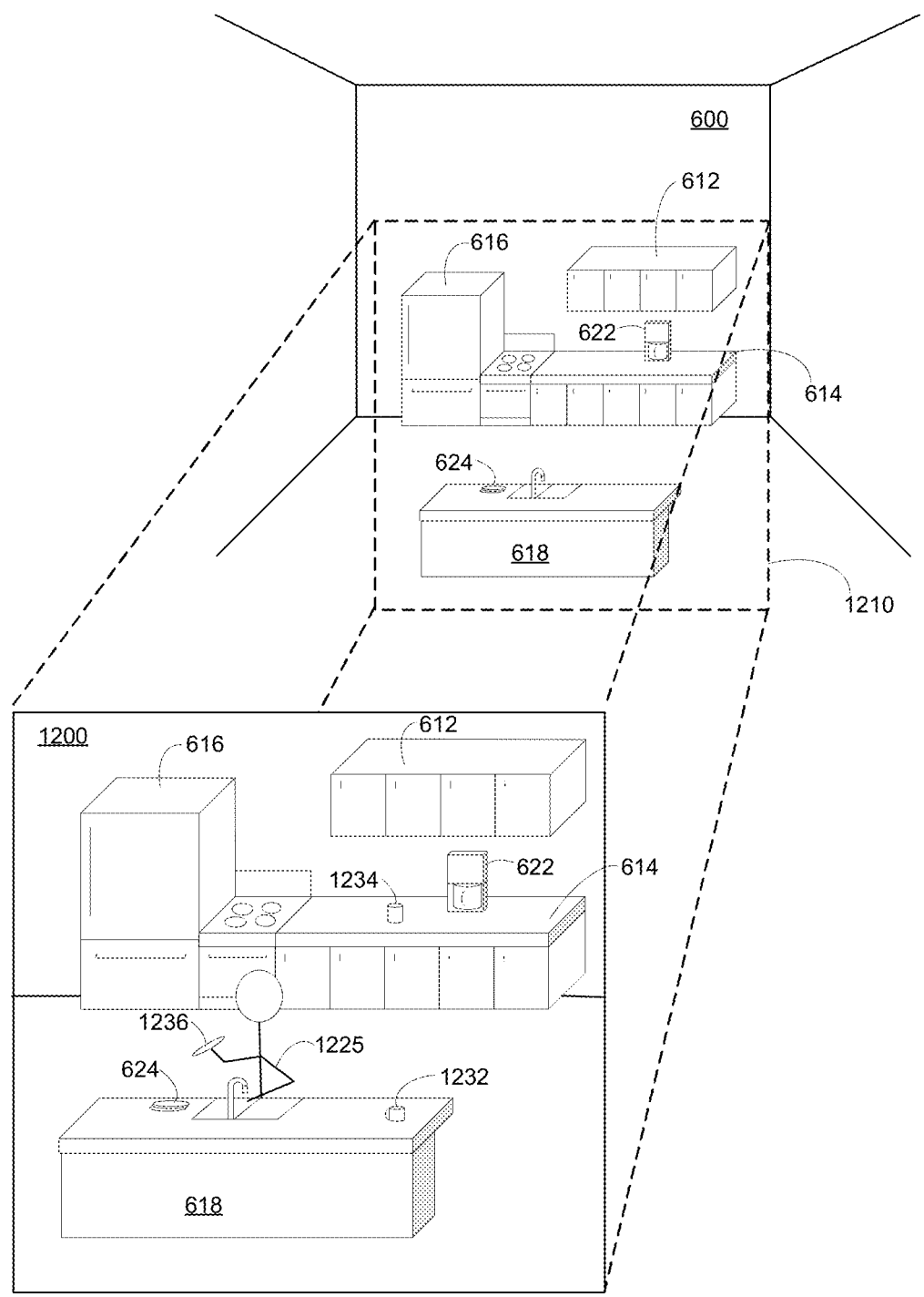

As shown in FIGS. 12H and 12I, the objective-effectuator 1225 performs one or more actions in order to achieve a third objective (e.g., wash a plate) within the CGR environment 1200 where the one or more actions are limited by the usage pattern bank 735 in accordance with a directive. FIGS. 12H and 12I show a sequence in which the objective-effectuator 1225 picks up a representation 1236 of a plate from the stack of plates 624 on the island 618 and begins to wash the representation 1236 of the plate within the CGR environment 1200.

Figure 13:
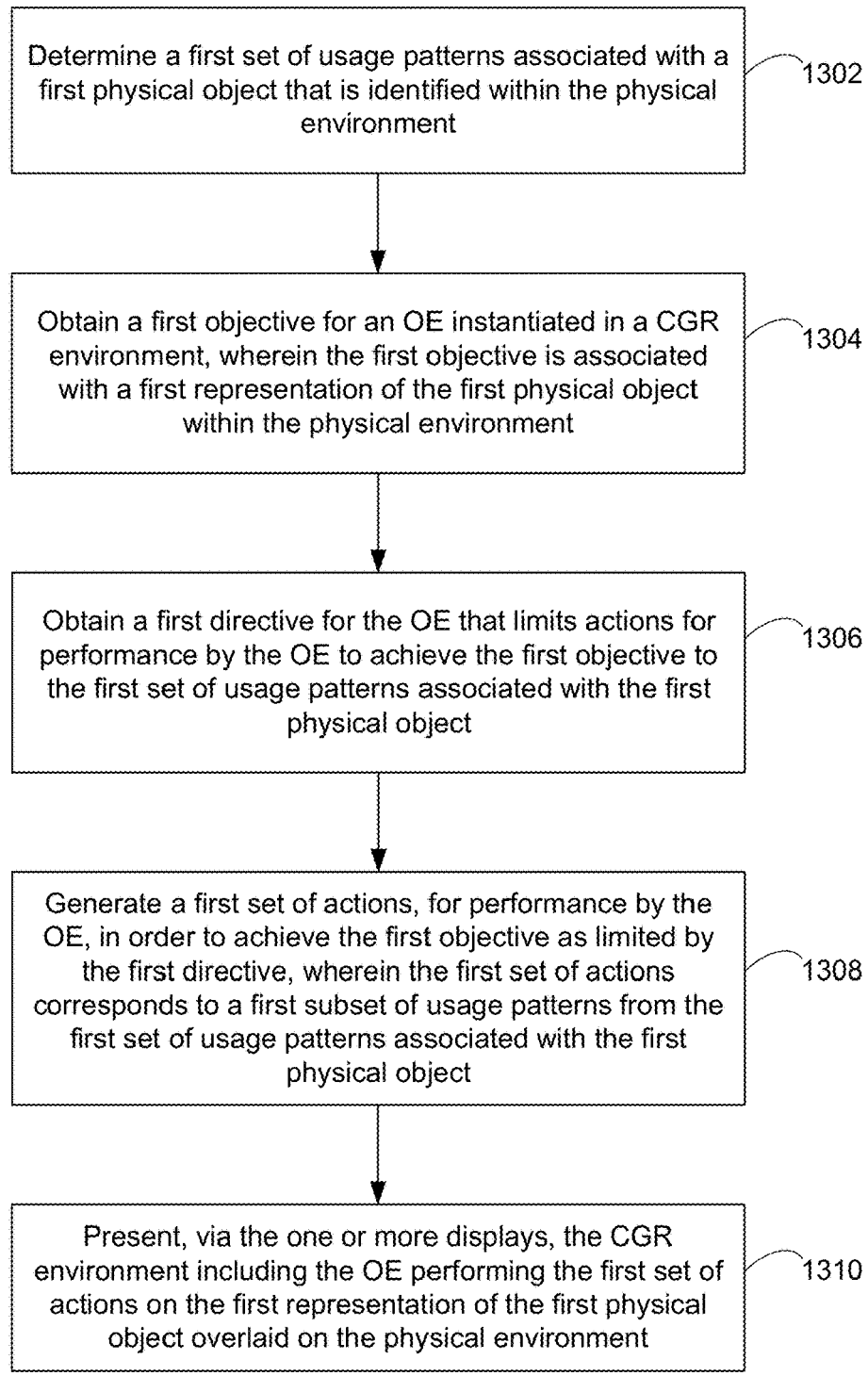
FIG. 13 is a flowchart representation of a method of generating emergency CGR content based on physical usage patterns in accordance with some implementations.

FIG. 13 is a flowchart representation of a method 1300 of generating emergency CGR content based on physical usage patterns in accordance with some implementations. In various implementations, the method 1300 is performed by a device with one or more processors and non-transitory memory (e.g., the controller 102 in FIGS. 1 and 9; the electronic device 103 in FIGS. 1 and 9; or a suitable combination thereof) or a component thereof. In some implementations, the method 1300 is performed by processing logic, including hardware, firmware, software, or a combination thereof. In some implementations, the method 1300 is performed by a processor executing code stored in a non-transitory computer-readable medium (e.g., a memory). In some implementations, the device corresponds to one of a near-eye system, a mobile phone, or a tablet. Some operations in method 1300 are, optionally, combined and/or the order of some operations is, optionally, changed.

As described below, the method 1300 provides an intuitive way to generate emergency CGR content based on physical usage patterns. The method provides a more realistic user experience and reduces the cognitive burden on a user when viewing CGR content.

In some implementations, the method 1300 includes obtaining image data associated with the physical environment, wherein the one or more usage patterns are determined based on the image data. In some implementations, the image data is captured by an image sensor that is separate from the electronic device. In some implementations, the image data is captured by an image sensor that is integrated into the electronic device. FIGS. 6A-6H, for example, illustrate an example usage scenario in accordance with some implementations. As shown in FIGS. 6A-6H, the usage scenario shows a user 10 interacting with physical objects in a physical environment 600 (e.g., a kitchen). As such, the device monitors the usage of various physical objects within the physical environment 600 by at least the optional remote input devices. According to some implementations, the device determines one or more usage patterns with each of one or more physical objects within the physical environment 600 based on actions of the user 10 therein.

In some implementations, the method 1300 includes identifying the first physical object within the physical environment based on the image data. In some implementations, the device obtains a pre-existing layout for a physical environment including labels and locations for physical objects therein. For example, a user manually labels the physical objects. In some implementations, the device determines a layout for a physical environment including labels and locations for physical objects therein. For example, as described with reference to FIG. 7A, the device identifies physical objects within the physical environment by obtaining image data corresponding to the physical environment and performing semantic segmentation or other related computer vision techniques on the image data. In some implementations, the device also tracks the physical objects as the device moves and/or physical objects move within the physical environment based on object tracking, feature tracking, other computer vision techniques, and/or the like.

In some implementations, the method 1300 includes obtaining sensor information associated with the physical object, wherein the one or more usage patterns are determined based on the sensor information. In some implementations, the device determines a layout for a physical environment including labels and locations for physical objects therein. For example, as described with reference to FIG. 7B, the device identifies physical objects within the physical environment by obtaining sensor data from physical objects within the physical environment and locating the physical objects based on the sensor data therefrom. In some implementations, the device also tracks the physical objects as the device moves and/or physical objects move within the physical environment based on object tracking, feature tracking, other computer vision techniques, and/or the like.

As represented by block 1302, the method 1300 includes determining a first set of usage patterns associated with a first physical object that is identified within the physical environment. As one example, with reference to FIG. 7A, the device or a component thereof (e.g., the usage pattern generator 725) generates one or more usage patterns for at least one physical object in the filtered object pool 712 based on the coordinates 306 of the physical objects in the filtered object pool 712, the filtered image data 304A, the filtered audio data 304B, the filtered body pose data 304C, and/or the like. In some implementations, the usage pattern generator 725 is also configured to store the one or more usage patterns for at least the one physical object in the filtered object pool 712 in association with the respective coordinates 306 therefor in a usage pattern bank 735

As another example, with reference to FIG. 7B, the device or a component thereof (e.g., the usage pattern generator 725) generates one or more usage patterns for a first physical object associated with the sensor data grouping 754A and one or more usage patterns for a second physical object associated with the sensor data grouping 754B. As one example, with reference to FIGS. 6A-6H, the usage pattern generator 725 make be able to infer a usage pattern associated with drinking from the coffee mug 628 when the sensor data grouping 754A indicates a sequence of movements, orientations, and/or the like that corresponds to a drinking motion. In some implementations, the usage pattern generator 725 is also configured to store the one or more usage patterns for the physical objects in association with the respective coordinates 306 therefor in a usage pattern bank 735.

In some implementations, the method 1300 includes storing the first set of usage patterns in a secure local non-transitory memory of the device. In some implementations, the method 1300 includes randomizing at least a portion of the first set of usage patterns before storing the usage patterns in a remote storage device or cloud storage. For example, as described with reference to FIG. 8, the usage pattern bank 735 includes a first entry 802A for a first physical object, a second entry 802B for a second physical object, and a third entry 802C for a third physical object. In some implementations, the usage pattern bank 735 is stored in a secure local non-transitory memory of the device. In some implementations, the usage pattern generator 725 randomizes at least a portion of the usage patterns before storing the usage patterns in the usage pattern bank 735, which may be located within a remote storage device or cloud storage.

In some implementations, determining the first set of usage patterns associated with the first physical object includes determining whether a user has provided informed content to record usage patterns associated with at least one of the first physical object or the physical environment.

For example, with reference to FIG. 7A, the device or a component thereof (e.g., the privacy subsystem 330) subjects user information and/or identifying information (e.g., at least some portions of the image data 302A, the audio data 302B, and the body pose data 302C) to one or more privacy filters. In some implementations, the privacy subsystem 330 selectively prevents and/or limits the data processing architecture 300 or portions thereof from obtaining and/or transmitting the user information. To this end, the privacy subsystem 330 receives user preferences and/or selections from the user in response to prompting the user for the same. In some implementations, the privacy subsystem 330 prevents the data processing architecture 300 from obtaining and/or transmitting the user information unless and until the privacy subsystem 330 obtains informed consent from the user. In some implementations, the privacy subsystem 330 anonymizes (e.g., scrambles or obscures) certain types of user information. For example, the privacy subsystem 330 receives user inputs designating which types of user information the privacy subsystem 330 anonymizes. As another example, the privacy subsystem 330 anonymizes certain types of user information likely to include sensitive and/or identifying information, independent of user designation (e.g., automatically).

As represented by block 1304, the method 1300 includes obtaining a first objective for an objective-effectuator (OE) instantiated in a computer-generated reality (CGR) environment, wherein the first objective is associated with a first representation of the first physical object within the physical environment. For example, the objective corresponds to drinking a cup of coffee, where the cup is the physical object. According to some implementations, with reference to FIG. 10A, the OE corresponds to one of the OE engines 1008, and the objective is generated by the emergent content engine 1050.

As represented by block 1306, the method 1300 includes obtaining a first directive for the OE that limits actions for performance by the OE to achieve the first objective to the first set of usage patterns associated with the first physical object. In some implementations, the directive is limited to usage patterns that are observed/recorded within the user's physical environment. According to some implementations, with reference to FIGS. 10A-10C, the director 1070 generates the directive based at least in part on the usage pattern bank 735.

As represented by block 1308, the method 1300 includes generating a first set of actions, for performance by the OE, in order to achieve the first objective as limited by the first directive, wherein the first set of actions corresponds to a first subset of usage patterns from the first set of usage patterns associated with the first physical object. According to some implementations, with reference to FIG. 10A, one of the OE engines 1008 generates actions 1010 for the OE based on the directive generated by the director 1070 and the objective generated by the emergent content engine 1050.

As represented by block 1310, the method 1300 includes presenting, via the one or more displays, the CGR environment including the OE performing the first set of actions on the first representation of the first physical object overlaid on the physical environment. According to some implementations, with reference to FIG. 10A, the display engine 1060 presents the OE performing the actions 1010 within the CGR environment. For example, the OE may be composited with a physical environment.

For example, the OE may manipulate or interact with a representation of the physical object in a manner that mimics usage patterns of the user. As one example, the OE's objective is to find a container in order to pull candy from the container. The OE may pull CGR content associated with candy from a representation of a cookie jar that is associated with a physical item in the user's environment (e.g., the container).

With reference to FIGS. 12A-12I, the FOV 1210 corresponds to a viewing area associated with an exterior-facing image sensor of the device that enables video pass-through of at least a portion of the physical environment 600. Continuing with this example, the device displays a CGR environment 1200 (e.g., a user interface) that includes the objective-effectuator 1225 composited with or overlaid on video pass-through associated with the FOV 1210. In another example, the FOV 1210 corresponds to an optical viewing area associated with a transparent lens of the device that enables optical see-through of at least a portion of the physical environment 600. Continuing with this example, the device displays the CGR environment 1200 by projecting or rendering the objective-effectuator 1225 onto the transparent lens that enables optical see-through associated with the FOV 1210. As such, the user 10, for example, perceives the objective-effectuator 1225 as being overlaid on the FOV 1210.

As one example, in FIGS. 12A-12E, the objective-effectuator 1225 performs one or more actions within the CGR environment 1200 in order to achieve a first objective (e.g., drink coffee from a coffee mug) where the one or more actions are limited by the usage pattern bank 735 in accordance with a directive. FIGS. 12A-12C shows a sequence in which the objective-effectuator 1225 retrieves a representation 1232 of the coffee mug 628 from the set of cabinets 612 and places the representation 1232 of the coffee mug 628 on the countertop 614 within the CGR environment 1200. FIGS. 12C-12F show a sequence in which the objective-effectuator 1225 pours coffee from the coffee maker 622 (e.g., using a representation of the associated carafe) into the representation 1232 of the coffee mug 628, drinks from the representation 1232 of the coffee mug 628, and places the representation 1232 of the coffee mug 628 on the island 618 within the CGR environment 1200.

In some implementations, the method 1300 includes: determining coordinates of the first physical object within the physical environment; and presenting the CGR environment includes presenting the OE performing the first set of actions on the first representation of the first physical object proximate to the coordinates of the first physical object within the physical environment. According to some implementations, with reference to FIGS. 7A and 7B, the device or a component thereof (e.g., the object locator 344) determines coordinates for physical objects within the physical environment. In some implementations, the device presents the representation of the physical object proximate to or overlaid on the location of the physical object in order to project a sense of realism relative to the user/s physical environment. For example, the coordinates correspond to absolute world coordinates such as GPS coordinates. In another example, the coordinates correspond to environment-specific coordinates relative to a coordinate system defined by the physical environment.

In some implementations, the method 1300 includes: determining a second set of usage patterns associated with a second physical object within the physical environment; obtaining a second objective for the OE instantiated in the CGR environment, wherein the second objective is associated with a second representation of the second physical object within the physical environment; obtaining a second directive for the OE that limits actions for performance by the OE to achieve the second objective to the second set of usage patterns associated with the second physical object; generating a second set of actions for performance by the OE in order to achieve the second objective as limited by the second directive, wherein the second set of actions corresponds to a second subset of usage patterns from second set of usage patterns associated with the second physical object; and presenting, via the one or more displays, the CGR environment including the OE performing the second set of actions on the second representation of the second object overlaid on the physical environment.

As one example, as shown in FIGS. 12F and 12G, the objective-effectuator 1225 performs one or more actions in order to achieve a second objective (e.g., retrieve an item from the refrigerator) within the CGR environment 1200 where the one or more actions are limited by the usage pattern bank 735 in accordance with a directive. FIGS. 12F and 12G show a sequence in which the objective-effectuator 1225 retrieves a representation 1234 of the item 626 from the refrigerator 616 (e.g., by opening a representation of the door of the refrigerator 616) and places the representation 1234 of the item 626 the countertop 614 within the CGR environment 1200. Moreover, as shown in FIGS. 12H and 12I, the objective-effectuator 1225 performs one or more actions in order to achieve a third objective (e.g., wash a plate) within the CGR environment 1200 where the one or more actions are limited by the usage pattern bank 735 in accordance with a directive. FIGS. 12H and 12I show a sequence in which the objective-effectuator 1225 picks up a representation 1236 of a plate from the stack of plates 624 on the island 618 and begins to wash the representation 1236 of the plate within the CGR environment 1200.

In some implementations, the method 1300 includes: generating an intermediate action based on the first set of usage patterns and the second set of usage patterns that links the first set of actions and the second set of actions into a temporal sequence; and presenting, via the one or more displays, the CGR environment including the OE performing the intermediate action between the first set of actions and the second set of actions. According to some implementations, with reference to FIG. 10A, the emergent content system 1000 determines: (I) a first set of actions based on the first set of usage patterns; (II) a second set of actions based on the second set of usage patterns; and (III) an intermediate action that bridges the first and second set of actions into a temporal sequence of actions based on the first and second sets of usage patterns. As one illustrative example, the first set of usage patterns associated with the first object (e.g., a drinking glass) corresponds to retrieving a glass from a cabinet, filling the glass with water, and drinking from the glass, and a second usage pattern associated with a second object (e.g., a plate) corresponds to washing a plate in a sink. Continuing with this example, the intermediate action may correspond to placing the glass in the sink after drinking from the glass. As such, the temporal sequence of actions performed may include: (A) a first set of actions including retrieving a representation of the glass from the cabinet, filling the glass with a liquid, and drinking from the glass; (B) the intermediate action including placing the representation of the glass in the sink after drinking from the glass; and (C) a second set of actions including washing the representations of the glass and the plate within sink.

It should be understood that the particular order in which the operations in FIG. 13 have been described is merely example and is not intended to indicate that the described order is the only order in which the operations could be performed. One of ordinary skill in the art would recognize various ways to reorder the operations described herein. Additionally, it should be noted that details of other processes described herein with respect to other methods described herein (e.g., the method 500) are also applicable in an analogous manner to method 1300 described above with respect to FIG. 13. For example, the physical objects, physical environment, CGR objects, and CGR environment described above with reference to method 1300 optionally have one or more of the characteristics of the physical objects, physical environment, CGR objects, and CGR environment described herein with reference to other methods described herein (e.g., the method 500). For brevity, these details are not repeated here.

Figure 14:
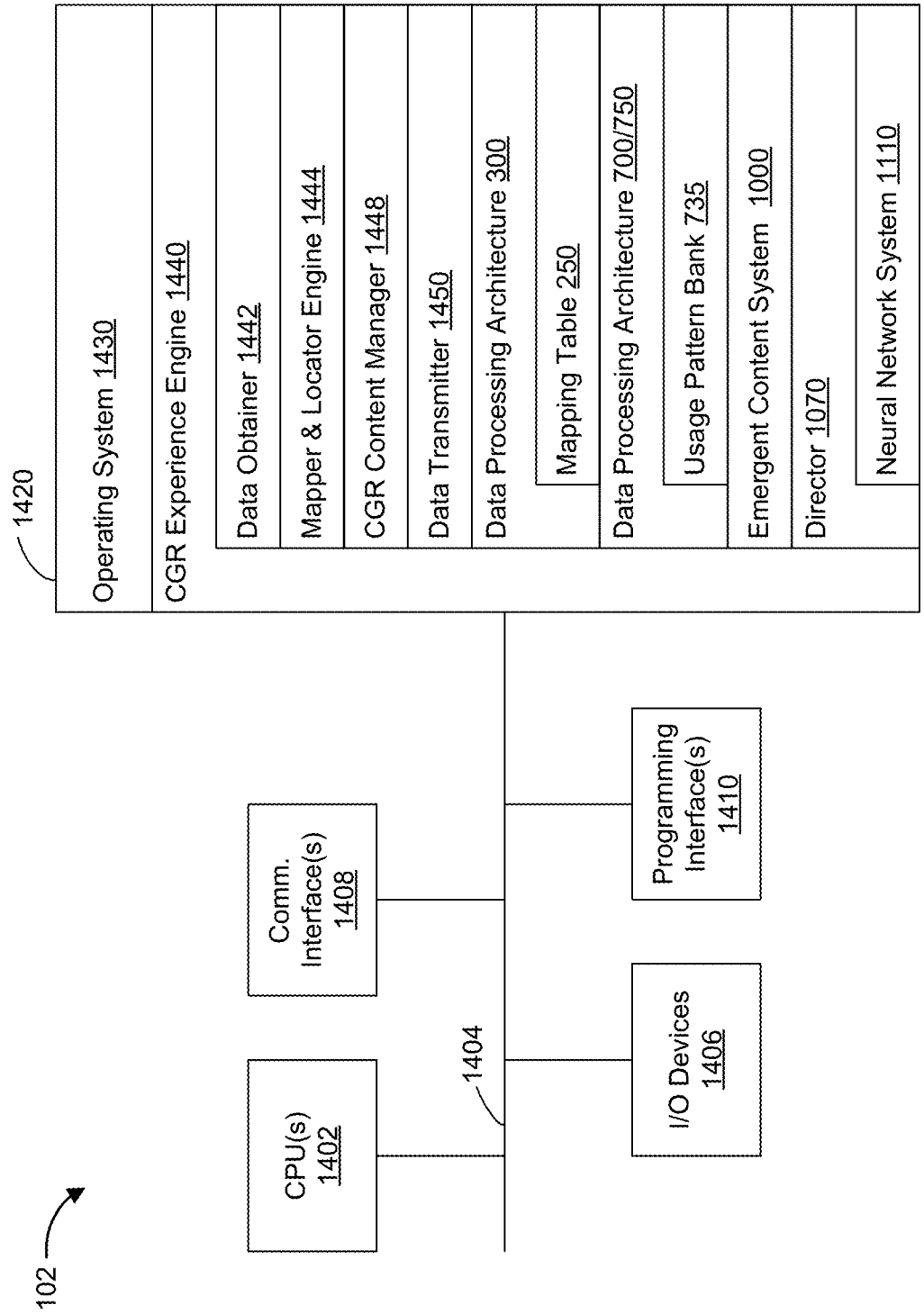
FIG. 14 is a block diagram of an example controller in accordance with some implementations.

FIG. 14 is a block diagram of an example of the controller 102 in accordance with some implementations. While certain specific features are illustrated, those skilled in the art will appreciate from the present disclosure that various other features have not been illustrated for the sake of brevity, and so as not to obscure more pertinent aspects of the implementations disclosed herein. To that end, as a non-limiting example, in some implementations, the controller 102 includes one or more processing units 1402 (e.g., microprocessors, application-specific integrated-circuits (ASICs), field-programmable gate arrays (FPGAs), graphics processing units (GPUs), central processing units (CPUs), processing cores, and/or the like), one or more input/output (I/O) devices 1406, one or more communication interfaces 1408 (e.g., universal serial bus (USB), IEEE 802.3x, IEEE 802.11x, IEEE 802.16x, global system for mobile communications (GSM), code division multiple access (CDMA), time division multiple access (TDMA), global positioning system (GPS), infrared (IR), BLUETOOTH, ZIGBEE, and/or the like type interface), one or more programming (e.g., I/O) interfaces 1410, a memory 1420, and one or more communication buses 1404 for interconnecting these and various other components.

In some implementations, the one or more communication buses 1404 include circuitry that interconnects and controls communications between system components. In some implementations, the one or more I/O devices 1406 include at least one of a keyboard, a mouse, a touchpad, a joystick, one or more microphones, one or more speakers, one or more image sensors, one or more displays, and/or the like.

The memory 1420 includes high-speed random-access memory, such as dynamic random-access memory (DRAM), static random-access memory (SRAM), double-data-rate random-access memory (DDR RAM), or other random-access solid-state memory devices. In some implementations, the memory 1420 includes non-volatile memory, such as one or more magnetic disk storage devices, optical disk storage devices, flash memory devices, or other non-volatile solid-state storage devices. The memory 1420 optionally includes one or more storage devices remotely located from the one or more processing units 1402. The memory 1420 comprises a non-transitory computer readable storage medium. In some implementations, the memory 1420 or the non-transitory computer readable storage medium of the memory 1420 stores the following programs, modules and data structures, or a subset thereof including an optional operating system 1430 and a CGR experience engine 1440 with a data obtainer 1442, a mapper and locator engine 1444, a CGR content manager 1448, a data transmitter 1450, the data processing architecture 300, the data processing architecture 700/750, the emergent content system 1000, and the director 1070.

The operating system 1430 includes procedures for handling various basic system services and for performing hardware dependent tasks.

In some implementations, the data obtainer 1442 is configured to obtain data (e.g., presentation data, user interaction data, sensor data, location data, etc.) from at least one of the I/O devices 1406 of the controller 102, the electronic device 1500, and the optional remote input devices. To that end, in various implementations, the data obtainer 1442 includes instructions and/or logic therefor, and heuristics and metadata therefor.

In some implementations, the mapper and locator engine 1444 is configured to map a physical environment (e.g., the physical environment 105 in FIG. 1, the physical environment 205 in FIGS. 2A-2D, or the physical environment 600 in FIGS. 6A-6H) and to track the position/location of at least one or more physical objects with the physical environment and the electronic device 1500 with respect to the physical environment. To that end, in various implementations, the mapper and locator engine 1444 includes instructions and/or logic therefor, and heuristics and metadata therefor.

In some implementations, the CGR content manager 1448 is configured to manage and coordinate one or more CGR environments for one or more users (e.g., a single CGR experience for one or more users, or multiple CGR experiences for respective groups of one or more users). To that end, in various implementations, the CGR content manager 1448 includes instructions and/or logic therefor, and heuristics and metadata therefor.

In some implementations, the data transmitter 1450 is configured to transmit data (e.g., presentation data, location data, etc.) to at least the electronic device 1500. To that end, in various implementations, the data transmitter 150 includes instructions and/or logic therefor, and heuristics and metadata therefor.

In some implementations, the data processing architecture 300 is configured to perform the functions and/or operations described above with reference to FIG. 3. In some implementations, the data processing architecture 300 includes the mapping table 250 described above with reference to FIGS. 2A-2D. To that end, in various implementations, the data processing architecture 300 includes instructions and/or logic therefor, and heuristics and metadata therefor.

In some implementations, the data processing architecture 700/750 is configured to perform the functions and/or operations described above with reference to FIGS. 7A and 7B. In some implementations, the data processing architecture 700/750 includes the usage pattern bank 735 described above with reference to FIGS. 8 and 12A-12I. To that end, in various implementations, the data processing architecture 700/750 includes instructions and/or logic therefor, and heuristics and metadata therefor.

In some implementations, the emergent content system 1000 is configured to perform the functions and/or operations described above with reference to FIG. 10A. To that end, in various implementations, the emergent content system 1000 includes instructions and/or logic therefor, and heuristics and metadata therefor.

In some implementations, the director 1070 is configured to perform the functions and/or operations described above with reference to FIG. 11A. In some implementations, the director 1070 includes the neural network system 1110 described above with reference to FIGS. 11A and 11B. To that end, in various implementations, the data processing architecture 300 includes instructions and/or logic therefor, and heuristics and metadata therefor.

Although the data obtainer 1442, the mapper and locator engine 1444, the CGR content manager 1448, the data transmitter 1450, the data processing architecture 300, the data processing architecture 700/750, the emergent content system 1000, and the director 1070 are shown as residing on a single device (e.g., the controller 102), it should be understood that in other implementations, any combination of the data obtainer 1442, the mapper and locator engine 1444, the CGR content manager 1448, the data transmitter 1450, the data processing architecture 300, the data processing architecture 700/750, the emergent content system 1000, and the director 1070 may be located in separate computing devices.

In some implementations, the functions and/or components of the controller 102 are combined with or provided by the electronic device 1500 shown below in FIG. 15 Moreover, FIG. 14 is intended more as a functional description of the various features which be present in a particular implementation as opposed to a structural schematic of the implementations described herein. As recognized by those of ordinary skill in the art, items shown separately could be combined and some items could be separated. For example, some functional modules shown separately in FIG. 14 could be implemented in a single module and the various functions of single functional blocks could be implemented by one or more functional blocks in various implementations. The actual number of modules and the division of particular functions and how features are allocated among them will vary from one implementation to another and, in some implementations, depends in part on the particular combination of hardware, software, and/or firmware chosen for a particular implementation.

Figure 15:
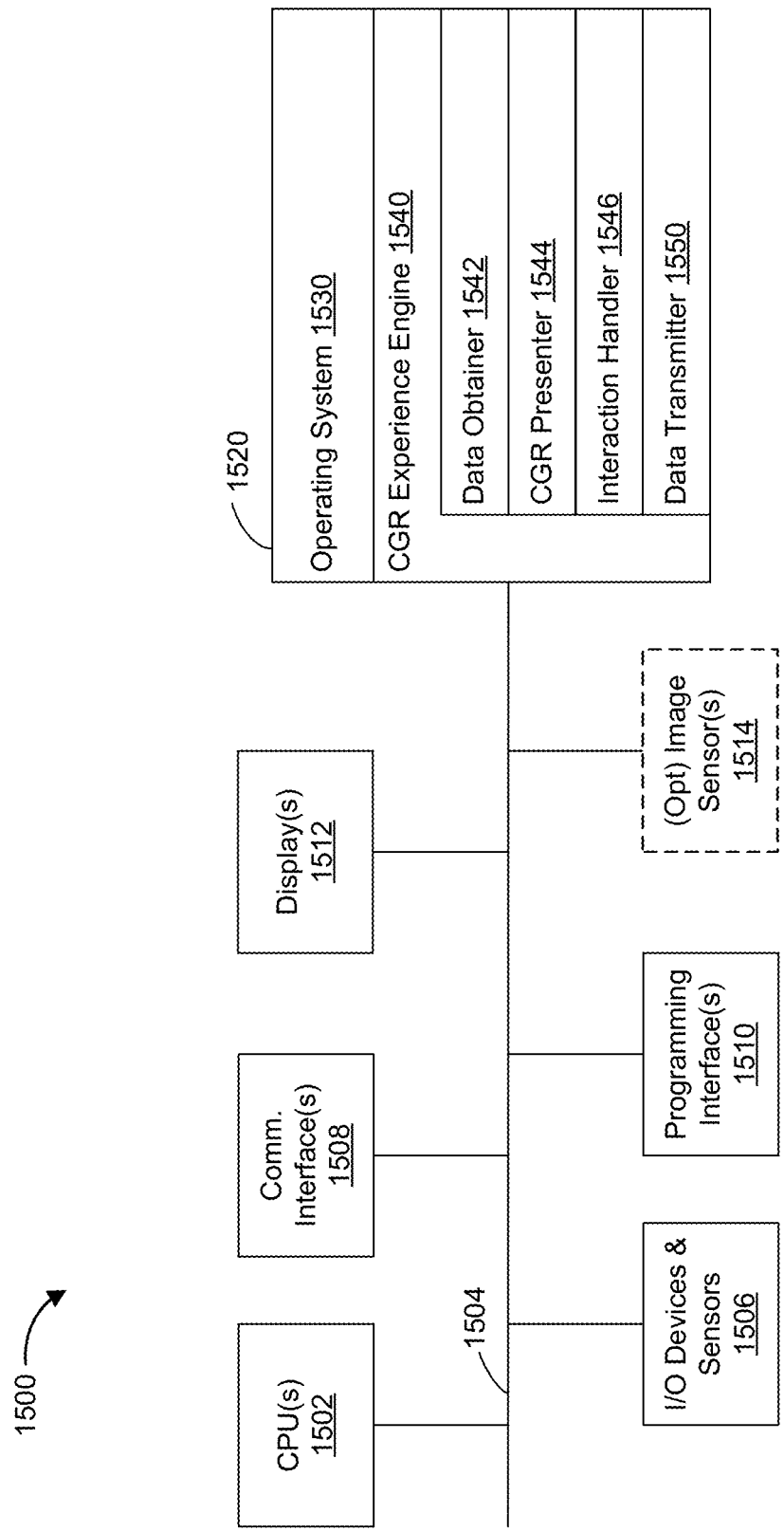
FIG. 15 is a block diagram of an example electronic device in accordance with some implementations.

FIG. 15 is a block diagram of an example of the electronic device 1500 (e.g., the electronic device 103 in FIGS. 1 and 9) in accordance with some implementations. While certain specific features are illustrated, those skilled in the art will appreciate from the present disclosure that various other features have not been illustrated for the sake of brevity, and so as not to obscure more pertinent aspects of the implementations disclosed herein. To that end, as a non-limiting example, in some implementations, the electronic device 1500 includes one or more processing units 1502 (e.g., microprocessors, ASICs, FPGAs, GPUs, CPUs, processing cores, and/or the like), one or more input/output (I/O) devices and sensors 1506, one or more communication interfaces 1508 (e.g., USB, IEEE 802.3x, IEEE 802.11x, IEEE 802.16x, GSM, CDMA, TDMA, GPS, IR, BLUETOOTH, ZIGBEE, and/or the like type interface), one or more programming (e.g., I/O) interfaces 1510, one or more displays 1512, one or more optional interior- and/or exterior-facing image sensors 1514, a memory 1520, and one or more communication buses 1504 for interconnecting these and various other components.

In some implementations, the one or more communication buses 1504 include circuitry that interconnects and controls communications between system components. In some implementations, the one or more I/O devices and sensors 1506 include at least one of an inertial measurement unit (IMU), an accelerometer, a gyroscope, a thermometer, one or more physiological sensors (e.g., blood pressure monitor, heart rate monitor, blood oxygen sensor, blood glucose sensor, etc.), one or more microphones, one or more speakers, a haptics engine, a heating and/or cooling unit, a skin shear engine, one or more depth sensors (e.g., structured light, time-of-flight, or the like), and/or the like.

In some implementations, the one or more displays 1512 are configured to present the CGR experience to the user. In some implementations, the one or more displays 1512 are also configured to present flat video content to the user (e.g., a 2-dimensional or "flat" AVI, FLV, WMV, MOV, MP4, or the like file associated with a TV episode or a movie, or live video pass-through of the physical environment 105). In some implementations, the one or more displays 1512 correspond to holographic, digital light processing (DLP), liquid-crystal display (LCD), liquid-crystal on silicon (LCoS), organic light-emitting field-effect transitory (OLET), organic light-emitting diode (OLED), surface-conduction electron-emitter display (SED), field-emission display (FED), quantum-dot light-emitting diode (QD-LED), micro-electro-mechanical system (MEMS), and/or the like display types. In some implementations, the one or more displays 1512 correspond to diffractive, reflective, polarized, holographic, etc. waveguide displays. For example, the electronic device 1500 includes a single display. In another example, the electronic device 1500 includes a display for each eye of the user. In some implementations, the one or more displays 1512 are capable of presenting AR and VR content. In some implementations, the one or more displays 1512 are capable of presenting AR or VR content.

In some implementations, the one or more optional interior- and/or exterior-facing image sensors 1514 correspond to one or more RGB cameras (e.g., with a complementary metal-oxide-semiconductor (CMOS) image sensor or a charge-coupled device (CCD) image sensor), IR image sensors, event-based cameras, and/or the like.

The memory 1520 includes high-speed random-access memory, such as DRAM, SRAM, DDR RAM, or other random-access solid-state memory devices. In some implementations, the memory 1520 includes non-volatile memory, such as one or more magnetic disk storage devices, optical disk storage devices, flash memory devices, or other non-volatile solid-state storage devices. The memory 1520 optionally includes one or more storage devices remotely located from the one or more processing units 1502. The memory 1520 comprises a non-transitory computer readable storage medium. In some implementations, the memory 1520 or the non-transitory computer readable storage medium of the memory 1520 stores the following programs, modules and data structures, or a subset thereof including an optional operating system 1530 and a CGR presentation engine 1540.

The operating system 1530 includes procedures for handling various basic system services and for performing hardware dependent tasks. In some implementations, the CGR presentation engine 1540 is configured to present CGR content to the user via the one or more displays 1512. To that end, in various implementations, the CGR presentation engine 1540 includes a data obtainer 1542, a CGR presenter 1544, an interaction handler 1546, and a data transmitter 1550.

In some implementations, the data obtainer 1542 is configured to obtain data (e.g., presentation data, user interaction data, sensor data, location data, etc.) from at least one of the I/O devices and sensors 1506 of the electronic device 1500, the controller 102, and the optional remote input devices. To that end, in various implementations, the data obtainer 1542 includes instructions and/or logic therefor, and heuristics and metadata therefor.

In some implementations, the CGR presenter 1544 is configured to present and update CGR content via the one or more displays 1512. To that end, in various implementations, the CGR presenter 1544 includes instructions and/or logic therefor, and heuristics and metadata therefor.

In some implementations, the interaction handler 1546 is configured to detect and interpret user interactions with the presented CGR content. To that end, in various implementations, the interaction handler 1546 includes instructions and/or logic therefor, and heuristics and metadata therefor.

In some implementations, the data transmitter 1550 is configured to transmit data (e.g., presentation data, location data, user interaction data, etc.) to at least the controller 102. To that end, in various implementations, the data transmitter 1550 includes instructions and/or logic therefor, and heuristics and metadata therefor.

Although the data obtainer 1542, the CGR presenter 1544, the interaction handler 1546, and the data transmitter 1550 are shown as residing on a single device (e.g., the electronic device 1500), it should be understood that in other implementations, any combination of the data obtainer 1542, the CGR presenter 1544, the interaction handler 1546, and the data transmitter 1550 may be located in separate computing devices.

Moreover, FIG. 15 is intended more as a functional description of the various features which be present in a particular implementation as opposed to a structural schematic of the implementations described herein. As recognized by those of ordinary skill in the art, items shown separately could be combined and some items could be separated. For example, some functional modules shown separately in FIG. 15 could be implemented in a single module and the various functions of single functional blocks could be implemented by one or more functional blocks in various implementations. The actual number of modules and the division of particular functions and how features are allocated among them will vary from one implementation to another and, in some implementations, depends in part on the particular combination of hardware, software, and/or firmware chosen for a particular implementation.

While various aspects of implementations within the scope of the appended claims are described above, it should be apparent that the various features of implementations described above may be embodied in a wide variety of forms and that any specific structure and/or function described above is merely illustrative. Based on the present disclosure one skilled in the art should appreciate that an aspect described herein may be implemented independently of any other aspects and that two or more of these aspects may be combined in various ways. For example, an apparatus may be implemented and/or a method may be practiced using any number of the aspects set forth herein. In addition, such an apparatus may be implemented and/or such a method may be practiced using other structure and/or functionality in addition to or other than one or more of the aspects set forth herein.

It will also be understood that, although the terms "first," "second," etc. may be used herein to describe various elements, these elements should not be limited by these terms. These terms are only used to distinguish one element from another. For example, a first node could be termed a second node, and, similarly, a second node could be termed a first node, which changing the meaning of the description, so long as all occurrences of the "first node" are renamed consistently and all occurrences of the "second node" are renamed consistently. The first node and the second node are both nodes, but they are not the same node.

The terminology used herein is for the purpose of describing particular implementations only and is not intended to be limiting of the claims. As used in the description of the implementations and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in accordance with a determination" or "in response to detecting," that a stated condition precedent is true, depending on the context. Similarly, the phrase "if it is determined [that a stated condition precedent is true]" or "if [a stated condition precedent is true]" or "when [a stated condition precedent is true]" may be construed to mean "upon determining" or "in response to determining" or "in accordance with a determination" or "upon detecting" or "in response to detecting" that the stated condition precedent is true, depending on the context.

What is claimed is:

1. A method comprising:
   at an electronic device with one or more processors, a non-transitory memory, and one or more displays:
   determining a first set of usage patterns associated with a first physical object that is identified within a physical environment;
   obtaining a first objective for an objective-effectuator (OE) instantiated in a computer-generated reality (CGR) environment, wherein the first objective is associated with a first representation of the first physical object within the physical environment;
   obtaining a first directive for the OE that limits actions for performance by the OE to achieve the first objective to the first set of usage patterns associated with the first physical object;
   generating a first set of actions, for performance by the OE, in order to achieve the first objective as limited by the first directive, wherein the first set of actions corresponds to a first subset of usage patterns from the first set of usage patterns associated with the first physical object; and
   presenting, via the one or more displays, the CGR environment including the OE performing the first set of actions on the first representation of the first physical object overlaid on the physical environment.

2. The method of claim 1, further comprising:
   obtaining image data associated with the physical environment, wherein the one or more usage patterns are determined based on the image data.

3. The method of claim 2, further comprising:
   identifying the first physical object within the physical environment based on the image data.

4. The method of claim 2, wherein the image data is captured by an image sensor that is separate from the electronic device.

5. The method of claim 2, wherein the image data is captured by an image sensor that is integrated into the electronic device.

6. The method of claim 1, further comprising:
obtaining sensor information associated with the physical object, wherein the one or more usage patterns are determined based on the sensor information.

7. The method of claim 1, further comprising:
determining a second set of usage patterns associated with a second physical object within the physical environment;
obtaining a second objective for the OE instantiated in the CGR environment, wherein the second objective is associated with a second representation of the second physical object within the physical environment;
obtaining a second directive for the OE that limits actions for performance by the OE to achieve the second objective to the second set of usage patterns associated with the second physical object;
generating a second set of actions for performance by the OE in order to achieve the second objective as limited by the second directive, wherein the second set of actions corresponds to a second subset of usage patterns from the second set of usage patterns associated with the second physical object; and
presenting, via the one or more displays, the CGR environment including the OE performing the second set of actions on the second representation of the second object overlaid on the physical environment.

8. The method of claim 7, further comprising:
generating an intermediate action based on the first set of usage patterns and the second set of usage patterns that links the first set of actions and the second set of actions into a temporal sequence; and
presenting, via the one or more displays, the CGR environment including the OE performing the intermediate action between the first set of actions and the second set of actions.

9. The method of claim 1, further comprising:
determining coordinates of the first physical object within the physical environment; and
wherein presenting the CGR environment includes presenting the OE performing the first set of actions on the first representation of the first physical object proximate to the coordinates of the first physical object within the physical environment.

10. The method of claim 1, further comprising:
storing the first set of usage patterns in a secure local non-transitory memory of the device.

11. The method of claim 1, further comprising:
randomizing at least a portion of the first set of usage patterns before storing the first set of usage patterns in a remote storage device or cloud storage.

12. The method of claim 1, wherein determining the first set of usage patterns associated with the first physical object includes determining whether a user has provided informed content to record usage patterns associated with at least one of the first physical object or the physical environment.

13. The method of claim 1, wherein the electronic device includes at least one of a head-mounted device (HMD), a mobile phone, or a tablet.

14. A device comprising:
one or more displays;
one or more processors;
a non-transitory memory; and
one or more programs stored in the non-transitory memory, which, when executed by the one or more processors, cause the device to:
determine a first set of usage patterns associated with a first physical object that is identified within a physical environment;
obtain a first objective for an objective-effectuator (OE) instantiated in a computer-generated reality (CGR) environment, wherein the first objective is associated with a first representation of the first physical object within the physical environment;
obtain a first directive for the OE that limits actions for performance by the OE to achieve the first objective to the first set of usage patterns associated with the first physical object;
generate a first set of actions, for performance by the OE, in order to achieve the first objective as limited by the first directive, wherein the first set of actions corresponds to a first subset of usage patterns from the first set of usage patterns associated with the first physical object; and
present, via the one or more displays, the CGR environment including the OE performing the first set of actions on the first representation of the first physical object overlaid on the physical environment.

15. The device of claim 14, wherein the one or more programs further cause the device to:
obtaining image data associated with the physical environment, wherein the one or more usage patterns are determined based on the image data.

16. The device of claim 15, wherein the one or more programs further cause the device to:
identifying the first physical object within the physical environment based on the image data.

17. The device of claim 15, wherein the image data is captured by at least one of a first image sensor that is separate from the device or a second image sensor that is integrated into the device.

18. The device of claim 14, wherein the one or more programs further cause the device to:
obtaining sensor information associated with the physical object, wherein the one or more usage patterns are determined based on the sensor information.

19. A non-transitory memory storing one or more programs, which, when executed by one or more processors of a device with one or more displays, cause the device to:
determine a first set of usage patterns associated with a first physical object that is identified within a physical environment;
obtain a first objective for an objective-effectuator (OE) instantiated in a computer-generated reality (CGR) environment, wherein the first objective is associated with a first representation of the first physical object within the physical environment;
obtain a first directive for the OE that limits actions for performance by the OE to achieve the first objective to the first set of usage patterns associated with the first physical object;
generate a first set of actions, for performance by the OE, in order to achieve the first objective as limited by the first directive, wherein the first set of actions corresponds to a first subset of usage patterns from the first set of usage patterns associated with the first physical object; and
present, via the one or more displays, the CGR environment including the OE performing the first set of actions on the first representation of the first physical object overlaid on the physical environment.

20. The non-transitory memory of claim 19, wherein the one or more programs further cause the device to:

obtaining image data associated with the physical environment, wherein the one or more usage patterns are determined based on the image data.

21. The non-transitory memory of claim 20, wherein the one or more programs further cause the device to:
   identifying the first physical object within the physical environment based on the image data.

22. The non-transitory memory of claim 20, wherein the image data is captured by at least one of a first image sensor that is separate from the device or a second image sensor that is integrated into the device.

23. The non-transitory memory of claim 19, wherein the one or more programs further cause the device to:
   obtaining sensor information associated with the physical object, wherein the one or more usage patterns are determined based on the sensor information.

* * * * *